(12) United States Patent
Terada et al.

(10) Patent No.: US 6,185,049 B1
(45) Date of Patent: Feb. 6, 2001

(54) ZOOM LENS SYSTEM

(75) Inventors: Mamoru Terada, Sakai; Takashi Okada, Nishinomiya; Yasushi Yamamoto, Kishiwada; Kazuhiko Ishimaru, Kaizuka, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/289,674

(22) Filed: Apr. 12, 1999

(30) Foreign Application Priority Data

| Apr. 13, 1998 | (JP) | 10-100898 |
| Jun. 8, 1998 | (JP) | 10-158913 |
| Feb. 9, 1999 | (JP) | 11-031537 |
| Feb. 9, 1999 | (JP) | 11-031538 |

(51) Int. Cl.$^7$ ................................. G02B 15/14
(52) U.S. Cl. ........................................... 359/689
(58) Field of Search ........................... 359/689, 683, 359/676, 686

(56) References Cited

U.S. PATENT DOCUMENTS

| 4,983,027 | 1/1991 | Kojima et al. . |
| 5,325,235 | 6/1994 | Takashima et al. . |
| 5,353,160 | 10/1994 | Ogata . |
| 5,424,870 | 6/1995 | Hashimura et al. . |
| 5,528,429 | 6/1996 | Hagimori . |
| 5,786,944 | * 7/1998 | Hagimori et al. ........................ 359/689 |
| 6,064,531 | * 5/2000 | Ishii et al. ........................ 359/689 |

FOREIGN PATENT DOCUMENTS

| 3-16109 | 2/1991 | (JP) . |
| 6-294899 | 11/1994 | (JP) . |
| 6-336059 | 12/1994 | (JP) . |
| 9-145356 | 6/1997 | (JP) . |
| 10-104519 | 4/1998 | (JP) . |

* cited by examiner

*Primary Examiner*—Scott J. Sugarman
(74) *Attorney, Agent, or Firm*—Burns, Doane, Swecker & Mathis, LLP

(57) ABSTRACT

A zoom lens system has, from the object side, a first lens unit having a positive optical power, a second lens unit having a positive optical power and provided at the image side of the first lens unit with a first variable air space between the first and second lens units, and a third lens unit having a negative optical power and provided at the image side of the second lens unit with a second variable air space between the second and third lens units, wherein a zooming operation is performed by varying the first and second air spaces, and wherein the zooming fulfills the predetermined condition with respect to a lateral magnification of the third lens unit in a shortest focal length condition.

36 Claims, 25 Drawing Sheets

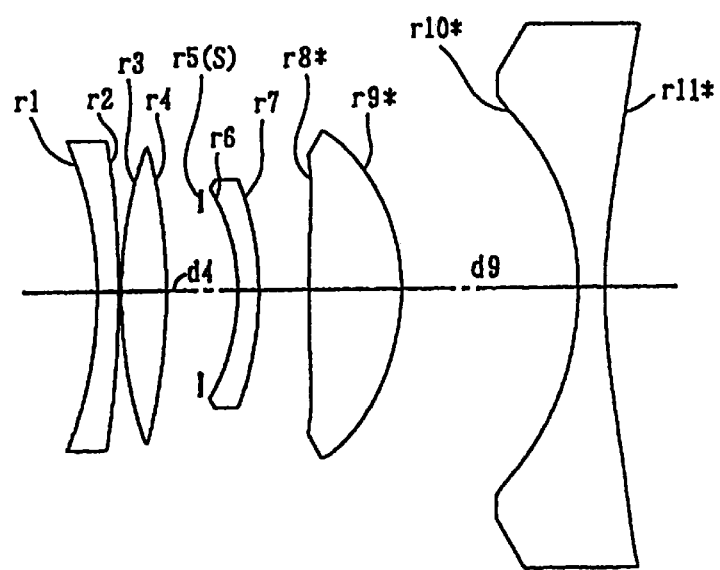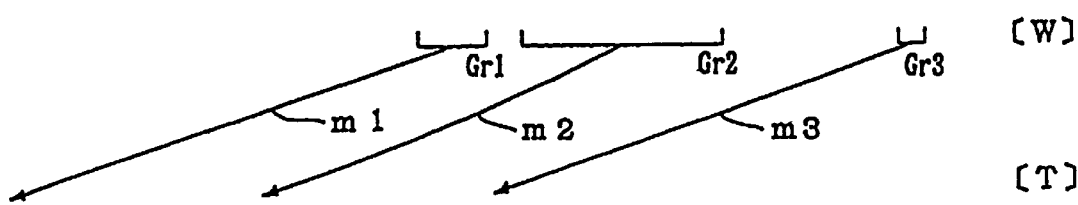
Fig.1

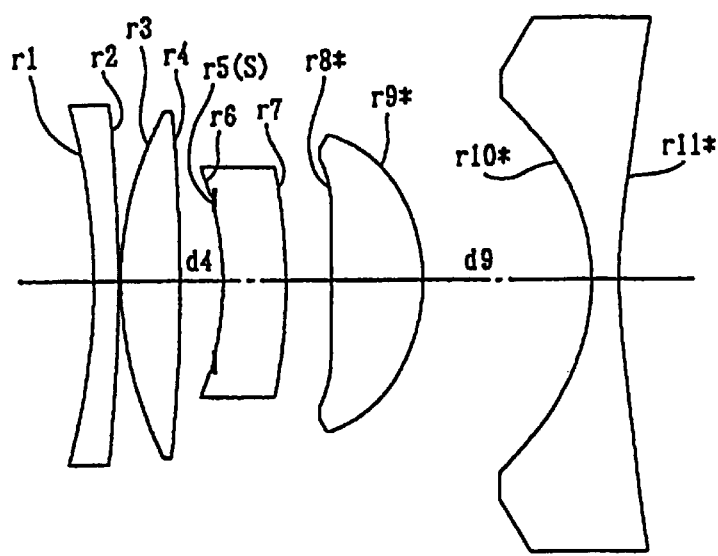
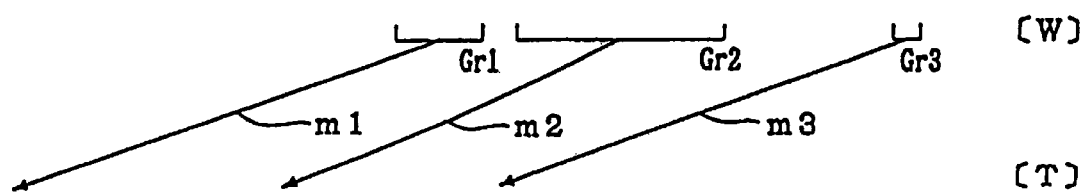
Fig.2

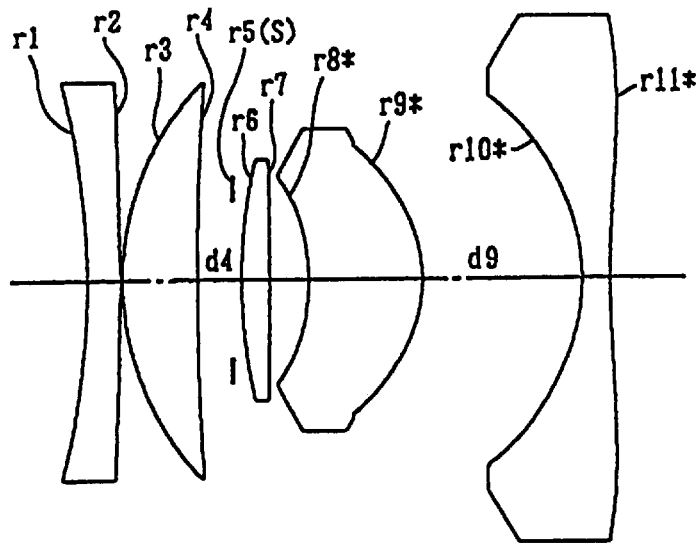
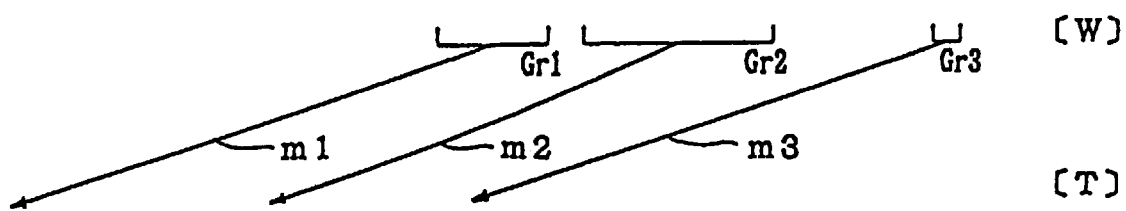
Fig.3

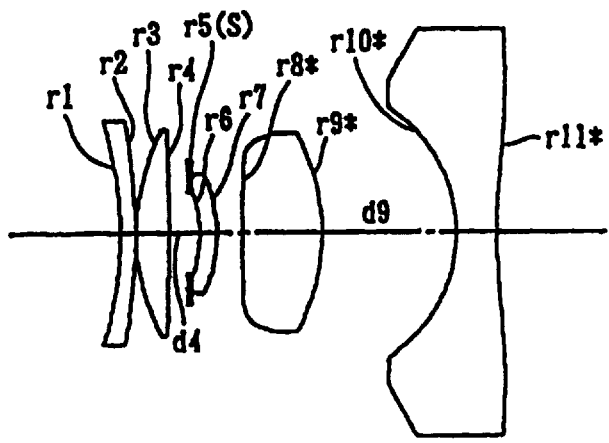
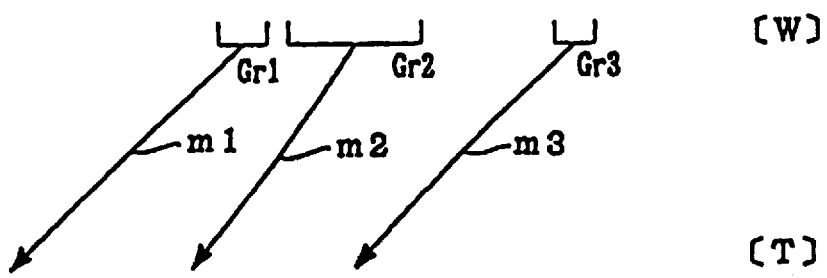
Fig.5
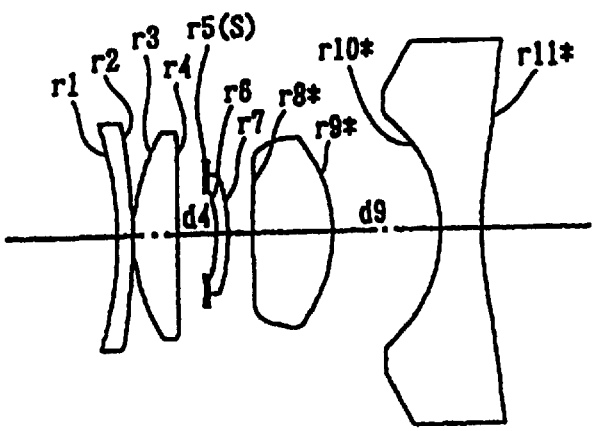
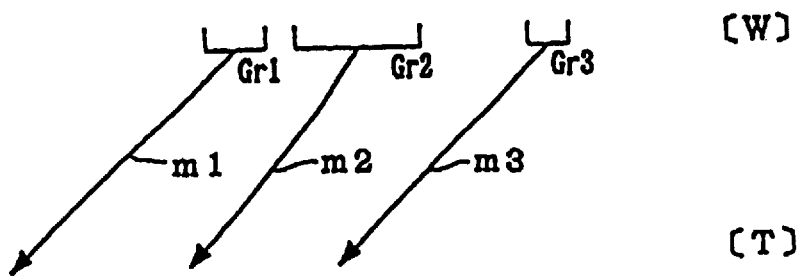
Fig.6

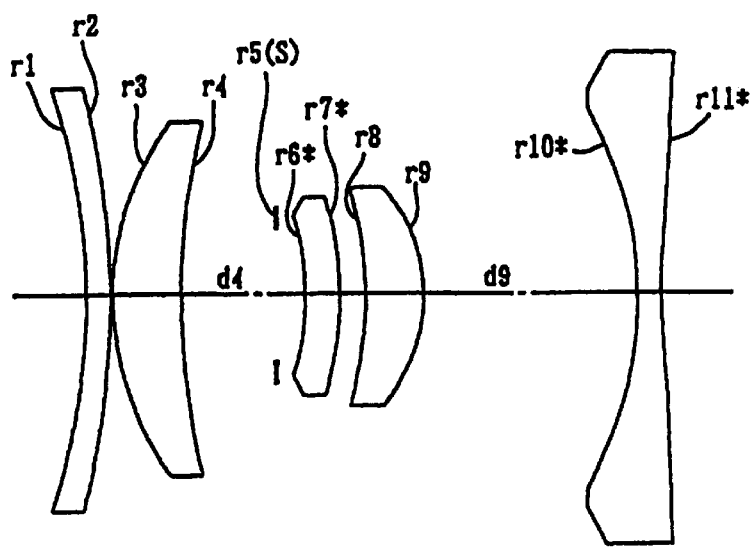
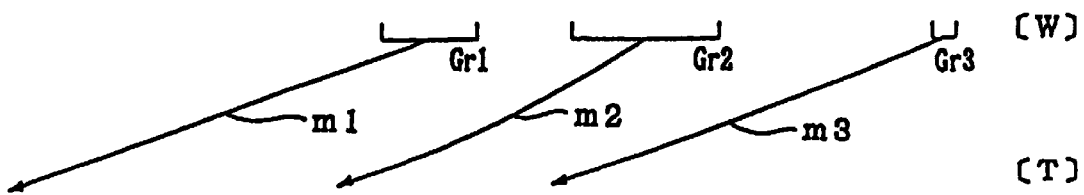
Fig. 7

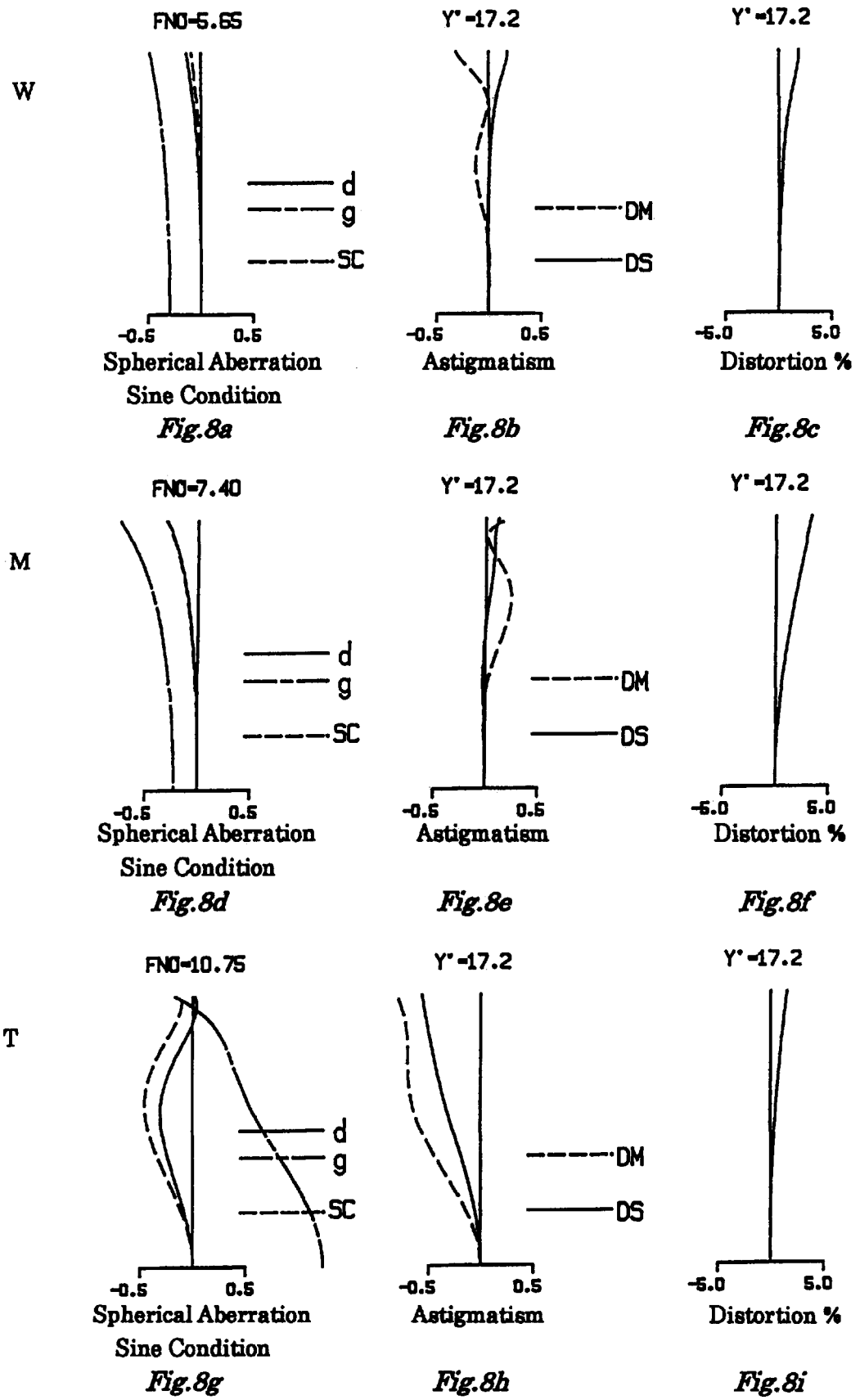

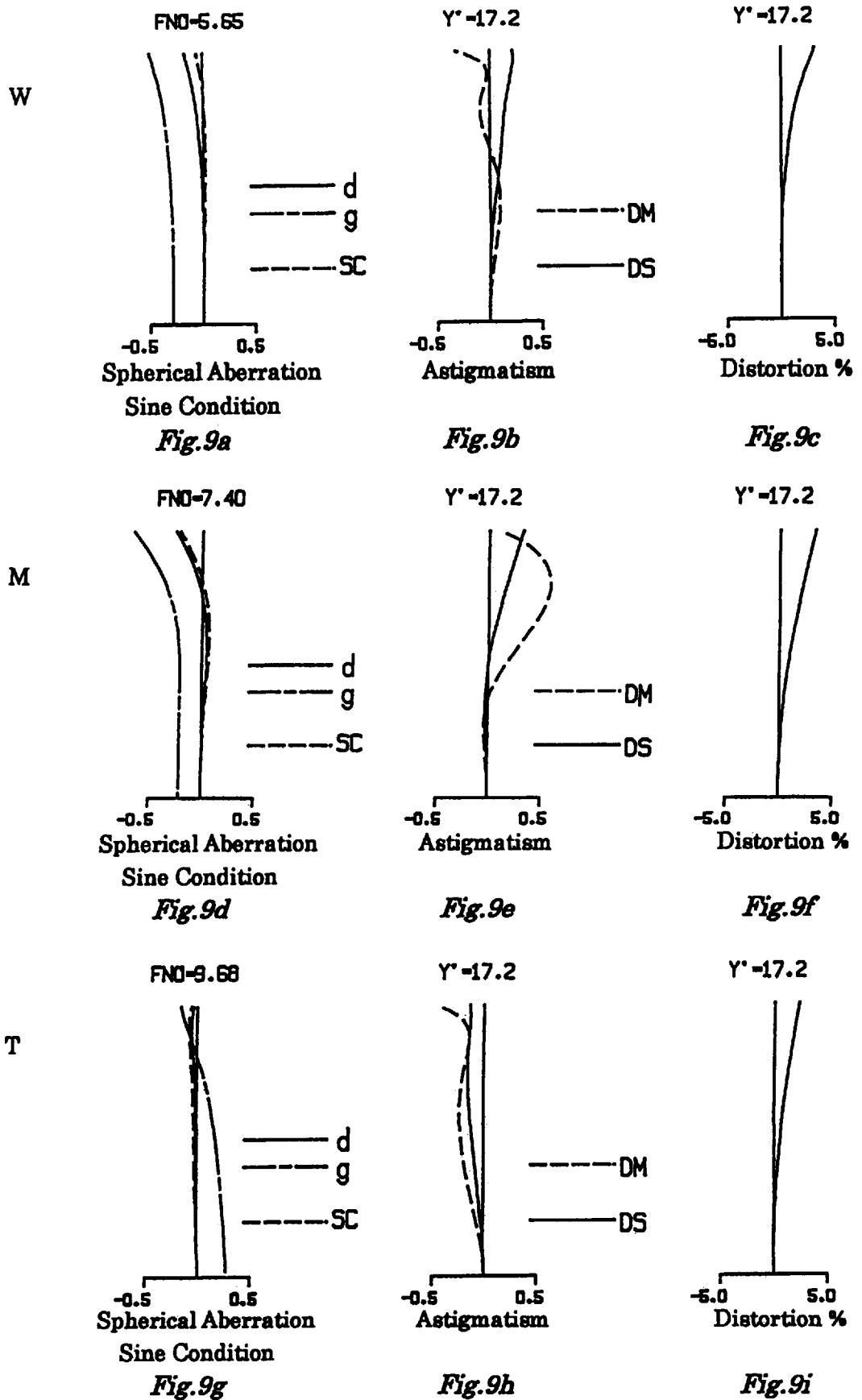

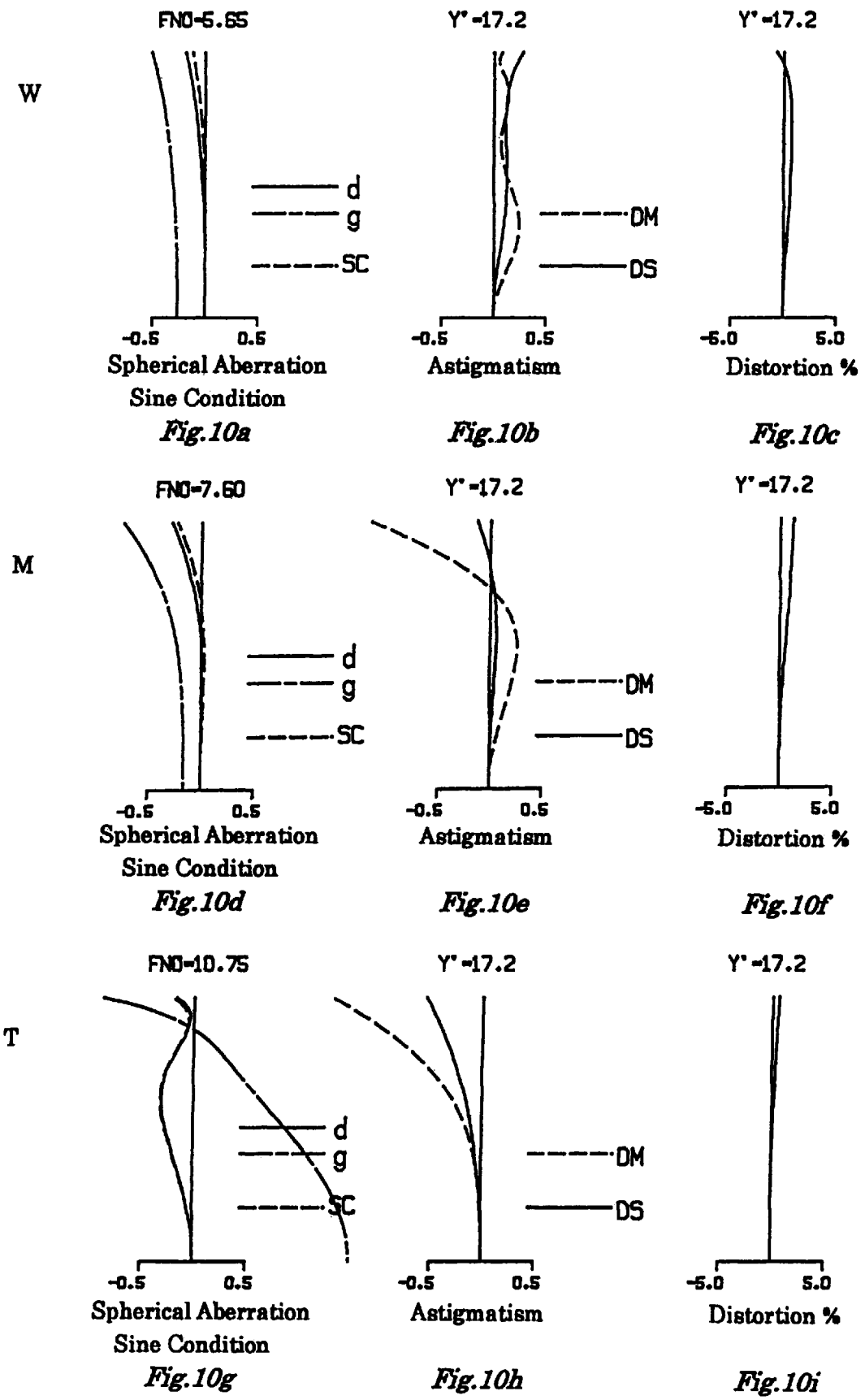

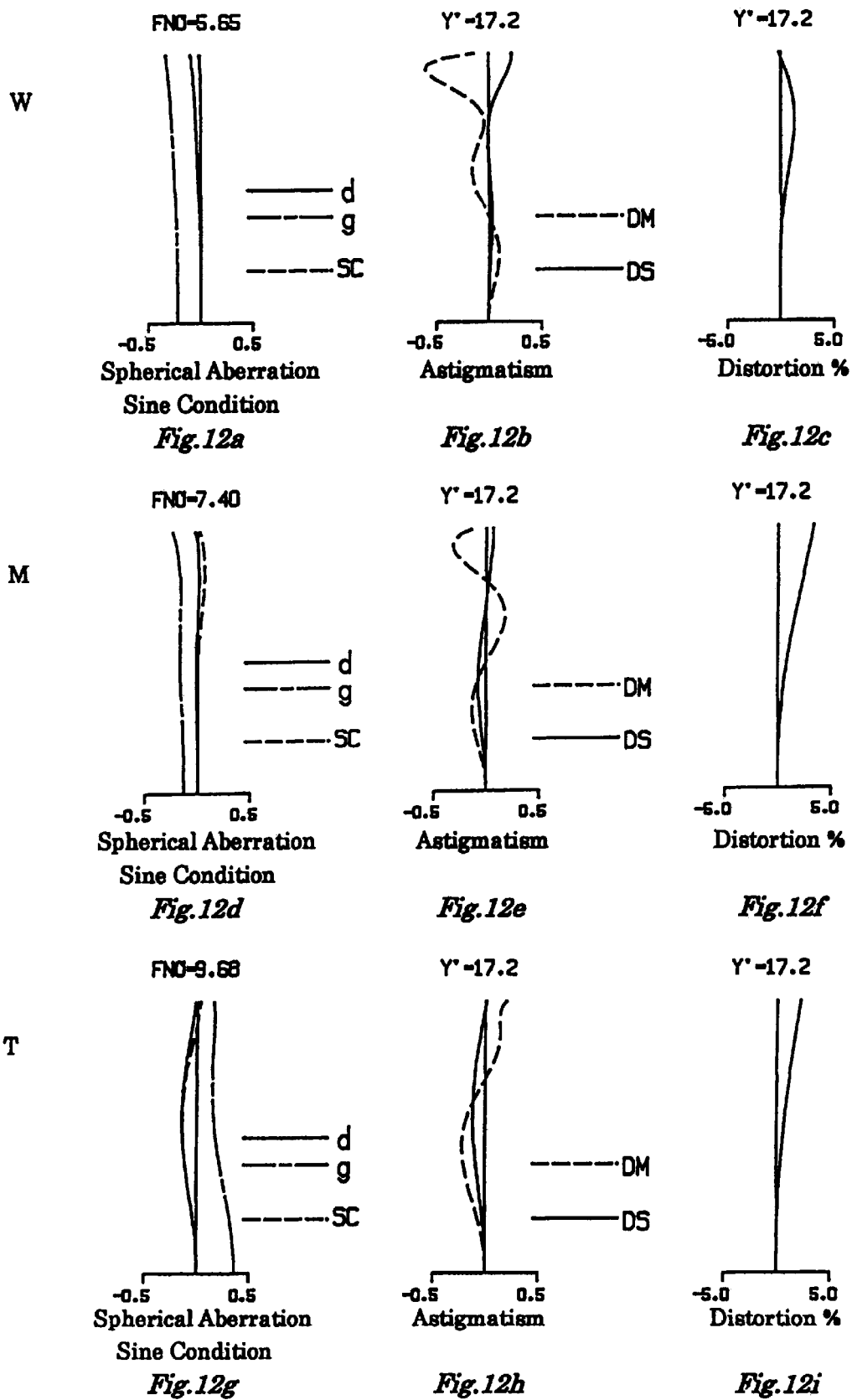

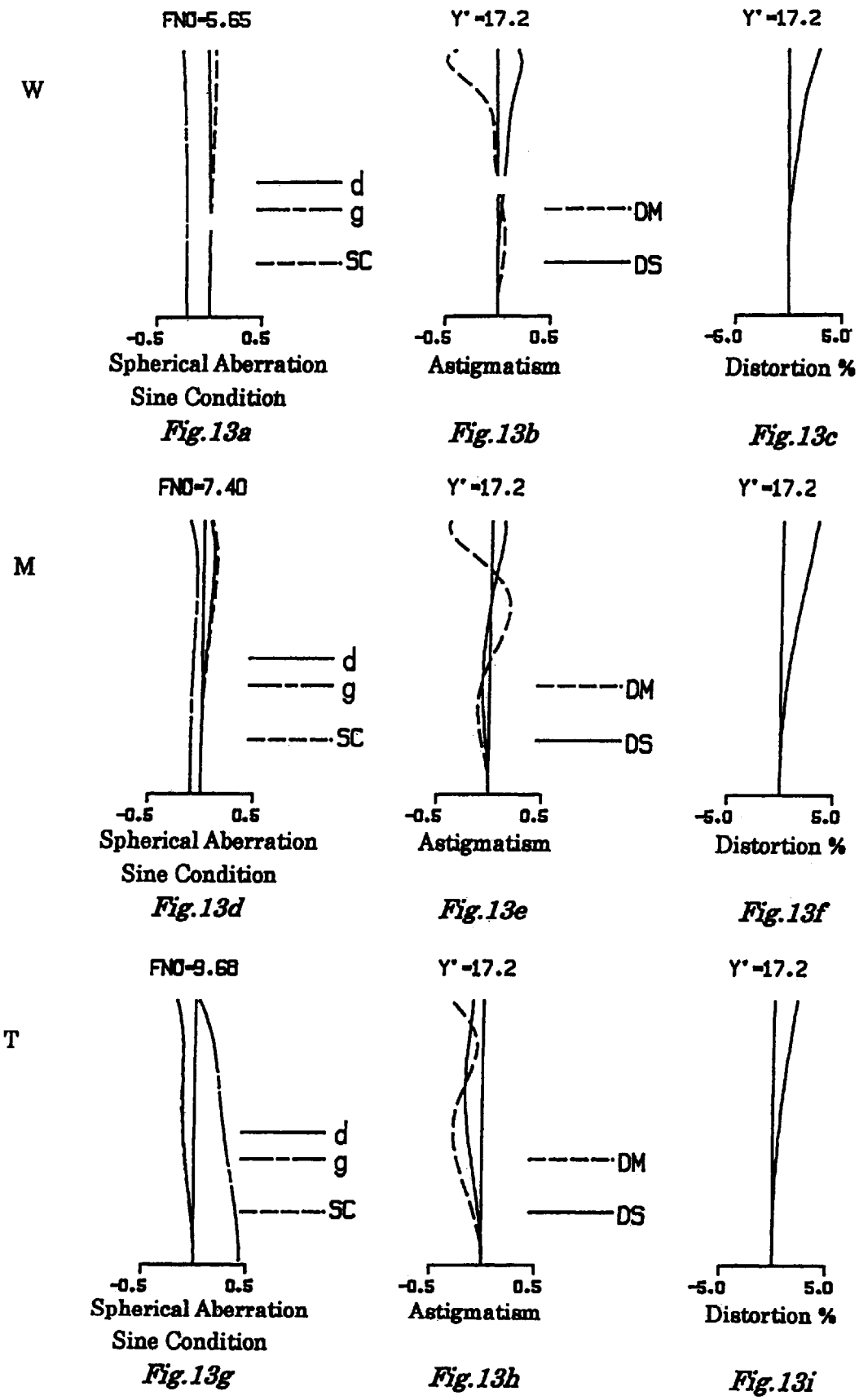

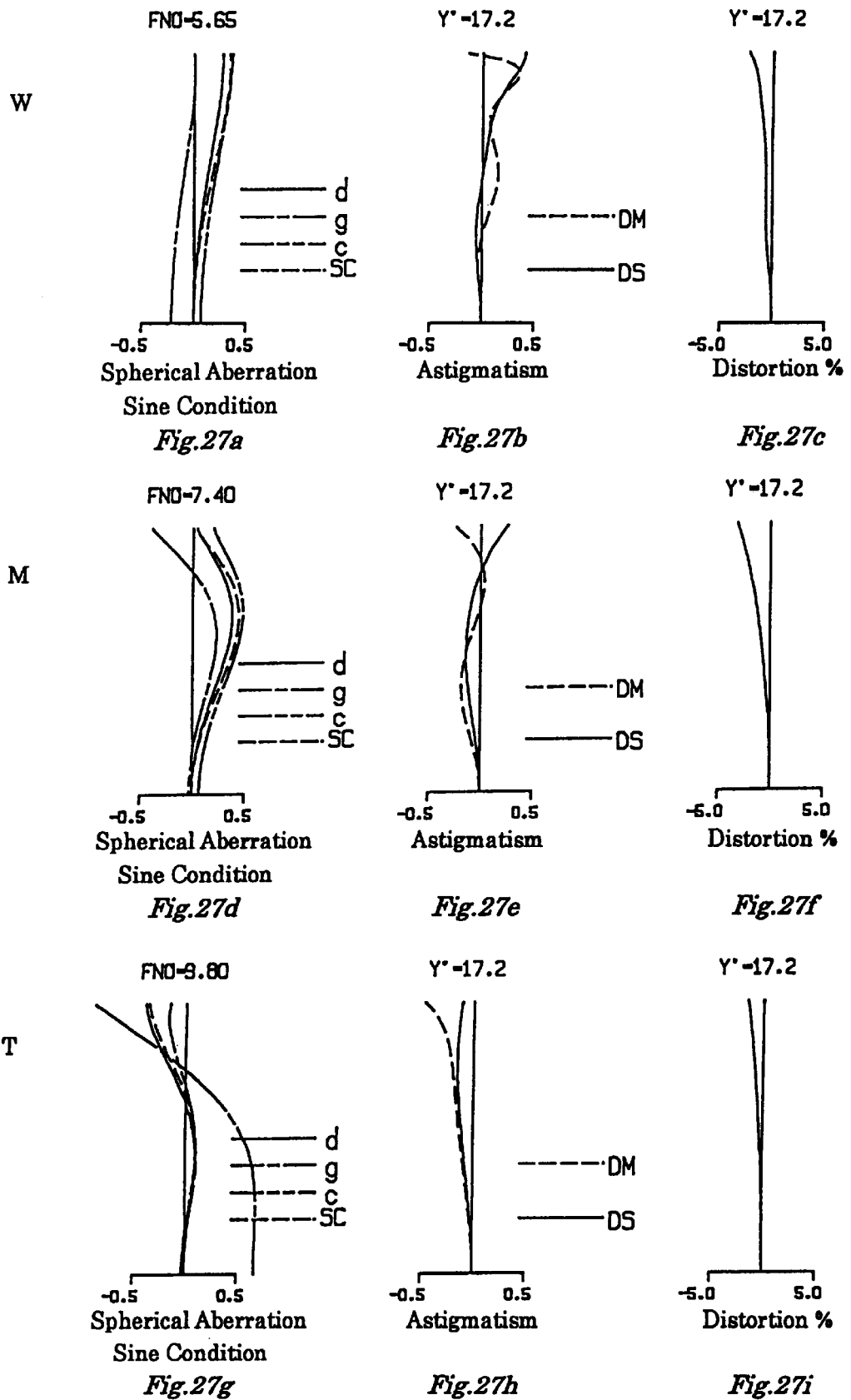

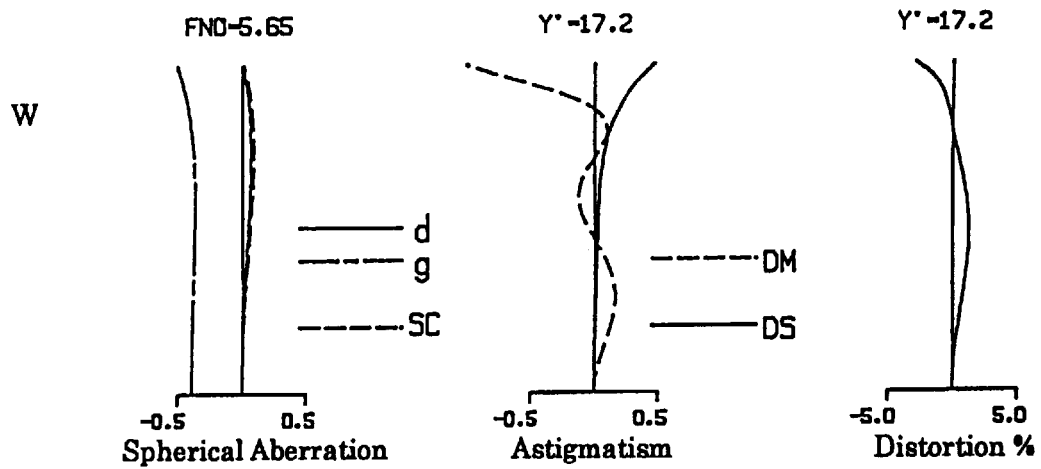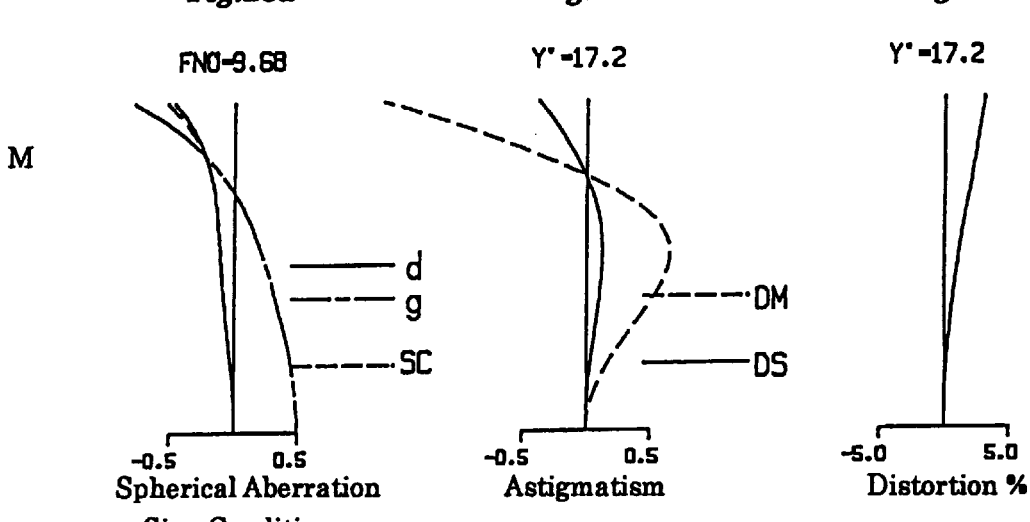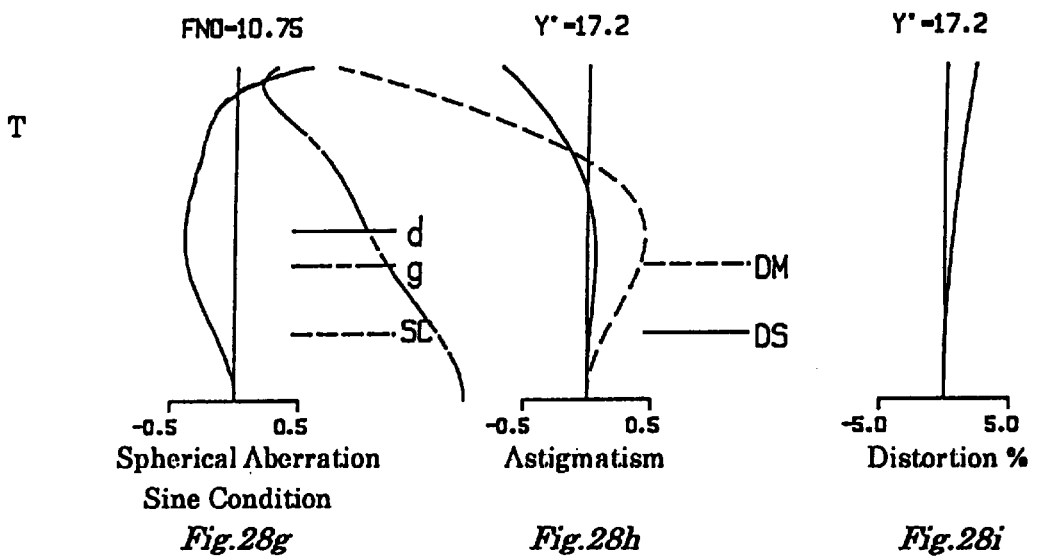

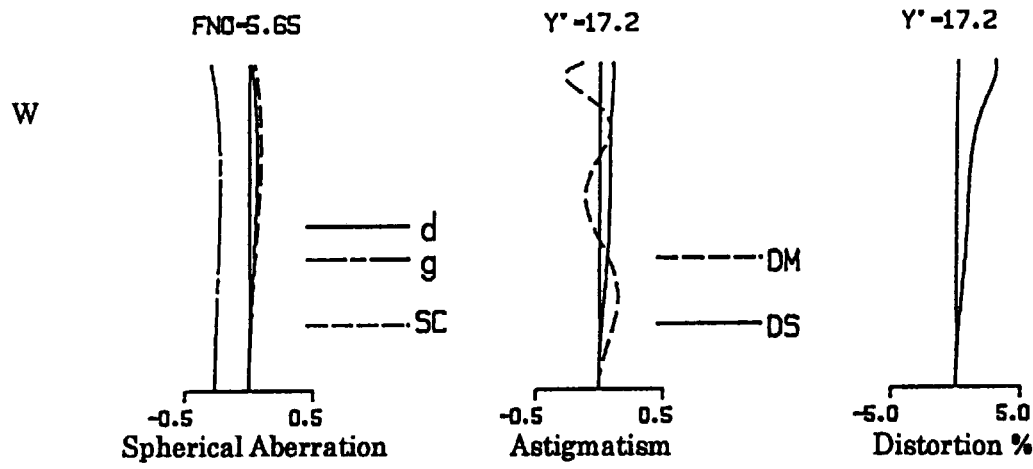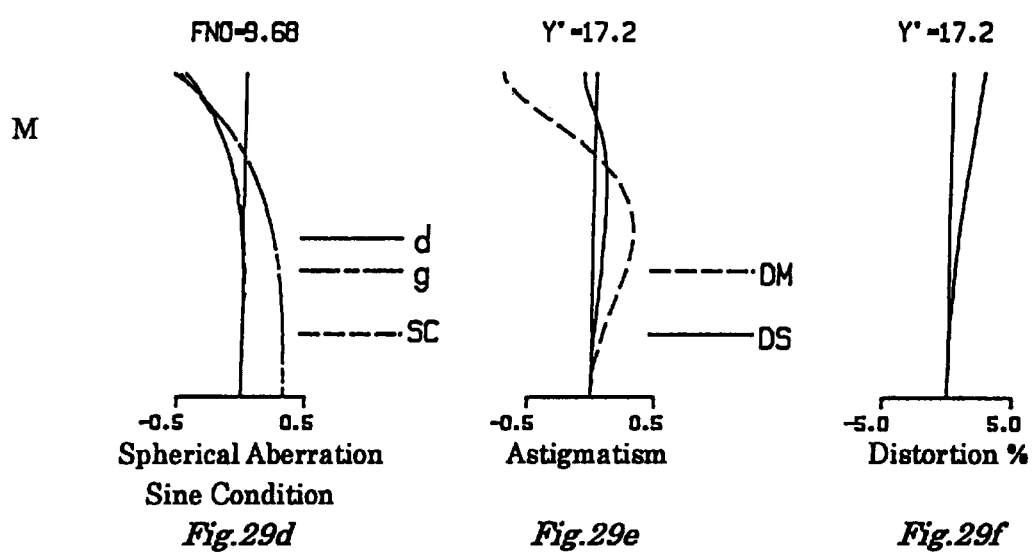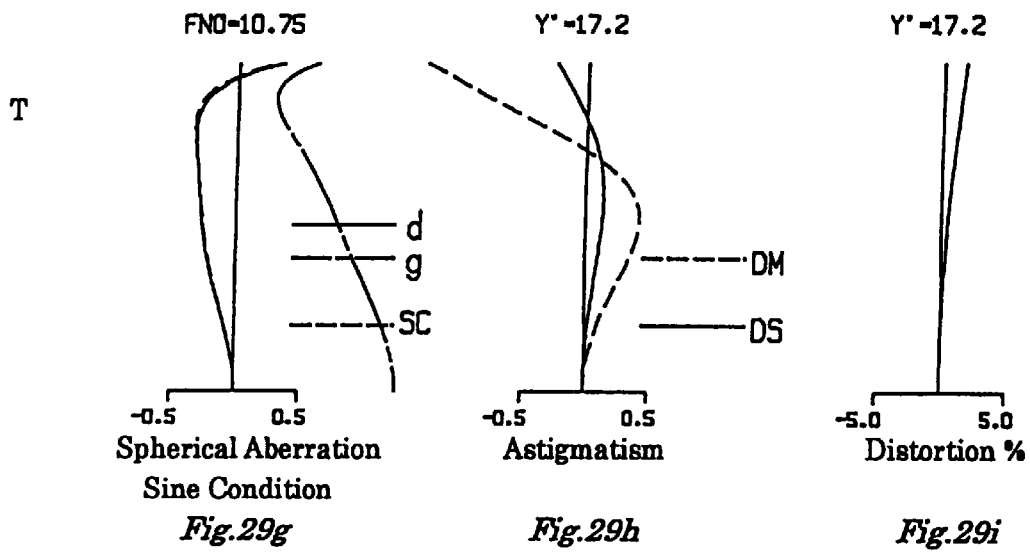

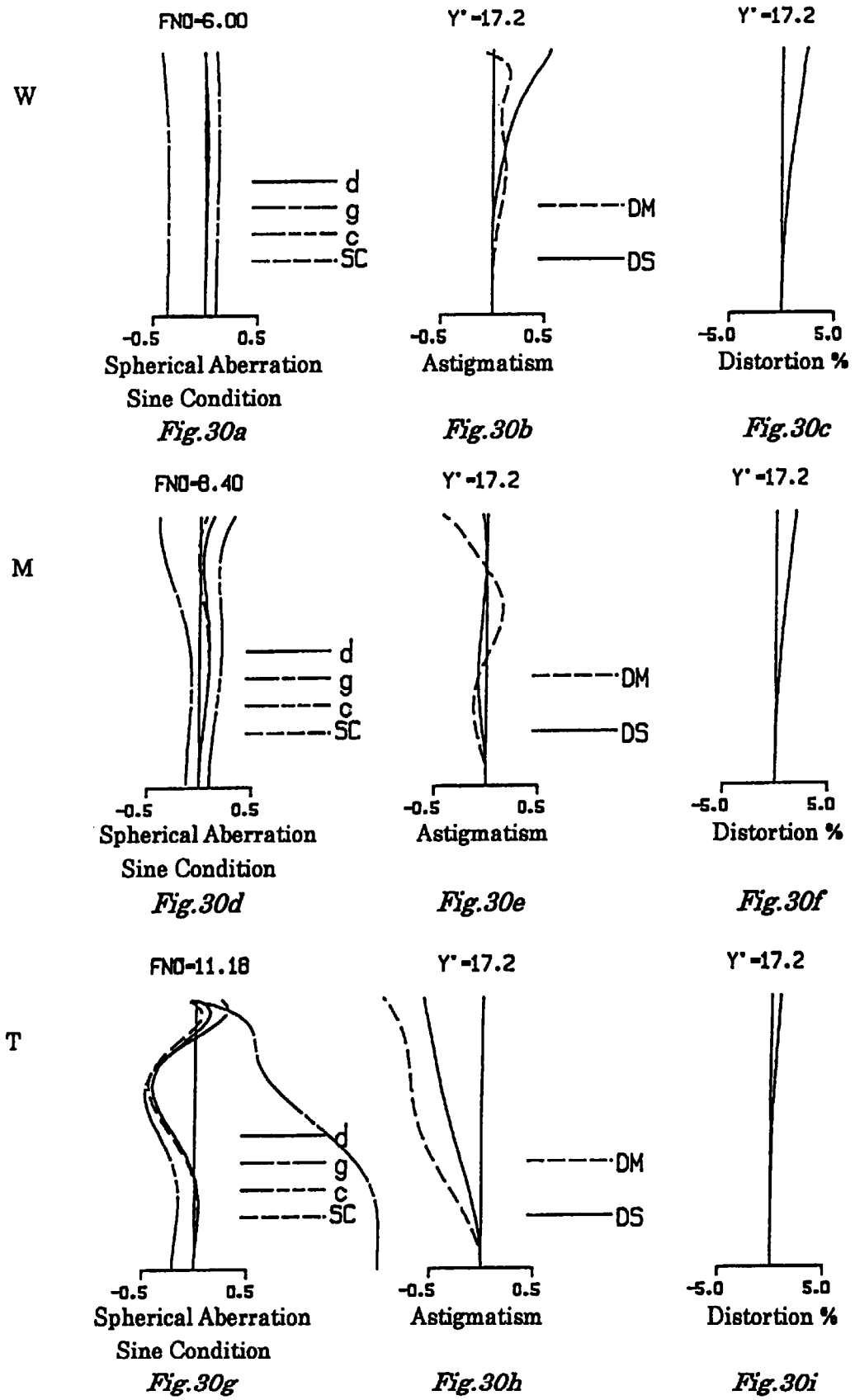

ZOOM LENS SYSTEM

RELATED CROSS-REFERENCED APPLICATIONS

This application is based on Application Nos. 10-100898, 10-158913, 11-31537, and 11-31538 filed in Japan, the contents of which are hereby incorporated by reference.

FIELD OF THE INVENTION

The present invention relates to a zoom lens system, and specifically relates to a compact wide-angle zoom lens system suitable, for example, as a photographic lens for a lens shutter camera.

DESCRIPTION OF THE RELATED ART

Various conventional zoom lens system for lens shutter cameras have been proposed comprising three lens units of positive-positive-negative lens units to achieve high variable magnification (Japanese Laid-Open Patent Application Nos. 4-303809, 4-338910, 8-152559, 8-179215). Recently, zoom lens systems have been proposed with the object of providing a high variable magnification and compact lens system constructed of fewer lens units (Japanese Laid-Open Patent Application Nos. 4-260016, 5-188296, 8-179215).

The zoom lens systems disclosed in Japanese Laid-Open Patent Application Nos. 4-303809, 4-338910, 8-152559, and 8-179215 have zoom ratios of 3× and higher, and are effective constructions from the perspective of high variable magnification. However, these lens constructions invariably use seven or more lens units, and cannot be said to provide adequate performance from the perspective of use of fewer lens units and compactness. The zoom lens systems disclosed in Japanese Laid-Open Patent Application Nos. 4-260016, 5-188296 and 8-179215 are constructed of fewer lens units, and provide adequate performance from the perspective of reducing the number of lens units and compactness. In these systems, however, the zoom ratio is approximately 1.5× to 2×, which cannot be said to be a high variable magnification.

From the perspective of cost reduction, a zoom lens system may be effectively realized using plastic lens units to construct the zoom lens. In a zoom lens systems used in lens shutter cameras, however, the effective use of plastic lens units is not known relative to a high variable magnification zoom lens system comprising three lens units of positive-positive-negative lens units with a zoom ratio of 3× and higher.

In the zoom lens systems of the aforesaid disclosures, attempting to reduce the overall length of the system and reduce the number of lens units to attain greater compactness increases the optical power of each lens surface and generates greater aberration by each lens surface. Although it is possible to correct spherical aberration and coma among the generated aberrations by providing an aspherical lens surface, chromatic aberration is not correctable by an aspherical lens surface and is difficult to correct directly. Accordingly, correction of chromatic aberration is extremely difficult in conventional zoom lens systems even when the number of lens units is reduced to achieve greater compactness.

SUMMARY OF THE INVENTION

An object of the present invention is to provide an improved zoom lens system.

A further object of the present invention is to provide a compact high variable magnification zoom lens system using few lens units.

These objects are attained by a zoom lens system comprising, from the object side, a first lens unit having a positive optical power, a second lens unit having a positive optical power and provided at the image side of the first lens unit with a first variable air space between the first and second lens units and a third lens unit having a negative optical power and provided at the image side of the second lens unit with a second variable air space between the second and third lens units, wherein a zooming operation is performed by varying the first and second air spaces, and wherein the zooming fulfills the following condition:

$$1.7 < \beta 3W < 2.0$$

where $\beta 3W$ represents a lateral magnification of the third lens unit in a shortest focal length condition.

These objects are further attained by a zoom lens system comprising, from the object side, a first lens unit having a positive optical power, a second lens unit having a positive optical power and provided at the image side of the first lens unit with a first variable air space between the first and second lens units, and a third lens unit having a negative optical power and provided at the image side of the second lens unit with a second variable air space between the second and third lens units, wherein a zooming operation is performed by varying the first and second air spaces, and wherein the zooming fulfills the following conditions:

$$1.00 < TLW/Y' < 1.75$$

$$-0.8 < f3/fW < -0.4$$

where

TLW represents a total length in the shortest focal length condition (the total length is defined as a distance between a summit of a most object surface of the zoom lens system and an image plane), Y' represents a maximum image height, f3 represents a focal length of the third lens unit, and fW represents a entire focal length in the shortest length condition.

These objects are further attained by a zoom lens system comprising, from the object side, a first lens unit having a positive optical power and a second lens unit having a positive optical power and provided at the image side of the first lens unit with a first variable air space between the first and second lens units, and a third lens unit having a negative optical power and provided at the image side of the second lens unit with a second variable air space between the second and third lens units, wherein a zooming operation is performed by varying the first and second air spaces, and wherein the zooming fulfills the following conditions:

$$1.00 < TLW/Y' < 1.75$$

$$1.8 < fT/fW < 5.0$$

where

TLW represents a total length in the shortest focal length condition (the total length is defined as a distance between a summit of a most object surface of the zoom lens system and an image plane), Y' represents a maximum image height, fT represents a entire focal length in a longest focal length condition, and fW represents a entire focal length in the shortest focal length condition.

These objects are further attained by a zoom lens system comprising, from the object side, a first lens unit having a positive optical power and including a first resin lens unit; a second lens unit having a positive optical power and provided at the image side of the first lens unit with a first variable air space between the first and second lens units, and a third lens unit having a negative optical power and provided at the image side of the second lens unit with a second variable air space between the second and third lens units, the third lens unit including a second resin lens unit, wherein a zooming operation is performed by varying the first and second air spaces.

These objects are further attained by a zoom lens system comprising, from the object side, a first lens unit having a positive optical power and including a resin lens unit; a second lens unit having a positive optical power and provided at the image side of the first lens unit with a first variable air space between the first and second lens units, and a third lens unit having a negative optical power and provided at the image side of the second lens unit with a second variable air space between the second and third lens units, wherein a zooming operation is performed by varying the first and second air spaces, and wherein the zoom lens system fulfills the following condition:

$$1.00 < TLW/Y' < 1.75$$

where

TLW represents a total length in the shortest focal length condition (the total length is defined as a distance between a summit of a most object side surface of the zoom lens system and an image plane), and Y' represents a maximum image height.

These objects are further attained by a zoom lens system comprising, from the object side, a first lens unit having a positive optical power; a second lens unit having a positive optical power and provided at the image side of the first lens unit with a first variable air space between the first and second lens units, and a third lens unit having a negative optical power and provided at the image side of the second lens unit with a second variable air space between the second and third lens units, the third lens unit including a resin lens unit, wherein a zooming operation is performed by varying the first and second air spaces, and wherein the zoom lens system fulfills the following condition:

$$1.00 < TLW/Y' < 1.75$$

where

TLW represents a total length in the shortest focal length condition (the total length is defined as a distance between a summit of a most object side surface of the zoom lens system and an image plane), and Y' represents a maximum image height.

These objects are further attained by a zoom lens system having three or more lens units including at least one positive lens unit and at least one negative lens unit, wherein a zooming operation is performed by varying air spaces between the lens units, and wherein at least either the positive lens unit or negative lens unit consists of single lens unit, wherein the following conditions are fulfilled:

$$-0.0020 < Lt < 0.0020$$

$$0.02 < |Lgp| < 0.20$$

$$0.02 < |Lgn| < 0.20$$

$$0.60 < |Lgp/Lgn| < 1.40$$

where

Lt represents an axial chromatic aberration coefficient of the entire zoom lens system in a longest focal length condition with the entire focal length of the zoom lens system as a normalized unit, Lgp represents an axial chromatic aberration coefficient of the positive lens unit with the entire focal length of the zoom lens system as a normalized unit, and Lgn represents an axial chromatic aberration coefficient of the negative lens unit with the entire focal length of the zoom lens system as a normalized unit.

These objects are further attained by a zoom lens system having three or more lens units including at least one positive lens unit and at least one negative lens unit, wherein a zooming operation is performed by varying air spaces between the lens units, and wherein at least either the positive lens unit or negative lens unit consists of single lens unit, wherein the following conditions are fulfilled:

$$0.50 < fp/fW < 1.00$$

$$-0.70 < fn/fW < -0.40$$

$$0.60 < |Lgp/Lgn| < 1.40$$

where fp represents a focal length of the positive lens unit, fn represents a focal length of the negative lens unit, fW represents a entire focal length in the shortest focal length condition, Lgp represents an axial chromatic aberration coefficient of the positive lens unit with the entire focal length of the zoom lens system as a normalized unit, and Lgn represents an axial chromatic aberration coefficient of the negative lens unit with the entire focal length of the zoom lens system as a normalized unit.

The invention itself, together with further objects and attendant advantages will be best understood by reference to the following detailed description taken in conjunction with the accompanying drawings.

BRIEF DESCRIPTION OF THE DRAWINGS

FIG. 1 is a lens layout diagram showing a first embodiment of the zoom lens system in the shortest focal length condition;

FIG. 2 is a lens layout diagram showing a second embodiment of the zoom lens system in the shortest focal length condition;

FIG. 3 is a lens layout diagram showing a third embodiment of the zoom lens system in the shortest focal length condition;

FIG. 5 is a lens layout diagram showing a fifth embodiment of the zoom lens system in the shortest focal length condition;

FIG. 6 is a lens layout diagram showing a sixth embodiment of the zoom lens system in the shortest focal length condition;

FIG. 7 is a lens layout diagram showing a seventh embodiment of the zoom lens system in the shortest focal length condition;

FIGS. 8a~8c are aberration diagrams of aberration in the shortest focal length condition of the zoom lens system of the first embodiment, with 8*a* showing spherical aberration and sine condition, 8*b* showing astigmatism, and 8*c* showing distortion;

FIGS. 8*d*~8*f* are aberration diagrams of aberration in the intermediate focal length condition of the zoom lens system of the first embodiment, with 8*d* showing spherical aberration and sine condition, 8*e* showing astigmatism, and 8*f* showing distortion;

FIGS. 8*g*~8*i* are aberration diagrams of aberration in the longest focal length condition of the zoom lens system of the first embodiment, with 8*g* showing spherical aberration and sine condition, 8*h* showing astigmatism, and 8*i* showing distortion;

FIGS. 9*a*~9*c* are aberration diagrams of aberration in the shortest focal length condition of the zoom lens system of the second embodiment, with 9*a* showing spherical aberration and sine condition, 9*b* showing astigmatism, and 9*c* showing distortion;

FIGS. 9*d*~9*f* are aberration diagrams of aberration in the intermediate focal length condition of the zoom lens system of the second embodiment, with 9*d* showing spherical aberration and sine condition, 9*e* showing astigmatism, and 9*f* showing distortion;

FIGS. 9*g*~9*i* are aberration diagrams of aberration in the longest focal length condition of the zoom lens system of the second embodiment, with 9*g* showing spherical aberration and sine condition, 9*h* showing astigmatism, and 9*i* showing distortion;

FIGS. 10*a*~10*c* are aberration diagrams of aberration in the shortest focal length condition of the zoom lens system of the third embodiment, with 10*a* showing spherical aberration and sine condition, 10*b* showing astigmatism, and 10*c* showing distortion;

FIGS. 10*d*~10*f* are aberration diagrams of aberration in the intermediate focal length condition of the zoom lens system of the third embodiment, with 10*d* showing spherical aberration and sine condition, 10*e* showing astigmatism, and 10*f* showing distortion;

FIGS. 10*g*~10*i* are aberration diagrams of aberration in the longest focal length condition of the zoom lens system of the third embodiment, with 10*g* showing spherical aberration and sine condition, 10*h* showing astigmatism, and 10*i* showing distortion;

FIGS. 12*a*~12*c* are aberration diagrams of aberration in the shortest focal length condition of the zoom lens system of the fifth embodiment, with 12*a* showing spherical aberration and sine condition, 12*b* showing astigmatism, and 12*c* showing distortion;

FIGS. 12*d*~12*f* are aberration diagrams of aberration in the intermediate focal length condition of the zoom lens system of the fifth embodiment, with 12*d* showing spherical aberration and sine condition, 12*e* showing astigmatism, and 12*f* showing distortion;

FIGS. 12*g*~12*i* are aberration diagrams of aberration in the longest focal length condition of the zoom lens system of the fifth embodiment, with 12*g* showing spherical aberration and sine condition, 12*h* showing astigmatism, and 12*i* showing distortion;

FIGS. 13*a*~13*c* are aberration diagrams of aberration in the shortest focal length condition of the zoom lens system of the sixth embodiment, with 13*a* showing spherical aberration and sine condition, 13*b* showing astigmatism, and 13*c* showing distortion;

FIGS. 13*d*~13*f* are aberration diagrams of aberration in the intermediate focal length condition of the zoom lens system of the sixth embodiment, with 13*d* showing spherical aberration and sine condition, 13*e* showing astigmatism, and 13*f* showing distortion;

FIGS. 13*g*~13*i* are aberration diagrams of aberration in the longest focal length condition of the zoom lens system of the sixth embodiment, with 13*g* showing spherical aberration and sine condition, 13*h* showing astigmatism, and 13*i* showing distortion;

FIGS. 27a~27c are aberration diagrams of aberration in the shortest focal length condition of the zoom lens system of the twelfth embodiment, with 27a showing spherical aberration and sine condition, 27b showing astigmatism, and 27c showing distortion;

FIGS. 27d~27f are aberration diagrams of aberration in the intermediate focal length condition of the zoom lens system of the twelfth embodiment, with 27d showing spherical aberration and sine condition, 27e showing astigmatism, and 27f showing distortion;

FIGS. 27g~27i are aberration diagrams of aberration in the longest focal length condition of the zoom lens system of the twelfth embodiment, with 27g showing spherical aberration and sine condition, 27h showing astigmatism, and 27i showing distortion;

FIGS. 28a~28c are aberration diagrams of aberration in the shortest focal length condition of the zoom lens system of the thirteenth embodiment, with 28a showing spherical aberration and sine condition, 28b showing astigmatism, and 28c showing distortion;

FIGS. 28d~28f are aberration diagrams of aberration in the intermediate focal length condition of the zoom lens system of the thirteenth embodiment, with 28d showing spherical aberration and sine condition, 28e showing astigmatism, and 28f showing distortion;

FIGS. 28g~28i are aberration diagrams of aberration in the longest focal length condition of the zoom lens system of the thirteenth embodiment, with 28g showing spherical aberration and sine condition, 28h showing astigmatism, and 28i showing distortion;

FIGS. 29a~29c are aberration diagrams of aberration in the shortest focal length condition of the zoom lens system of the fourteenth embodiment, with 29a showing spherical aberration and sine condition, 29b showing astigmatism, and 29c showing distortion;

FIGS. 29d~29f are aberration diagrams of aberration in the intermediate focal length condition of the zoom lens system of the fourteenth embodiment, with 29d showing spherical aberration and sine condition, 29e showing astigmatism, and 29f showing distortion;

FIGS. 29g~29i are aberration diagrams of aberration in the longest focal length condition of the zoom lens system of the fourteenth embodiment, with 29g showing spherical aberration and sine condition, 29h showing astigmatism, and 29i showing distortion;

FIGS. 30a~30c are aberration diagrams of aberration in the shortest focal length condition of the zoom lens system of the fifteenth embodiment, with 30a showing spherical aberration and sine condition, 30b showing astigmatism, and 30c showing distortion;

FIGS. 30d~30f are aberration diagrams of aberration in the intermediate focal length condition of the zoom lens system of the fifteenth embodiment, with 30d showing spherical aberration and sine condition, 30e showing astigmatism, and 30f showing distortion; and FIGS. 30g~30i are aberration diagrams of aberration in the longest focal length condition of the zoom lens system of the fifteenth embodiment, with 30g showing spherical aberration and sine condition, 30h showing astigmatism, and 30i showing distortion.

In the following description, like parts are designated by like reference numbers throughout the several drawings.

DETAILED DESCRIPTION OF THE PREFERRED EMBODIMENTS

The preferred embodiments of the zoom lens system of the present invention are described hereinafter with reference to the accompanying drawings.

Parameter-optimized Embodiments

Figure 4:
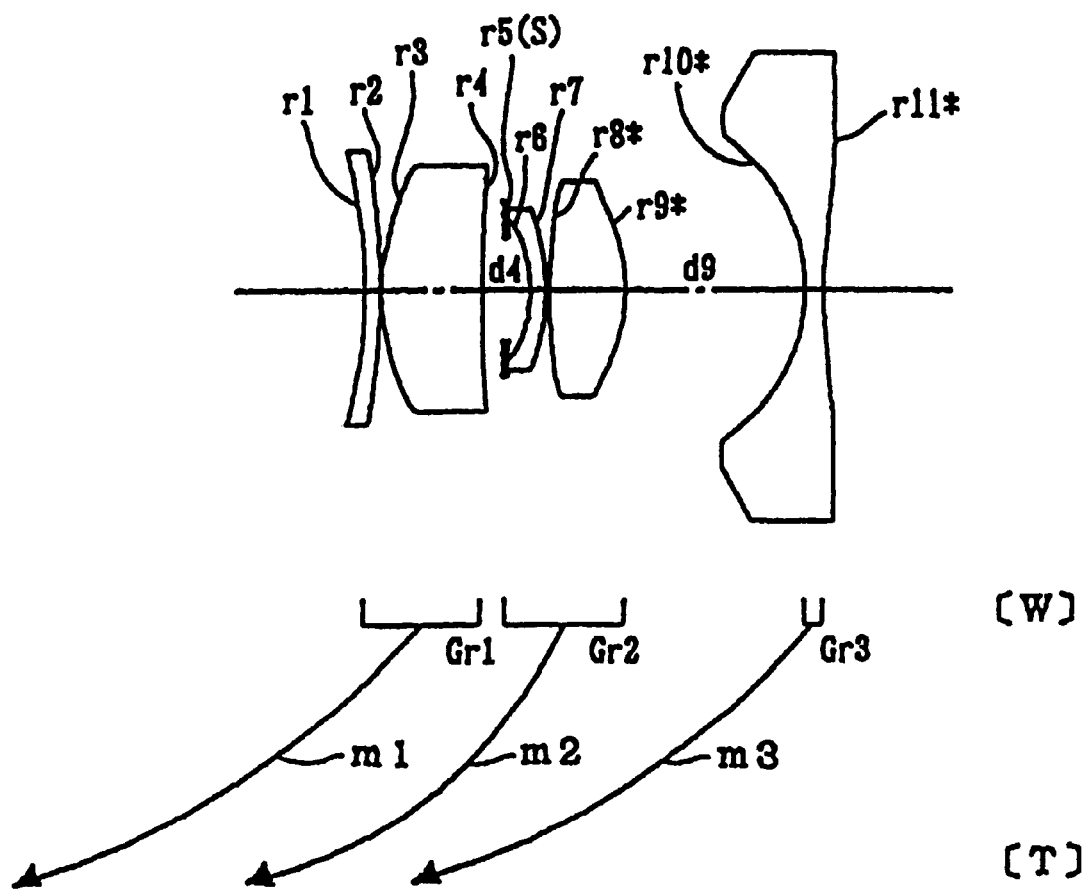
FIG. 4 is a lens layout diagram showing a fourth embodiment of the zoom lens system in the shortest focal length condition.

FIGS. 1 through 7 lens show diagrams of the embodiments of the zoom lenses shown in FIGS. 1 through 7, and show the lens arrangements in the shortest focal length condition (wide angle)[W]. The arrows mj (where j=1, 2, 3)

in the lens layout diagrams indicate the movement of the j unit (Gr1) when zooming from the shortest focal length condition (wide angle end) to the longest focal length condition (telephoto end). In each lens layout diagram, surfaces designated by the reference symbol ri (i=1, 2, 3, ...) are the No. ith surface counting from the object side, and surfaces with an asterisk (*) appended are aspherical surfaces. The axial distance designated by the reference symbol di (i=1, 2, 3, ...) are the No. ith distance counting from the object side, and are unit distances that change during zooming.

The first through seventh embodiments are zoom lens systems comprising three lens units including sequentially from the object side a first lens unit Gr1 having positive optical power, a second lens unit Gr2 having positive optical power, and a third lens unit Gr3 having negative optical power. In each of these embodiments a diaphragm S which moves together with the second lens unit Gr2 is disposed between the first lens unit Gr1 and the second lens unit Gr2.

In the first and second embodiments, each lens unit is constructed sequentially from the object side as described below. The first lens unit Gr1 comprises a negative meniscus lens element with a concave surface on the object side, and a biconvex positive lens element. The second lens unit Gr2 comprises a negative meniscus lens element with a concave surface on the object side, and a biconvex positive lens element (bi-aspherical surfaces). The third lens unit Gr3 comprises a biconcave negative lens element (bi-aspherical surfaces).

In the third embodiment, each lens unit is constructed sequentially from the object side as described below. The first lens unit Gr1 comprises a negative meniscus lens element with a concave surface on the object side, and a positive meniscus lens element with a convex surface on the object side. The second lens unit comprises a biconvex positive lens element, and a positive meniscus lens element with a convex surface on the image side (bi-aspherical surfaces). The third lens unit Gr3 comprises a biconcave negative lens element (bi-aspherical surfaces).

In the fourth embodiment, each lens unit is constructed sequentially from the object side as described below. The first lens unit Gr1 comprises a negative meniscus lens element with a concave surface on the object side, and a positive meniscus lens element on the object side. The second lens unit Gr2 comprises a concave negative meniscus lens element with a convex surface on the object side, and a biconvex positive lens element (bi-aspherical surfaces). The third lens unit Gr3 comprises a biconcave negative lens element (bi-aspherical surfaces).

In the fifth and sixth embodiments, each lens unit is constructed sequentially from the object side as described below. The first lens unit Gr1 comprises a negative meniscus lens element with a concave surface on the object side, and a biconvex positive lens element. The second lens unit Gr2 comprises a negative meniscus lens element with a concave surface on the object side, and a biconvex positive lens element (bi-aspherical surfaces). The third lens unit Gr3 comprises a biconcave negative lens element (bi-aspherical surfaces).

In the seventh embodiment, each lens unit is constructed sequentially from the object side as described below. The first lens unit Gr1 comprises a negative meniscus lens element with a concave surface on the object side, and a positive meniscus lens element with a convex surface on the object side. The second lens unit capital Gr2 comprises a negative meniscus lens element with a concave surface on the object side (bi-aspherical surfaces), and a positive meniscus lens element with a concave surface on the image side. The third lens unit Gr3 comprises a biconcave negative lens element (bi-aspherical surfaces).

The fourth embodiment is constructed so as to satisfy conditional equation (1) below.

$$1.7 < \beta 3W < 2.0 \tag{1}$$

where $\beta 3W$ represents a lateral magnification of the third lens unit in a shortest focal length condition.

Conditional equation (1) stipulates the lateral magnification $\beta 3W$ desirable for the third lens unit Gr3 in the shortest focal length condition (wide angle) [W]. If the lateral magnification $\beta 3W$ is set at a suitable value so as to satisfy the conditional equation (1), the zoom lens system can be made more compact and error sensitivity is reduced so as to provide efficient aberration correction. When the upper limit of the conditional equation (1) is exceeded, a desired compactness cannot be achieved due to the large amount of travel of the third lens unit Gr3. Conversely, when the lower limit of the conditional equation (1) is exceeded, the optical power of the third lens unit Gr3 becomes excessive, so as to make it undesirably difficult to maintain a balance between aberration correction and error sensitivity.

The fourth embodiment is also constructed so as to satisfy the conditional equation (2) below.

$$0.40 < LBW/Y' < 0.71 \tag{2}$$

where

LBW represents a lens back length in the shortest focal length condition (the lens back length is defined as a distance between a summit of a most image side surface of the zoom lens system and an image plane), and Y' represents a maximum image height.

The conditional equation (2) stipulates a desired lens back length LBW in the shortest focal length condition (wide angle) [W] by standardization by the maximum image height (½ the maximum diagonal length of the image plane). If conditional equation (2) is satisfied, the zoom lens system can be made more compact while assuring sufficient performance. In particular, the back lens diameter which greatly affects the total size of the camera can be reduced. When the upper limit of the conditional equation (2) is exceeded, aberration correction becomes difficult due to the extreme optical power of the lens units. Conversely, when the lower limit of conditional equation (2) is exceeded, a desired compactness cannot be achieved due to the overly large back lens diameter of the lens system.

If conditional equations (1) and (2) are satisfied, it is possible to achieve greater compactness and high variable magnification with fewer lens units in the zoom lens system even though the back focus is longer. In the aforesaid embodiments, conditional equations (3) and (4) are satisfied to achieve greater compactness.

It is desirable to satisfy conditional equation (3) to achieve greater compactness in the positive-positive-negative three units zoom system.

$$1.8 < fT/fW < 5.0 \tag{3}$$

where fT represents a entire focal length in a longest focal length condition, and fW represents a entire focal length in the shortest focal length condition.

Conditional equation (3) stipulates a desirable total length in the shortest focal length condition (wide angle) [W], and when this condition is satisfied, compactness can be achieved while assuring sufficient performance. When the upper limit of conditional equation (3) is exceeded, a desired compactness cannot be achieved to the excessive total length of the lens system. Conversely, when the lower limit of conditional equation (3) is exceeded, aberration correction becomes difficult due to the excessive optical power of the lens units.

It is further desirable that the third lens unit Gr3 satisfies the conditional equation (4) below to achieve greater compactness in the positive-positive-negative three unit zoom system.

$$-0.8 < f3/fW < -0.4 \quad (4)$$

where f3 represents the focal length of the third lens unit, and fW represents the total system focal length in the shortest focal length condition (wide angle end).

Conditional equation (4) stipulates the desired optical power of the third lens unit Gr3, if the optical power of the third lens unit Gr3 is suitably set so as to satisfy the conditional equation (4), greater compactness can be achieved while assuring sufficient performance. When the upper limit of conditional equation for it is exceeded, aberration correction becomes difficult due to the excessive optical power of the third lens unit Gr3. Conversely, when the lower limit of conditional equation (4) is exceeded, a desired compactness in the diameter direction cannot be achieved due to the increase in the lens diameter of the third lens unit Gr3.

It is further desirable in each the aforesaid embodiments that each lens unit comprise two or fewer lenses. Excellent correction of chromatic aberration is required for each lens unit so as to correct the chromatic aberration of the entire system, and, therefore, at least two lens units are required, If three or more lens units are used, more efficient chromatic aberration correction can be attained, but greater compactness cannot be attained due to the increase in size. Accordingly, each lens unit may comprise two lenses, but two lenses are not necessarily required because it is possible to correct chromatic aberration even with a single lens unit if an aspherical surface lens, refractive distribution type lens, or a diffraction grating or the like is used.

In the aforesaid embodiments, the second lens unit Gr2 and the third lens unit Gr3 have at least one aspherical surface together. When the optical powers of the second lens unit Gr2 and the third lens unit Gr3 are increased due to greater compactness, there is an increase in error sensitivity in the second lens unit Gr2 and the third lens unit Gr3 which prevents the attainment of the design performance, and requires adjustment during the actual manufacturing process. If an aspherical surface is used in the second lens unit Gr2 and the third lens unit Gr3 as in the aforesaid embodiments, it is possible to achieve excellent balance between aberration correction and error sensitivity in each lens unit.

It is desirable that the aspherical surface used in the second lens unit Gr2 satisfies the conditional equation (5a) below, and it is further desirable that the aspherical lens unit used in the third lens unit Gr3 satisfies the conditional equation (5b) below.

$$-0.05 < \phi 2*(N'-N)(d/dy)\{x(y)-x0(y)\} < 0 \quad (5a)$$

$$-0.05 < \phi 3*(N'-N)(d/dy)\{x(y)-x0(y)\} < 0 \quad (5b)$$

where $\phi 2$ represents the optical power of the second lens unit Gr2, $\phi 3$ represents the optical power of the third lens unit Gr3, N represents the refractive index of the medium on the object side of the aspherical surface, N' represents the refractive index of the medium on the image side of the aspherical surface, x(y) represents the surface shape of the aspherical surface, and x0(y) represents the reference spherical shape of the aspherical surface.

The values x(y) and x0(y) in the conditional equations (5a) and (5b) are respectively expressed in equations (AS) and (AE) below.

$$x(y) = \{C0*y^2\}/\{1+\sqrt{(1-\epsilon*C0^{2}*y^2)}\} + \Sigma(Ai*y^i) \quad (AS)$$

$$x0(y) = \{C0*y^2\}/\{1+\sqrt{(1-C0^{2}*y^2)}\} \quad (AE)$$

where y represents the height in a direction perpendicular to the optical axis,

C0 represents the curvature of the reference spherical surface (i.e., the reference curvature of the aspherical surface), $\epsilon$ represents a secondary curvature parameter, and Ai represents the No. ith aspherical surface coefficient.

When the upper limits of equations (5a) and (5b) are exceeded, it becomes difficult to correct aberration (particularly correction of distortion) particularly in the shortest focal length condition (wide angle) [W]. Conversely, when the lower limit of equations 5a and 5b are exceeded, it becomes difficult to correct spherical aberration and coma in the longest focal length condition (telephoto end) [T].

In reducing error sensitivity, the tertiary spherical aberration coefficient SA and the coma coefficient CM are closely related to sensitivity. When these coefficients are restricted to suitable values, there is an advantageous reduction in error sensitivity. Particularly when restricting the axial coma error sensitivity of the units nearest the image side, it is necessary to restrict the spherical aberration coefficient of these units, and furthermore, when restricting image plane error sensitivity, it is necessary to restrict the coma coefficient of these units. Since the influence of the aspherical surface basically only moves the astigmatism coefficient, if the aspherical surface is suitably set, the spherical aberration coefficient of each lens unit is reduced and other aberration can also be suitably restricted.

It is desirable that the third lens unit Gr3 comprise a single bi-aspherical lens unit as in the aforesaid embodiments. Although it is desirable that the third lens unit Gr3 is constructed of a positive and a negative lens from the perspective of aberration correction, a construction of a single negative lens is advantageous from the perspective of compactness. However, it is difficult to correct aberration and reduce error sensitivity effectively with a single lens unit. If an aspherical surface satisfying conditional equation (5b) is used, excellent aberration correction can be obtained, and if bilateral aspherical surfaces are used, it is possible to maintain excellent balance between the aberration correction and error sensitivity reduction.

In order to achieve even greater compactness in the positive-positive-negative three units zoom system, it is desirable that the third lens unit Gr3 satisfies conditional equation (6) below. It is even more desirable that the third lens unit Gr3 satisfies conditional equation (6) with a construction of a single biconcave negative lens element.

$$0.5 < CR31/fW < 2.6 \quad (6)$$

where

CR31 represents the radius of curvature of the surface nearest the image side of the third lens unit Gr3, and fW represents the focal length of the total system in the shortest focal length condition (wide angle end) [W].

Conditional equation (6) stipulates the ratio between the radius of curvature CR31 of the surface nearest the image side of the third lens unit Gr3, and the focal length fW the total system in the shortest focal length condition (wide angle end) [W]. The third lens unit Gr3 develops excessive optical power due to the compactness, with a concomitant increase in error sensitivity. To reduce error sensitivity while maintaining the high optical power of the third lens unit Gr3, aberration must be suitably corrected in the third lens unit Gr3. It is particularly necessary to reduce the tertiary coma coefficient and the tertiary spherical aberration coefficient, within a suitable range which satisfies conditional equation 6. If the upper limit of conditional equation (6) is exceeded, the curvature is lessened, and the curvature of the opposite side must be increased to maintain the optical power. For this reason, it is difficult to correct a large spherical aberration by shifting to the under side. Conversely, if the lower limit of conditional equation 6 is exceeded, it is difficult to correct spherical aberration of this surface by shifting to the under side.

From the perspective of the variable magnification range of the aforesaid embodiments, it is desirable that the conditional equation (7) below is satisfied and even more desirable that the conditional equation (7') below is satisfied. Conditional equations (7) and (7') stipulate the zoom ratio, and stipulate a suitable variable magnification range in a positive-positive-negative three unit zoom system.

$$1.8 < fT/fW < 5.0 \quad (7)$$

$$2.2 < fT/fW < 5.0 \quad (7')$$

where fT represents the total system focal length in the longest focal length condition (telephoto end), and fW represents the total system focal length in the shortest focal length condition (wide angle end).

It is desirable that the surface nearest the object side is a concave surface on the object side. If the surface nearest the object side is a concave surface on the object side, the lens back length can be maintained at a suitable size. Furthermore, aberration deterioration can be suppressed to a minimum limit because the off-axial light (particularly extra off-axial light) are rays without an angle at an early stage. This is particularly effective in correcting distortion in the shortest focal length condition (wide angle end) [W]. The positive optical power of the first lens unit Gr1 generates a positive distortion. Using a negative lens element on the side nearest the object side of the first lens unit Gr1 corrects this positive distortion, but suitable correction is also attained if a concave surface is provided on the surface nearest the object side.

It is desirable that total lens thickness satisfies conditional equation (8).

$$0.8 < DW/Y' < 1.5 \quad (8)$$

where

DW represents the total thickness (distance from the apex of the first surface to the image plane) in the shortest focal length condition (wide angle end) [W], and Y' represents the maximum image height.

Conditional equation (8) stipulates the optimum ratio between the total system thickness DW and the maximum image height Y'. When the upper limit of conditional equation (8) is exceeded, the total thickness becomes excessively large, and is undesirable from the perspective of compactness. When the lower limit of conditional equation (8) is exceeded, manufacture and assembly of the individual lenses becomes disadvantageously difficult.

The construction of the zoom lens system of the present invention is described hereinafter by way of specific examples with reference to the accompanying aberration diagrams.

In the construction data of each example, ri (i=1, 2, 3, ...) represents the radius of curvature of the No. ith surface counting from the object side, di (i=1, 2, 3, ...) represents the No. ith axial distance counting from the object side, Ni (i=1, 2, 3, ...) and vi (i=1, 2, 3, ...) represent the refractive index and Abbe number (vd) relative to the d-line of the No. ith lens element counting from the object side. In the construction data, the axial distance (variable distance) which changes during zooming is the on-axis empty space between lens units in the shortest focal length condition (wide angle end) [W], intermediate focal length condition [M], and longest focal length condition (telephoto end) [T]. The total system focal length f and F number FNO are represented together for each focal length condition [W], [M], [T].

Surfaces with an asterisk (*) symbol affixed to the radius of curvature ri are surfaces constructed as aspherical surfaces, as defined by the aforesaid equation (AS) which expresses the surface shape of the aspherical surface. Corresponding values of the conditional equations (5a) and (5b) relating to aspherical surface data and aspherical surface are shown together with other data, and corresponding value of other conditional equations are shown in the table.

TABLE 1

Embodiment 1 f = 23.20~43.80~87.80
FNO = 5.65~7.40~10.75

| [Radius of curvature] | [Axial distance] | [Refractive Index] | [Abbe number] |
|---|---|---|---|
| r1 = −14.440 | | | |
| | d1 = 0.80 | N1 = 1.739071 | v1 = 39.84 |
| r2 = −35.294 | | | |
| | d2 = 0.10 | | |
| r3 = 15.442 | | | |
| | d3 = 1.68 | N2 = 1.487490 | v2 = 70.44 |
| r4 = −20.778 | | | |
| | d4 = 1.30~5.51~7.97 | | |
| r5 = ∞ (Diaphragm S) | | | |
| | d5 = 1.39 | | |
| r6 = −7.074 | | | |
| | d6 = 0.80 | N3 = 1.500265 | v3 = 65.88 |
| r7 = −10.818 | | | |
| | d7 = 1.90 | | |
| r8* = 52.773 | | | |
| | d8 = 3.50 | N4 = 1.487490 | v4 = 70.44 |
| r9* = −7.134 | | | |
| | d9 = 6.61~3.28~1.08 | | |
| r10* = −10.116 | | | |
| | d10 = 1.00 | N5 = 1.527381 | v5 = 65.33 |
| r11* = 17.197 | | | |

TABLE 1-continued

[Aspherical data of 8th surface(r8)]

$\epsilon = 1.0000$
$A4 = -3.07526 \times 10^{-4}$
$A6 = 2.67429 \times 10^{-6}$
$A8 = -4.51586 \times 10^{-7}$
$A10 = 1.26442 \times 10^{-8}$
$A12 = -3.08881 \times 10^{-10}$

[Aspherical data of 9th surface (r9)]

$\epsilon = = 1.0000$
$A4 = 3.11796 \times 10^{-4}$
$A6 = 2.94967 \times 10^{-6}$
$A8 = -4.55110 \times 10^{-7}$
$A10 = 1.87649 \times 10^{-8}$
$A12 = -3.67084 \times 10^{-10}$

[Asphrical data of 10th surface (r10)]

$\epsilon = 1.4070$
$A4 = -6.48991 \times 10^{-5}$
$A6 = -2.52187 \times 10^{-6}$
$A8 = 3.72485 \times 10^{-7}$
$A10 = -1.06582 \times 10^{-8}$
$A12 = 1.09330 \times 10^{-10}$

[Aspherical data of 11th surface (r11)]

$\epsilon = 1.0000$
$A4 = -5.04042 \times 10^{-4}$
$A6 = 7.53848 \times 10^{-6}$
$A8 = -7.65779 \times 10^{-8}$
$A10 = 3.46654 \times 10^{-10}$
$A12 = -1.89580 \times 10^{-13}$

[Conditional equation (5a) values of 8th surface (r8)]

$y = 0.4787 \ldots \phi2.(N'-N).(d/dy).\{x(y)-x0(y)\} = -0.4144 \times 10^{-5}$
$y = 0.9575 \ldots \phi2.(N'-N).(d/dy).\{x(y)-x0(y)\} = -0.3293 \times 10^{-4}$
$y = 1.4362 \ldots \phi2.(N'-N).(d/dy).\{x(y)-x0(y)\} = -0.1105 \times 10^{-3}$
$y = 1.9150 \ldots \phi2.(N'-N).(d/dy).\{x(y)-x0(y)\} = -0.2626 \times 10^{-3}$
$y = 2.3937 \ldots \phi2.(N'-N).(d/dy).\{x(y)-x0(y)\} = -0.5224 \times 10^{-3}$
$y = 2.8724 \ldots \phi2.(N'-N).(d/dy).\{x(y)-x0(y)\} = -0.9412 \times 10^{-3}$
$y = 3.3512 \ldots \phi2.(N'-N).(d/dy).\{x(y)-x0(y)\} = -0.1605 \times 10^{-2}$
$y = 3.8299 \ldots \phi2.(N'-N).(d/dy).\{x(y)-x0(y)\} = -0.2672 \times 10^{-2}$
$y = 4.3087 \ldots \phi2.(N'-N).(d/dy).\{x(y)-x0(y)\} = -0.4454 \times 10^{-2}$
$y = 4.7874 \ldots \phi2.(N'-N).(d/dy).\{x(y)-x0(y)\} = -0.7637 \times 10^{-2}$

[Conditional equation (5a) values of 9th surface (r9)]

$y = 0.5395 \ldots \phi2.(N'-N).(d/dy).\{x(y)-x0(y)\} = -0.6054 \times 10^{-5}$
$y = 1.0790 \ldots \phi2.(N'-N).(d/dy).\{x(y)-x0(y)\} = -0.4886 \times 10^{-4}$
$y = 1.6186 \ldots \phi2.(N'-N).(d/dy).\{x(y)-x0(y)\} = -0.1660 \times 10^{-3}$
$y = 2.1581 \ldots \phi2.(N'-N).(d/dy).\{x(y)-x0(y)\} = -0.3923 \times 10^{-3}$
$y = 2.6976 \ldots \phi2.(N'-N).(d/dy).\{x(y)-x0(y)\} = -0.7514 \times 10^{-3}$
$y = 3.2371 \ldots \phi2.(N'-N).(d/dy).\{x(y)-x0(y)\} = -0.1249 \times 10^{-2}$
$y = 3.7767 \ldots \phi2.(N'-N).(d/dy).\{x(y)-x0(y)\} = -0.1859 \times 10^{-2}$
$y = 4.3162 \ldots \phi2.(N'-N).(d/dy).\{x(y)-x0(y)\} = -0.2466 \times 10^{-2}$
$y = 4.8557 \ldots \phi2.(N'-N).(d/dy).\{x(y)-x0(y)\} = -0.2604 \times 10^{-2}$
$y = 5.3952 \ldots \phi2.(N'-N).(d/dy).\{x(y)-x0(y)\} = -0.6919 \times 10^{-3}$

[Conditional equation (5a) values of 11th surface (r11)]

$y = 0.9148 \ldots \phi3.(N'-N).(d/dy).\{x(y)-x0(y)\} = -0.6698 \times 10^{-4}$
$y = 1.8295 \ldots \phi3.(N'-N).(d/dy).\{x(y)-x0(y)\} = -0.5068 \times 10^{-3}$
$y = 2.7443 \ldots \phi3.(N'-N).(d/dy).\{x(y)-x0(y)\} = -0.1562 \times 10^{-2}$
$y = 3.6591 \ldots \phi3.(N'-N).(d/dy).\{x(y)-x0(y)\} = -0.3276 \times 10^{-2}$
$y = 4.5738 \ldots \phi3.(N'-N).(d/dy).\{x(y)-x0(y)\} = -0.5529 \times 10^{-2}$
$y = 5.4886 \ldots \phi3.(N'-N).(d/dy).\{x(y)-x0(y)\} = -0.8164 \times 10^{-2}$
$y = 6.4034 \ldots \phi3.(N'-N).(d/dy).\{x(y)-x0(y)\} = -0.1113 \times 10^{-1}$
$y = 7.3181 \ldots \phi3.(N'-N).(d/dy).\{x(y)-x0(y)\} = -0.1451 \times 10^{-1}$
$y = 8.2329 \ldots \phi3.(N'-N).(d/dy).\{x(y)-x0(y)\} = -0.1810 \times 10^{-1}$
$y = 9.1477 \ldots \phi3.(N'-N).(d/dy).\{x(y)-x0(y)\} = -0.2036 \times 10^{-1}$

TABLE 2

Embodiment 2

$f = 23.20\sim43.80\sim65.80$
$FNO = 5.65\sim7.40\sim9.68$

| [Radius of curvature] | [Axial distance] | [Refractive Index] | [Abbe number] |
|---|---|---|---|
| r1 = -24.487 | | | |
| | d1 = 0.90 | N1 = 1.789039 | ν1 = 28.29 |
| r2 = -64.858 | | | |
| | d2 = 0.10 | | |
| r3 = 13.264 | | | |
| | d3 = 2.19 | N2 = 1.549370 | ν2 = 63.09 |
| r4 = -67.322 | | | |
| | d4 = 1.30~5.28~7.50 | | |
| r5 = ∞ (Diaphragm S) | | | |
| | d5 = 0.30 | | |
| r6 = -11.233 | | | |
| | d6 = 2.35 | N3 = 1.487490 | ν3 = 70.44 |
| r7 = -22.177 | | | |
| | d7 = 1.70 | | |
| r8* = 109.718 | | | |
| | d8 = 3.35 | N4 = 1.487490 | ν4 = 70.44 |
| r9* = -6.982 | | | |
| | d9 = 6.11~2.73~1.16 | | |
| r10* = -8.350 | | | |
| | d10 = 1.00 | N5 = 1.490959 | ν5 = 69.93 |
| r11* = 20.059 | | | |

[Aspherical data of 8th surface (r8)]

$\epsilon = 1.0000$
$A4 = -6.10573 \times 10^{-4}$
$A6 = -1.62954 \times 10^{-5}$
$A8 = 9.31807 \times 10^{-7}$
$A10 = -1.93524 \times 10^{-7}$
$A12 = 5.70399 \times 10^{-9}$

[Aspherical data of 9th surface (r9)]

$\epsilon = 1.0000$
$A4 = 1.85627 \times 10^{-4}$
$A6 = -1.35660 \times 10^{-5}$
$A8 = -4.64360 \times 10^{-7}$
$A10 = 1.25505 \times 10^{-8}$
$A12 = -7.65374 \times 10^{-10}$

[Aspherical data of 10th surface (r10)]

$\epsilon = 1.4022$
$A4 = 3.05796 \times 10^{-4}$
$A6 = -1.60300 \times 10^{-5}$
$A8 = 7.67961 \times 10^{-7}$
$A10 = -2.06933 \times 10^{-8}$
$A12 = 2.98322 \times 10^{-10}$

[Aspherical data of 11th surface (r11)]

$\epsilon = 1.0000$
$A4 = -3.35945 \times 10^{-4}$
$A6 = 2.68683 \times 10^{-6}$
$A8 = -8.29663 \times 10^{-9}$

[Conditional equation (5a) values of 8th surface (r8)]

$y = 0.4349 \ldots \phi2.(N'-N).(d/dy).\{x(y)-x0(y)\} = -0.6345 \times 10^{-5}$
$y = 0.8697 \ldots \phi2.(N'-N).(d/dy).\{x(y)-x0(y)\} = -0.5184 \times 10^{-4}$
$y = 1.3046 \ldots \phi2.(N'-N).(d/dy).\{x(y)-x0(y)\} = -0.1808 \times 10^{-3}$
$y = 1.7394 \ldots \phi2.(N'-N).(d/dy).\{x(y)-x0(y)\} = -0.4486 \times 10^{-3}$
$y = 2.1743 \ldots \phi2.(N'-N).(d/dy).\{x(y)-x0(y)\} = -0.9375 \times 10^{-3}$
$y = 2.6091 \ldots \phi2.(N'-N).(d/dy).\{x(y)-x0(y)\} = -0.1797 \times 10^{-2}$
$y = 3.0440 \ldots \phi2.(N'-N).(d/dy).\{x(y)-x0(y)\} = -0.3311 \times 10^{-2}$
$y = 3.4788 \ldots \phi2.(N'-N).(d/dy).\{x(y)-x0(y)\} = -0.5936 \times 10^{-2}$
$y = 3.9137 \ldots \phi2.(N'-N).(d/dy).\{x(y)-x0(y)\} = -0.1011 \times 10^{-1}$
$y = 4.3485 \ldots \phi2.(N'-N).(d/dy).\{x(y)-x0(y)\} = -0.1537 \times 10^{-1}$

[Conditional equation (5a) values of 10th surface (r10)]

$y = 0.6604 \ldots \phi3.(N'-N).(d/dy).\{x(y)-x0(y)\} = -0.9924 \times 10^{-5}$
$y = 1.3209 \ldots \phi3.(N'-N).(d/dy).\{x(y)-x0(y)\} = -0.6780 \times 10^{-4}$
$y = 1.9813 \ldots \phi3.(N'-N).(d/dy).\{x(y)-x0(y)\} = -0.1753 \times 10^{-3}$
$y = 2.6418 \ldots \phi3.(N'-N).(d/dy).\{x(y)-x0(y)\} = -0.2825 \times 10^{-3}$
$y = 3.3022 \ldots \phi3.(N'-N).(d/dy).\{x(y)-x0(y)\} = -0.3198 \times 10^{-3}$
$y = 3.9627 \ldots \phi3.(N'-N).(d/dy).\{x(y)-x0(y)\} = -0.2273 \times 10^{-3}$ TABLE 2-continued y = 4.6231 ... φ3.(N'-N).(d/dy).{x(y)-x0(y)} = -0.3480 × 10⁻⁴
y = 5.2836 ... φ3.(N'-N).(d/dy).{x(y)-x0(y)} = -0.3672 × 10⁻³
y = 5.9440 ... φ3.(N'-N).(d/dy).{x(y)-x0(y)} = -0.4092 × 10⁻²
y = 6.6045 ... φ3.(N'-N).(d/dy).{x(y)-x0(y)} = -0.1371 × 10⁻¹
[Conditional equation (5a) values of 11th surface (r11)]

y = 0.8983 ... φ3.(N'-N).(d/dy).{x(y)-x0(y)} = -0.3990 × 10⁻⁴
y = 1.7967 ... φ3.(N'-N).(d/dy).{x(y)-x0(y)} = -0.3100 × 10⁻³
y = 2.6950 ... φ3.(N'-N).(d/dy).{x(y)-x0(y)} = -0.9960 × 10⁻³
y = 3.5934 ... φ3.(N'-N).(d/dy).{x(y)-x0(y)} = -0.2201 × 10⁻²
y = 4.4917 ... φ3.(N'-N).(d/dy).{x(y)-x0(y)} = -0.3919 × 10⁻²
y = 5.3901 ... φ3.(N'-N).(d/dy).{x(y)-x0(y)} = -0.6033 × 10⁻²
y = 6.2884 ... φ3.(N'-N).(d/dy).{x(y)-x0(y)} = -0.8332 × 10⁻²
y = 7.1868 ... φ3.(N'-N).(d/dy).{x(y)-x0(y)} = -0.1057 × 10⁻¹
y = 8.0851 ... φ3.(N'-N).(d/dy).{x(y)-x0(y)} = -0.1254 × 10⁻¹
y = 8.9835 ... φ3.(N'-N).(d/dy).{x(y)-x0(y)} = -0.1424 × 10⁻¹

TABLE 3

Embodiment 3 f = 23.20~43.80~87.80
FNO = 5.65~7.60~10.75

| [Radius of curvature] | [Axial distance] | [Refractive Index] | [Abbe number] |
|---|---|---|---|
| r1 = -26.976 | | | |
| | d1 = 1.16 | N1 = 1.849316 | ν1 = 35.15 |
| r2 = -155.784 | | | |
| | d2 = 0.10 | | |
| r3 = 9.539 | | | |
| | d3 = 2.68 | N2 = 1.487490 | ν2 = 70.44 |
| r4 = 87.292 | | | |
| | d4 = 1.30~4.80~7.23 | | |
| r5 = ∞ (Diaphragm S) | | | |
| | d5 = 0.30 | | |
| r6 = 17.653 | | | |
| | d6 = 1.00 | N3 = 1.487490 | ν3 = 70.44 |
| r7 = -501.503 | | | |
| | d7 = 1.37 | | |
| r8* = -7.909 | | | |
| | d8 = 4.00 | N4 = 1.489733 | ν4 = 70.11 |
| r9* = -5.099 | | | |
| | d9 = 5.60~2.48~0.50 | | |
| r10* = -7.372 | | | |
| | d10 = 1.00 | N5 = 1.488620 | ν5 = 70.27 |
| r11* = 28.204 | | | |

[Aspherical data of 8th surface (r8)]

ε = 1.0000
A4 = -1.00105 × 10⁻³
A6 = -8.20597 × 10⁻⁶
A8 = -8.87075 × 10⁻⁷

[Aspherical data of 9th surface (r9)]

ε = 1.0000
A4 = 6.81194 × 10⁻⁴
A6 = 5.76885 × 10⁻⁸
A8 = 1.21103 × 10⁻⁶
A10 = -5.22516 × 10⁻⁸
A12 = 2.55387 × 10⁻⁹

[Aspherical data of 10th surface (r10)]

ε = 0.4036
A4 = -8.80750 × 10⁻⁸
A6 = -1.03748 × 10⁻⁵
A8 = 7.21087 × 10⁻⁷
A10 = -2.04853 × 10⁻⁸
A12 = 1.63552 × 10⁻¹⁰

[Aspherical data of 11th surface (r11)]

ε = 1.0000
A4 = -4.92660 × 10⁻⁴
A6 = 8.10285 × 10⁻⁶
A8 = -9.08402 × 10⁻⁸
A10 = 3.98813 × 10⁻¹⁰

TABLE 3-continued

[Conditional equation (5a) values of 8th surface (r8)]

y = 0.3429 ... φ2.(N'-N).(d/dy).{x(y)-x0(y)} = -0.5417 × 10⁻⁵
y = 0.6859 ... φ2.(N'-N).(d/dy).{x(y)-x0(y)} = -0.4354 × 10⁻⁴
y = 1.0288 ... φ2.(N'-N).(d/dy).{x(y)-x0(y)} = -0.1482 × 10⁻³
y = 1.3718 ... φ2.(N'-N).(d/dy).{x(y)-x0(y)} = -0.3564 × 10⁻³
y = 1.7147 ... φ2.(N'-N).(d/dy).{x(y)-x0(y)} = -0.7109 × 10⁻³
y = 2.0576 ... φ2.(N'-N).(d/dy).{x(y)-x0(y)} = -0.1266 × 10⁻²
y = 2.4006 ... φ2.(N'-N).(d/dy).{x(y)-x0(y)} = -0.2096 × 10⁻²
y = 2.7435 ... φ2.(N'-N).(d/dy).{x(y)-x0(y)} = -0.3304 × 10⁻²
y = 3.0865 ... φ2.(N'-N).(d/dy).{x(y)-x0(y)} = -0.5039 × 10⁻²
y = 3.4294 ... φ2.(N'-N).(d/dy).{x(y)-x0(y)} = -0.7517 × 10⁻²

[Conditional equation (5a) values of 9th surface (r9)]

y = 0.4460 ... φ2.(N'-N).(d/dy).{x(y)-x0(y)} = -0.8096 × 10⁻⁵
y = 0.8919 ... φ2.(N'-N).(d/dy).{x(y)-x0(y)} = -0.6490 × 10⁻⁴
y = 1.3379 ... φ2.(N'-N).(d/dy).{x(y)-x0(y)} = -0.2209 × 10⁻³
y = 1.7839 ... φ2.(N'-N).(d/dy).{x(y)-x0(y)} = -0.5343 × 10⁻³
y = 2.2298 ... φ2.(N'-N).(d/dy).{x(y)-x0(y)} = -0.1085 × 10⁻²
y = 2.6758 ... φ2.(N'-N).(d/dy).{x(y)-x0(y)} = -0.1997 × 10⁻²
y = 3.1218 ... φ2.(N'-N).(d/dy).{x(y)-x0(y)} = -0.3506 × 10⁻²
y = 3.5678 ... φ2.(N'-N).(d/dy).{x(y)-x0(y)} = -0.6123 × 10⁻²
y = 4.0137 ... φ2.(N'-N).(d/dy).{x(y)-x0(y)} = -0.1110 × 10⁻¹
y = 4.4597 ... φ2.(N'-N).(d/dy).{x(y)-x0(y)} = -0.2153 × 10⁻¹

[Conditional equation (5a) values of 10th surface (r10)]

y = 0.6161 ... φ3.(N'-N).(d/dy).{x(y)-x0(y)} = -0.6670 × 10⁻⁵
y = 1.2321 ... φ3.(N'-N).(d/dy).{x(y)-x0(y)} = -0.5011 × 10⁻⁴
y = 1.8482 ... φ3.(N'-N).(d/dy).{x(y)-x0(y)} = -0.1583 × 10⁻³
y = 2.4643 ... φ3.(N'-N).(d/dy).{x(y)-x0(y)} = -0.3692 × 10⁻³
y = 3.0803 ... φ3.(N'-N).(d/dy).{x(y)-x0(y)} = -0.7737 × 10⁻³
y = 3.6964 ... φ3.(N'-N).(d/dy).{x(y)-x0(y)} = -0.1537 × 10⁻²
y = 4.3125 ... φ3.(N'-N).(d/dy).{x(y)-x0(y)} = -0.2831 × 10⁻²
y = 4.9286 ... φ3.(N'-N).(d/dy).{x(y)-x0(y)} = -0.4664 × 10⁻²
y = 5.5446 ... φ3.(N'-N).(d/dy).{x(y)-x0(y)} = -0.6866 × 10⁻²
y = 6.1607 ... φ3.(N'-N).(d/dy).{x(y)-x0(y)} = -0.1037 × 10⁻¹

[Conditional equation (5a) values of 11th surface (r11)]

y = 0.8405 ... φ3.(N'-N).(d/dy).{x(y)-x0(y)} = -0.4742 × 10⁻⁴
y = 1.6811 ... φ3.(N'-N).(d/dy).{x(y)-x0(y)} = -0.3602 × 10⁻³
y = 2.5216 ... φ3.(N'-N).(d/dy).{x(y)-x0(y)} = -0.1117 × 10⁻²
y = 3.3621 ... φ3.(N'-N).(d/dy).{x(y)-x0(y)} = -0.2363 × 10⁻²
y = 4.2026 ... φ3.(N'-N).(d/dy).{x(y)-x0(y)} = -0.4030 × 10⁻²
y = 5.0432 ... φ3.(N'-N).(d/dy).{x(y)-x0(y)} = -0.6021 × 10⁻²
y = 5.8837 ... φ3.(N'-N).(d/dy).{x(y)-x0(y)} = -0.8339 × 10⁻²
y = 6.7242 ... φ3.(N'-N).(d/dy).{x(y)-x0(y)} = -0.1115 × 10⁻¹
y = 7.5647 ... φ3.(N'-N).(d/dy).{x(y)-x0(y)} = -0.1465 × 10⁻¹
y = 8.4053 ... φ3.(N'-N).(d/dy).{x(y)-x0(y)} = -0.1853 × 10⁻¹

TABLE 4

Embodiment 4 f = 23.20~43.80~87.80
FNO = 5.65~7.40~10.75

| [Radius of curvature] | [Axial distance] | [Refractive Index] | [Abbe number] |
|---|---|---|---|
| r1 = -27.003 | | | |
| | d1 = 0.80 | N1 = 1.835026 | ν1 = 23.53 |
| r2 = -39.968 | | | |
| | d2 = 0.10 | | |
| r3 = 12.788 | | | |
| | d3 = 5.26 | N2 = 1.487490 | ν2 = 70.44 |
| r4 = 79.382 | | | |
| | d4 = 1.30~6.99~11.06 | | |
| r5 = ∞ (Diaphragm S) | | | |
| | d5 = 1.26 | | |
| r6 = -7.080 | | | |
| | d6 = 0.80 | N3 = 1.487762 | ν3 = 70.40 |
| r7 = -11.830 | | | |
| | d7 = 0.20 | | |
| r8* = 35.353 | | | |
| | d8 = 4.03 | N4 = 1.487490 | ν4 = 70.44 |
| r9* = -8.487 | | | |
| | d9 = 9.45~4.35~0.755 | | |

TABLE 4-continued

| | | | |
|---|---|---|---|
| r10* = −9.916 | | | |
| | d10 = 1.00 | N5 = 1.487490 | ν5 = 70.44 |
| r11* = 25.022 | | | |

[Aspherical data of 8th surface (r8)]

$\epsilon = 1.0000$
$A4 = 5.38703 \times 10^{-5}$
$A6 = -9.65311 \times 10^{-6}$
$A8 = 1.79961 \times 10^{-8}$
$A10 = -8.73946 \times 10^{-8}$
$A12 = 1.38291 \times 10^{-9}$

[Aspherical data of 9th surface (r9)]

$\epsilon = 1.0000$
$A4 = 4.28842 \times 10^{-4}$
$A6 = -1.45699 \times 10^{-5}$
$A8 = 9.76448 \times 10^{-7}$
$A10 = -2.18385 \times 10^{-8}$
$A12 = 2.73075 \times 10^{-10}$

[Aspherical data of 10th surface (r10)]

$\epsilon = 1.3852$
$A4 = 9.79508 \times 10^{-5}$
$A6 = -1.34130 \times 10^{-5}$
$A8 = 6.10524 \times 10^{-7}$
$A10 = -1.18911 \times 10^{-8}$
$A12 = 9.06836 \times 10^{-11}$

[Aspherical data of 11th surface (r11)]

$\epsilon = 1.0000$
$A4 = -3.16318 \times 10^{-4}$
$A6 = 3.19688 \times 10^{-6}$
$A8 = -2.35818 \times 10^{-8}$
$A10 = 9.10956 \times 10^{-11}$
$A12 = -1.13535 \times 10^{-13}$

[Conditional equation (5a) values of 9th surface (r9)]

$y = 0.4912 \ldots \phi2.(N'-N).(d/dy).\{x(y)-x0(y)\} = -0.4890 \times 10^{-5}$
$y = 0.9825 \ldots \phi2.(N'-N).(d/dy).\{x(y)-x0(y)\} = -0.3781 \times 10^{-4}$
$y = 1.4737 \ldots \phi2.(N'-N).(d/dy).\{x(y)-x0(y)\} = -0.1215 \times 10^{-3}$
$y = 1.9649 \ldots \phi2.(N'-N).(d/dy).\{x(y)-x0(y)\} = -0.2738 \times 10^{-3}$
$y = 2.4561 \ldots \phi2.(N'-N).(d/dy).\{x(y)-x0(y)\} = -0.5153 \times 10^{-3}$
$y = 2.9474 \ldots \phi2.(N'-N).(d/dy).\{x(y)-x0(y)\} = -0.8856 \times 10^{-3}$
$y = 3.4386 \ldots \phi2.(N'-N).(d/dy).\{x(y)-x0(y)\} = -0.1462 \times 10^{-2}$
$y = 3.9298 \ldots \phi2.(N'-N).(d/dy).\{x(y)-x0(y)\} = -0.2379 \times 10^{-2}$
$y = 4.4210 \ldots \phi2.(N'-N).(d/dy).\{x(y)-x0(y)\} = -0.3867 \times 10^{-2}$
$y = 4.9123 \ldots \phi2.(N'-N).(d/dy).\{x(y)-x0(y)\} = -0.6339 \times 10^{-2}$

[Conditional equation (5a) values of 11th surface (r11)]

$y = 1.1459 \ldots \phi3.(N'-N).(d/dy).\{x(y)-x0(y)\} = -0.6305 \times 10^{-4}$
$y = 2.2918 \ldots \phi3.(N'-N).(d/dy).\{x(y)-x0(y)\} = -0.4756 \times 10^{-3}$
$y = 3.4377 \ldots \phi3.(N'-N).(d/dy).\{x(y)-x0(y)\} = -0.1459 \times 10^{-2}$
$y = 4.5836 \ldots \phi3.(N'-N).(d/dy).\{x(y)-x0(y)\} = -0.3049 \times 10^{-2}$
$y = 5.7296 \ldots \phi3.(N'-N).(d/dy).\{x(y)-x0(y)\} = -0.5135 \times 10^{-2}$
$y = 6.8755 \ldots \phi3.(N'-N).(d/dy).\{x(y)-x0(y)\} = -0.7583 \times 10^{-2}$
$y = 8.0214 \ldots \phi3.(N'-N).(d/dy).\{x(y)-x0(y)\} = -0.1033 \times 10^{-1}$
$y = 9.1673 \ldots \phi3.(N'-N).(d/dy).\{x(y)-x0(y)\} = -0.1335 \times 10^{-1}$
$y = 10.3132 \ldots \phi3.(N'-N).(d/dy).\{x(y)-x0(y)\} = -0.1621 \times 10^{-1}$
$y = 11.4591 \ldots \phi3.(N'-N).(d/dy).\{x(y)-x0(y)\} = -0.1738 \times 10^{-1}$

TABLE 5

Embodiment 5 f = 23.20~43.80~65.80
FNO = 5.65~7.40~9.68

| [Radius of curvature] | [Axial distance] | [Refractive Index] | [Abbe number] |
|---|---|---|---|
| r1 = −22.259 | | | |
| | d1 = 0.90 | N1 = 1.846737 | ν1 = 24.05 |
| r2 = −35.817 | | | |
| | d2 = 0.10 | | |
| r3 = 13.658 | | | |
| | d3 = 1.97 | N2 = 1.525130 | ν2 = 65.58 |

TABLE 5-continued

| | | | |
|---|---|---|---|
| r4 = −203.849 | | | |
| | d4 = 1.30~6.46~9.88 | | |
| r5 = ∞ (Diaphragm S) | | | |
| | d5 = 0.60 | | |
| r6 = −7.910 | | | |
| | d6 = 1.05 | N3 = 1.487490 | ν3 = 70.44 |
| r7 = −8.799 | | | |
| | d7 = 1.56 | | |
| r8* = 97.145 | | | |
| | d8 = 5.00 | N4 = 1.487490 | ν4 = 70.44 |
| r9* = −11.514 | | | |
| | d9 = 8.43~3.36~0.87 | | |
| r10* = −9.038 | | | |
| | d10 = 2.50 | N5 = 1.498923 | ν5 = 68.81 |
| r11* = 33.850 | | | |

[Aspherical data of 8th surface (r8)]

$\epsilon = 1.0000$
$A4 = -3.07057 \times 10^{-5}$
$A6 = -1.40534 \times 10^{-5}$
$A8 = 1.46019 \times 10^{-6}$
$A10 = -6.66143 \times 10^{-8}$
$A12 = 1.84667 \times 10^{-9}$

[Aspherical data of 9th surface (r9)]

$\epsilon = 1.0000$
$A4 = 2.36060 \times 10^{-4}$
$A6 = -1.34259 \times 10^{-5}$
$A8 = 7.57991 \times 10^{-8}$
$A10 = 1.95420 \times 10^{-8}$
$A12 = -3.84600 \times 10^{-10}$

[Aspherical data of 10th surface (r10)]

$\epsilon = 1.3312$
$A4 = 2.24838 \times 10^{-4}$
$A6 = -1.79684 \times 10^{-5}$
$A8 = 8.77182 \times 10^{-7}$
$A10 = -2.09518 \times 10^{-8}$
$A12 = 1.99513 \times 10^{-10}$

[Aspherical data of 11th surface (r11)]

$\epsilon = 1.0000$
$A4 = -1.76321 \times 10^{-4}$
$A6 = 1.23555 \times 10^{-6}$
$A8 = -6.47524 \times 10^{-9}$
$A10 = 7.73139 \times 10^{-12}$
$A12 = 5.57564 \times 10^{-14}$

[Conditional equation (5a) values of 8th surface (r8)]

$y = 0.4000 \ldots \phi2.(N'-N).(d/dy).\{x(y)-x0(y)\} = -0.1704 \times 10^{-5}$
$y = 0.8000 \ldots \phi2.(N'-N).(d/dy).\{x(y)-x0(y)\} = -0.1404 \times 10^{-4}$
$y = 1.2000 \ldots \phi2.(N'-N).(d/dy).\{x(y)-x0(y)\} = -0.4927 \times 10^{-4}$
$y = 1.6000 \ldots \phi2.(N'-N).(d/dy).\{x(y)-x0(y)\} = -0.1215 \times 10^{-3}$
$y = 2.0000 \ldots \phi2.(N'-N).(d/dy).\{x(y)-x0(y)\} = -0.2458 \times 10^{-3}$
$y = 2.4000 \ldots \phi2.(N'-N).(d/dy).\{x(y)-x0(y)\} = -0.4376 \times 10^{-3}$
$y = 2.8000 \ldots \phi2.(N'-N).(d/dy).\{x(y)-x0(y)\} = -0.7093 \times 10^{-3}$
$y = 3.2000 \ldots \phi2.(N'-N).(d/dy).\{x(y)-x0(y)\} = -0.1046 \times 10^{-2}$
$y = 3.6000 \ldots \phi2.(N'-N).(d/dy).\{x(y)-x0(y)\} = -0.1298 \times 10^{-2}$
$y = 4.0000 \ldots \phi2.(N'-N).(d/dy).\{x(y)-x0(y)\} = -0.8782 \times 10^{-3}$

[Conditional equation (5a) values of 9th surface (r9)]

$y = 0.5000 \ldots \phi2.(N'-N).(d/dy).\{x(y)-x0(y)\} = -0.3689 \times 10^{-5}$
$y = 1.0000 \ldots \phi2.(N'-N).(d/dy).\{x(y)-x0(y)\} = -0.2822 \times 10^{-4}$
$y = 1.5000 \ldots \phi2.(N'-N).(d/dy).\{x(y)-x0(y)\} = -0.8782 \times 10^{-4}$
$y = 2.0000 \ldots \phi2.(N'-N).(d/dy).\{x(y)-x0(y)\} = -0.1832 \times 10^{-3}$
$y = 2.5000 \ldots \phi2.(N'-N).(d/dy).\{x(y)-x0(y)\} = -0.2970 \times 10^{-3}$
$y = 3.0000 \ldots \phi2.(N'-N).(d/dy).\{x(y)-x0(y)\} = -0.3986 \times 10^{-3}$
$y = 3.5000 \ldots \phi2.(N'-N).(d/dy).\{x(y)-x0(y)\} = -0.4676 \times 10^{-3}$
$y = 4.0000 \ldots \phi2.(N'-N).(d/dy).\{x(y)-x0(y)\} = -0.5412 \times 10^{-3}$
$y = 4.5000 \ldots \phi2.(N'-N).(d/dy).\{x(y)-x0(y)\} = -0.7770 \times 10^{-3}$
$y = 5.0000 \ldots \phi2.(N'-N).(d/dy).\{x(y)-x0(y)\} = -0.1485 \times 10^{-2}$

[Conditional equation (5a) values of 11th surface (r11)]

$y = 1.0840 \ldots \phi3.(N'-N).(d/dy).\{x(y)-x0(y)\} = -0.5438 \times 10^{-4}$
$y = 2.1679 \ldots \phi3.(N'-N).(d/dy).\{x(y)-x0(y)\} = -0.4210 \times 10^{-3}$
$y = 3.2519 \ldots \phi3.(N'-N).(d/dy).\{x(y)-x0(y)\} = -0.1346 \times 10^{-2}$
$y = 4.3358 \ldots \phi3.(N'-N).(d/dy).\{x(y)-x0(y)\} = -0.2960 \times 10^{-2}$
$y = 5.4198 \ldots \phi3.(N'-N).(d/dy).\{x(y)-x0(y)\} = -0.5264 \times 10^{-2}$ TABLE 5-continued y = 6.5037 ... φ3.(N'-N).(d/dy).{x(y)-x0(y)} = -0.8154 × $10^{-2}$
y = 7.5877 ... φ3.(N'-N).(d/dy).{x(y)-x0(y)} = -0.1147 × $10^{-1}$
y = 8.6716 ... φ3.(N'-N).(d/dy).{x(y)-x0(y)} = -0.1502 × $10^{-1}$
y = 9.7556 ... φ3.(N'-N).(d/dy).{x(y)-x0(y)} = -0.1843 × $10^{-1}$
y = 10.8395 ... φ3.(N'-N).(d/dy).{x(y)-x0(y)} = -0.2054 × $10^{-1}$

TABLE 6

Embodiment 6 f = 23.20~43.80~65.80
FNO = 5.65~7.40~9.68

| [Radius of curvature] | [Axial distance] | [Refractive Index] | [Abbe number] |
|---|---|---|---|
| r1 = -22.468 | | | |
| | d1 = 0.90 | N1 = 1.847616 | ν1 = 26.95 |
| r2 = -38.025 | | | |
| | d2 = 0.10 | | |
| r3 = 11.944 | | | |
| | d3 = 2.70 | N2 = 1.487490 | ν2 = 70.44 |
| r4 = -504.814 | | | |
| | d4 = 1.78~6.31~8.72 | | |
| r5 = ∞ (Diaphragm S) | | | |
| | d5 = 0.60 | | |
| r6 = -9.182 | | | |
| | d6 = 0.71 | N3 = 1.487490 | ν3 = 70.44 |
| r7 = -11.987 | | | |
| | d7 = 1.55 | | |
| r8* = 85.452 | | | |
| | d8 = 5.00 | N4 = 1.487490 | ν4 = 70.44 |
| r9* = -8.495 | | | |
| | d9 = 6.84~2.87~1.04 | | |
| r10* = -8.929 | | | |
| | d10 = 2.53 | N5 = 1.490781 | ν5 = 67.96 |
| r11* = 20.059 | | | |

[Aspherical data of 8th surface (r8)]

ε = 1.0000
A4 = -2.43566 × $10^{-4}$
A6 = -1.15628 × $10^{-5}$
A8 = 1.34940 × $10^{-6}$
A10 = -1.10788 × $10^{-7}$
A12 = 4.26097 × $10^{-9}$

[Aspherical data of 9th surface (r9)]

ε = 1.0000
A4 = 2.76814 × $10^{-4}$
A6 = -1.02959 × $10^{-5}$
A8 = -1.90791 × $10^{-7}$
A10 = 1.88233 × $10^{-8}$
A12 = -2.36885 × $10^{-0}$

[Aspherical data of 10th surface (r10)]

ε = 1.4141
A4 = 2.87997 × $10^{-4}$
A6 = -1.83900 × $10^{-5}$
A8 = 8.20155 × $10^{-7}$
A10 = -2.06840 × $10^{-8}$
A12 = 2.32144 × $10^{-10}$

[Aspherical data of 11th surface (r11)]

ε = 1.0000
A4 = -2.69107 × $10^{-4}$
A6 = 1.67897 × $10^{-6}$
A8 = -6.58432 × $10^{-9}$
A10 = 3.78077 × $10^{-12}$
A12 = 6.84082 × $10^{-14}$

[Conditional equation (5a) values of 8th surface (r8)]

y = 0.3844 ... φ2.(N'-N).(d/dy).{x(y)-x0(y)} = -0.1708 × $10^{-6}$
y = 0.7687 ... φ2.(N'-N).(d/dy).{x(y)-x0(y)} = -0.1707 × $10^{-5}$
y = 1.1531 ... φ2.(N'-N).(d/dy).{x(y)-x0(y)} = -0.7370 × $10^{-5}$
y = 1.5375 ... φ2.(N'-N).(d/dy).{x(y)-x0(y)} = -0.2145 × $10^{-4}$
y = 1.9218 ... φ2.(N'-N).(d/dy).{x(y)-x0(y)} = -0.4812 × $10^{-4}$
y = 2.3062 ... φ2.(N'-N).(d/dy).{x(y)-x0(y)} = -0.8835 × $10^{-4}$

TABLE 6-continued y = 2.6906 ... φ2.(N'-N).(d/dy).{x(y)-x0(y)} = -0.1358 × $10^{-3}$
y = 3.0749 ... φ2.(N'-N).(d/dy).{x(y)-x0(y)} = -0.1695 × $10^{-3}$
y = 3.4593 ... φ2.(N'-N).(d/dy).{x(y)-x0(y)} = -0.1348 × $10^{-3}$
y = 3.8437 ... φ2.(N'-N).(d/dy).{x(y)-x0(y)} = -0.1123 × $10^{-3}$

[Conditional equation (5a) values of 9th surface (r9)]

y = 0.5300 ... φ2.(N'-N).(d/dy).{x(y)-x0(y)} = -0.3057 × $10^{-5}$
y = 1.0600 ... φ2.(N'-N).(d/dy).{x(y)-x0(y)} = -0.2268 × $10^{-4}$
y = 1.5900 ... φ2.(N'-N).(d/dy).{x(y)-x0(y)} = -0.6693 × $10^{-4}$
y = 2.1200 ... φ2.(N'-N).(d/dy).{x(y)-x0(y)} = -0.1295 × $10^{-3}$
y = 2.6500 ... φ2.(N'-N).(d/dy).{x(y)-x0(y)} = -0.1927 × $10^{-3}$
y = 3.1800 ... φ2.(N'-N).(d/dy).{x(y)-x0(y)} = -0.2475 × $10^{-3}$
y = 3.7100 ... φ2.(N'-N).(d/dy).{x(y)-x0(y)} = -0.3348 × $10^{-3}$
y = 4.2400 ... φ2.(N'-N).(d/dy).{x(y)-x0(y)} = -0.5865 × $10^{-3}$
y = 4.7700 ... φ2.(N'-N).(d/dy).{x(y)-x0(y)} = -0.1185 × $10^{-2}$
y = 5.3000 ... φ2.(N'-N).(d/dy).{x(y)-x0(y)} = -0.2049 × $10^{-2}$

[Conditional equation (5a) values of 11th surface (r11)]

y = 1.1568 ... φ3.(N'-N).(d/dy).{x(y)-x0(y)} = -0.3830 × $10^{-4}$
y = 2.3137 ... φ3.(N'-N).(d/dy).{x(y)-x0(y)} = -0.2939 × $10^{-3}$
y = 3.4705 ... φ3.(N'-N).(d/dy).{x(y)-x0(y)} = -0.9269 × $10^{-3}$
y = 4.6273 ... φ3.(N'-N).(d/dy).{x(y)-x0(y)} = -0.2007 × $10^{-2}$
y = 5.7842 ... φ3.(N'-N).(d/dy).{x(y)-x0(y)} = -0.3521 × $10^{-2}$
y = 6.9410 ... φ3.(N'-N).(d/dy).{x(y)-x0(y)} = -0.5426 × $10^{-2}$
y = 8.0978 ... φ3.(N'-N).(d/dy).{x(y)-x0(y)} = -0.7702 × $10^{-2}$
y = 9.2547 ... φ3.(N'-N).(d/dy).{x(y)-x0(y)} = -0.1031 × $10^{-1}$
y = 10.4115 ... φ3.(N'-N).(d/dy).{x(y)-x0(y)} = -0.1283 × $10^{-1}$
y = 11.5683 ... φ3.(N'-N).(d/dy).{x(y)-x0(y)} = -0.1327 × $10^{-1}$

TABLE 7

Embodiment 7 f = 22.72~63.69~88.78
FNO = 5.75~8.86~11.00

| [Radius of curvature] | [Axial distance] | [Refractive Index] | [Abbe number] |
|---|---|---|---|
| r1 = -24.253 | | | |
| | d1 = 0.900 | N1 = 1.84666 | ν1 = 23.83 |
| r2 = -31.498 | | | |
| | d2 = 0.100 | | |
| r3 = 10.769 | | | |
| | d3 = 2.600 | N2 = 1.48749 | ν2 = 70.44 |
| r4 = 25.772 | | | |
| | d4 = 3.640~12.052~13.122 | | |
| r5 = ∞ (Diaphragm S) | | | |
| | d5 = 1.111 | | |
| r6* = -12.340 | | | |
| | d6 = 1.319 | N3 = 1.84506 | ν3 = 23.66 |
| r7* = -13.536 | | | |
| | d7 = 1.000 | | |
| r8 = -14.468 | | | |
| | d8 = 2.200 | N4 = 1.60738 | ν4 = 56.71 |
| r9 = -6.263 | | | |
| | d9 = 8.064~1.702~0.501 | | |
| r10* = -20.164 | | | |
| | d10 = 0.900 | N5 = 1.69100 | ν5 = 54.75 |
| r11* = 19.844 | | | |

[Aspherical data of 6th surface (r6)]

ε = 1.0000
A4 = -0.88959678 × $10^{-3}$
A6 = -0.32856926 × $10^{-4}$
A8 = -0.18951910 × $10^{-5}$
A10 = 0.17548275 × $10^{-6}$

[Aspherical data of 7th surface (r7)]

ε = 1.0000
A4 = -0.40120682 × $10^{-4}$
A6 = -0.29747786 × $10^{-4}$
A8 = 0.89205413 × $10^{-6}$
A10 = 0.50419073 × $10^{-7}$

TABLE 7-continued

[Aspherical data of 10th surface (r10)]

$\epsilon = -10.4224$
$A4 = -0.98396692 \times 10^{-3}$
$A6 = 0.10588221 \times 10^{-4}$
$A8 = 0.53489966 \times 10^{-6}$
$A10 = -0.17319123 \times 10^{-7}$
$A12 = 0.14755649 \times 10^{-9}$

[Aspherical data of 11th surface (r11)]

$\epsilon = 1.0000$
$A4 = -0.98107264 \times 10^{-3}$
$A6 = 0.21966925 \times 10^{-4}$
$A8 = -0.25160208 \times 10^{-6}$
$A10 = 0.11214462 \times 10^{-8}$

[Conditional equation (5a) values of 6th surface (r6)]

$y = 0.2800 \ldots \phi2.(N'-N).(d/dy).\{x(y)-x0(y)\} = -0.4053 \times 10^{-5}$
$y = 0.5600 \ldots \phi2.(N'-N).(d/dy).\{x(y)-x0(y)\} = -0.3285 \times 10^{-4}$
$y = 0.8400 \ldots \phi2.(N'-N).(d/dy).\{x(y)-x0(y)\} = -0.1134 \times 10^{-3}$
$y = 1.1200 \ldots \phi2.(N'-N).(d/dy).\{x(y)-x0(y)\} = -0.2777 \times 10^{-3}$
$y = 1.4000 \ldots \phi2.(N'-N).(d/dy).\{x(y)-x0(y)\} = -0.5655 \times 10^{-3}$
$y = 1.6800 \ldots \phi2.(N'-N).(d/dy).\{x(y)-x0(y)\} = -0.1028 \times 10^{-2}$
$y = 1.9600 \ldots \phi2.(N'-N).(d/dy).\{x(y)-x0(y)\} = -0.1727 \times 10^{-2}$
$y = 2.2400 \ldots \phi2.(N'-N).(d/dy).\{x(y)-x0(y)\} = -0.2733 \times 10^{-2}$
$y = 2.5200 \ldots \phi2.(N'-N).(d/dy).\{x(y)-x0(y)\} = -0.4110 \times 10^{-2}$
$y = 2.8000 \ldots \phi2.(N'-N).(d/dy).\{x(y)-x0(y)\} = -0.5885 \times 10^{-2}$

[Conditional equation (5a) values of 11th surface (r11)]

$y = 0.8300 \ldots \phi3.(N'-N).(d/dy).\{x(y)-x0(y)\} = -0.1056 \times 10^{-2}$
$y = 1.6600 \ldots \phi3.(N'-N).(d/dy).\{x(y)-x0(y)\} = -0.7881 \times 10^{-3}$
$y = 2.4900 \ldots \phi3.(N'-N).(d/dy).\{x(y)-x0(y)\} = -0.2367 \times 10^{-2}$
$y = 3.3200 \ldots \phi3.(N'-N).(d/dy).\{x(y)-x0(y)\} = -0.4762 \times 10^{-2}$
$y = 4.1500 \ldots \phi3.(N'-N).(d/dy).\{x(y)-x0(y)\} = -0.7556 \times 10^{-2}$
$y = 4.9800 \ldots \phi3.(N'-N).(d/dy).\{x(y)-x0(y)\} = -0.1025 \times 10^{-1}$
$y = 5.8100 \ldots \phi3.(N'-N).(d/dy).\{x(y)-x0(y)\} = -0.1264 \times 10^{-1}$
$y = 6.6400 \ldots \phi3.(N'-N).(d/dy).\{x(y)-x0(y)\} = -0.1502 \times 10^{-1}$
$y = 7.4700 \ldots \phi3.(N'-N).(d/dy).\{x(y)-x0(y)\} = -0.1784 \times 10^{-1}$
$y = 8.3000 \ldots \phi3.(N'-N).(d/dy).\{x(y)-x0(y)\} = -0.2012 \times 10^{-1}$

TABLE 8

|  | (1) | (2) | (3) | (4) | (6) | (7) | (8) |
|---|---|---|---|---|---|---|---|
| Embodiment 1 | 1.407 | 0.313 | 1.7159 | −0.6220 | 1.0784 | 3.7768 | 1.4031 |
| Embodiment 2 | 1.456 | 0.296 | 1.6530 | −0.6046 | 1.4592 | 2.8361 | 1.3573 |
| Embodiment 3 | 1.592 | 0.353 | 1.6706 | −0.5276 | 0.8648 | 2.8358 | 1.3172 |
| Embodiment 4 | 1.789 | 0.522 | 1.6281 | −0.5141 | 0.7413 | 3.7820 | 1.1064 |
| Embodiment 5 | 1.806 | 0.528 | 1.6466 | −0.5117 | 0.8646 | 2.8363 | 1.1190 |
| Embodiment 6 | 1.804 | 0.522 | 1.5948 | −0.5107 | 1.2154 | 3.7816 | 1.0730 |
| Embodiment 7 | 1.524 | 0.420 | 1.6860 | −0.6313 | 0.8734 | 3.9077 | 1.2657 |

Figures 11A, 11B, 11C, 11D, 11E, 11F, 11G, 11H, 11I:
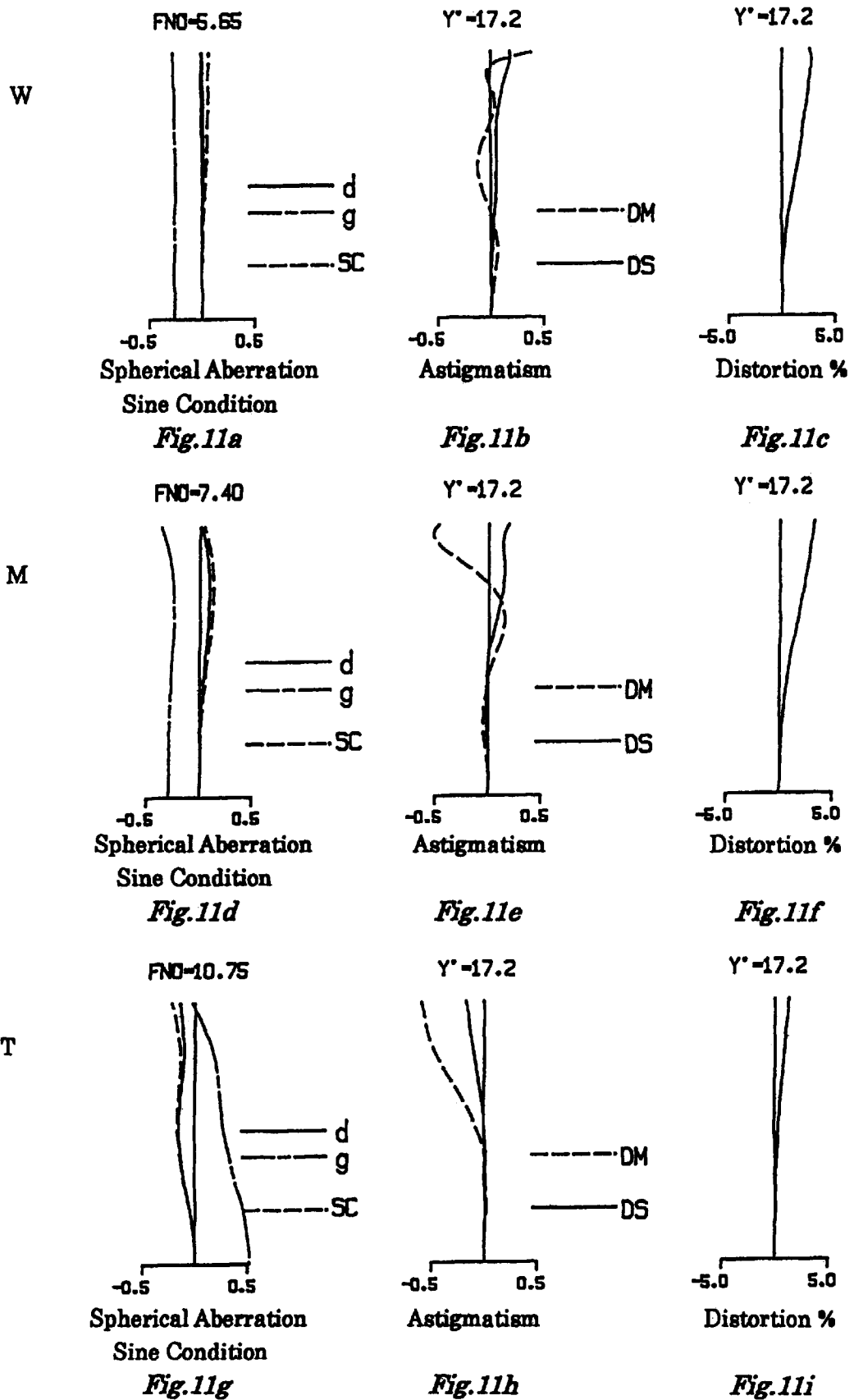
FIGS. 11*a*~11*c* are aberration diagrams of aberration in the shortest focal length condition of the zoom lens system of the fourth embodiment, with 11*a* showing spherical aberration and sine condition, 11*b* showing astigmatism, and 11*c* showing distortion.
FIGS. 11*d*~11*f* are aberration diagrams of aberration in the intermediate focal length condition of the zoom lens system of the fourth embodiment, with 11*d* showing spherical aberration and sine condition, 11*e* showing astigmatism, and 11*f* showing distortion.
FIGS. 11*g*~11*i* are aberration diagrams of aberration in the longest focal length condition of the zoom lens system of the fourth embodiment, with 11*g* showing spherical aberration and sine condition, 11*h* showing astigmatism, and 11*i* showing distortion.
Figures 14A, 14B, 14C, 14D, 14E, 14F, 14G, 14H, 14I:
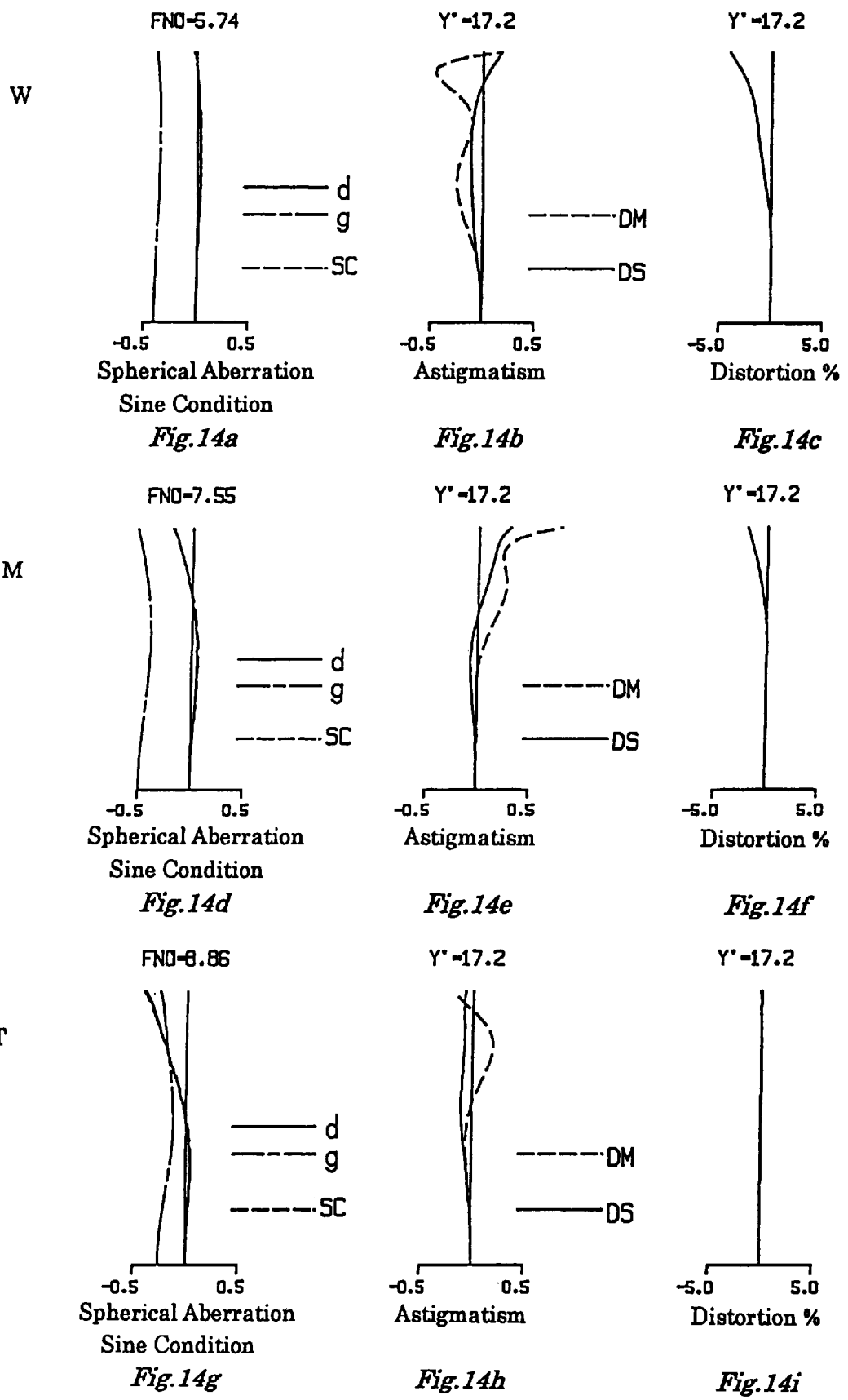
FIGS. 14*a*~14*c* are aberration diagrams of aberration in the shortest focal length condition of the zoom lens system of the seventh embodiment, with 14*a* showing spherical aberration and sine condition, 14*b* showing astigmatism, and 14*c* showing distortion.
FIGS. 14*d*~14*f* are aberration diagrams of aberration in the intermediate focal length condition of the zoom lens system of the seventh embodiment, with 14*d* showing spherical aberration and sine condition, 14*e* showing astigmatism, and 14*f* showing distortion.
FIGS. 14*g*~14*i* are aberration diagrams of aberration in the longest focal length condition of the zoom lens system of the seventh embodiment, with 14*g* showing spherical aberration and sine condition, 14*h* showing astigmatism, and 14*i* showing distortion.

FIGS. 8 through 14 are aberration diagrams corresponding to the first through seventh embodiments; the diagrams show various aberrations (sequentially, spherical aberration, astigmatism, and distortion) in which diagrams labeled a~c show the shortest focal length condition (wide angle end), diagrams labeled d~f show the intermediate focal length condition, and diagrams labeled g~i show the longest focal length condition (telephoto end). In the diagrams, the solid line d represents aberration corresponding to the d-line, the dashed line g represents aberration corresponding to the g-line, and the broken line SC represents the sine condition. The broken line DM and the solid line DS respectively represent astigmatism on the d-line in the meridional plane and the sagittal plane.

According to the present invention as described above, a compact and high variable magnification zoom lens system can be realized using few lens units because it is possible to achieve compactness while producing excellent aberration correction by satisfying the aforesaid conditional equations (1), (2) and the like in a positive-positive-negative zoom lens system. Furthermore, high optical performance is obtained because it is possible to produce excellent correction of aberration and error sensitivity by providing an aspherical surface in the second and third lens units.

Embodiments Using Plastic Lens Element

Figure 15:
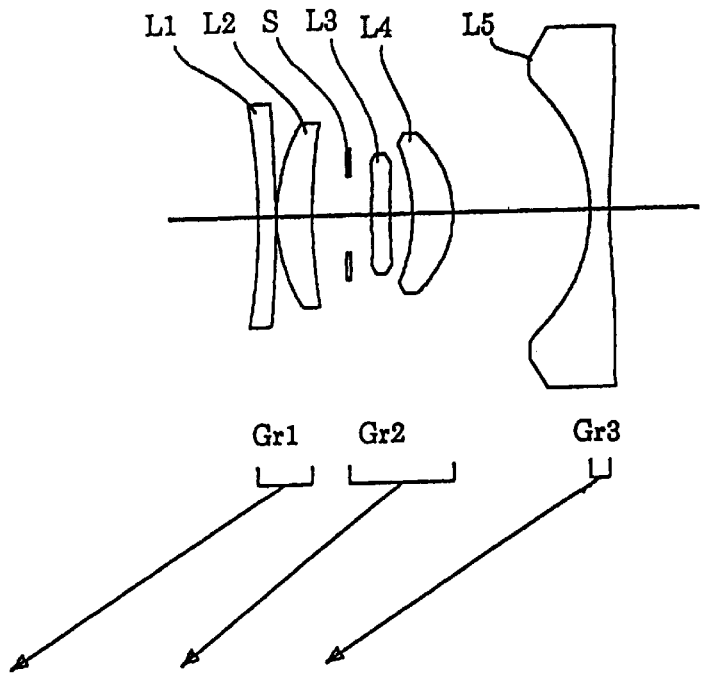
FIG. 15 is a lens layout diagram showing an eighth embodiment of the zoom lens system in the shortest focal length condition.
Figure 16:
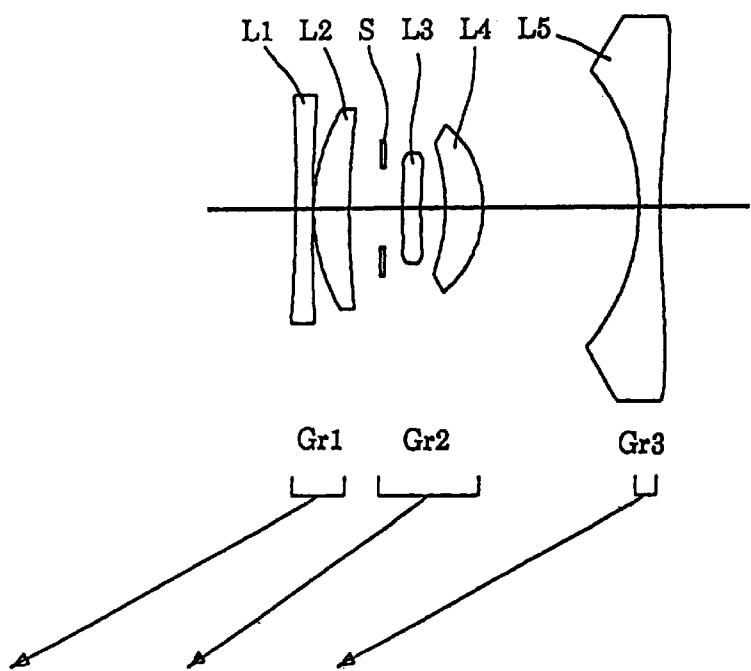
FIG. 16 is a lens layout diagram showing a ninth embodiment of the zoom lens system in the shortest focal length condition.
Figure 17:
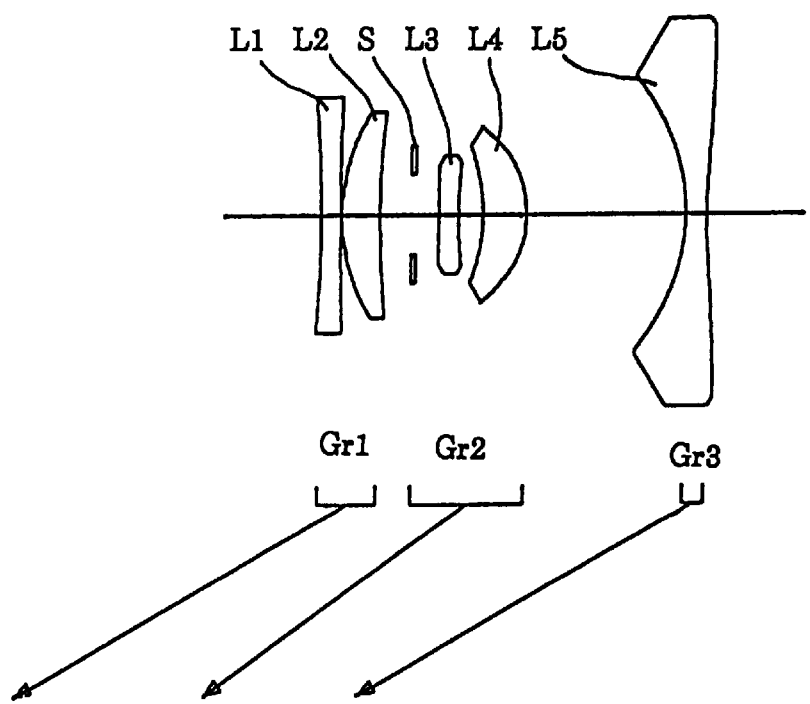
FIG. 17 is a lens layout diagram showing a tenth embodiment of the zoom lens system in the shortest focal length condition.
Figure 18:
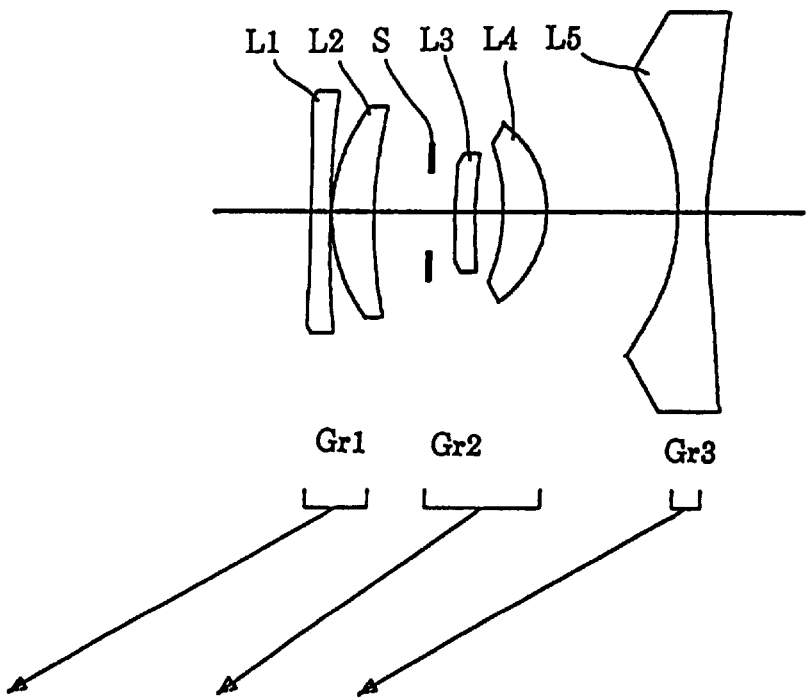
FIG. 18 is a lens layout diagram showing an eleventh embodiment of the zoom lens system in the shortest focal length condition.

FIGS. 15 through 18 are lens structural diagrams corresponding to the zoom lens systems of the eighth through eleventh embodiments, and show the lens layouts in the shortest focal length condition [W].

The eighth through eleventh embodiments are zoom lens systems of a three unit construction comprising sequentially from the object side a first lens unit Gr1 having positive optical power, a second lens unit Gr2 having positive optical power, and a third lens unit Gr3 having negative optical power. In each of these embodiments an diaphragm S which moves together with the second lens unit Gr2 is disposed between the first lens unit Gr1 and the second lens unit Gr2.

In the eighth embodiment, each lens unit is constructed sequentially from the object side as described below. The first lens unit Gr1 comprises a negative meniscus lens element L1 with a concave surface on the object side, and a positive meniscus lens element L2 with a convex surface on the object side. The second lens unit Gr2 comprises a negative meniscus plastic lens element L3 with a convex surface on the object side (bilateral aspherical surfaces), and a positive meniscus lens element L4 with a concave surface on the object side. The third lens unit Gr3 comprises a biconcave negative plastic lens element L5 (bilateral aspherical surfaces).

In the ninth and tenth embodiments, each lens unit is constructed sequentially from the object side as described below. The first lens unit Gr1 comprises a biconcave negative lens element L1, and a positive meniscus plastic lens element L2 with a convex surface on the object side (bilateral aspherical surfaces). The second lens unit Gr2 comprises a negative meniscus plastic lens element L3 with a convex surface on the object side (bilateral aspherical surfaces), and a positive meniscus lens element L4 with a concave surface on the object side. The third lens unit Gr3 comprises a biconcave negative plastic lens element L5 (bi-aspherical surfaces).

In the eleventh embodiment, each lens unit is constructed sequentially from the object side as described below. The first lens unit Gr1 comprises a biconcave negative lens element L1 (bi-aspherical surfaces), and a positive meniscus plastic lens element L2 with a convex surface on the object side. The second lens unit Gr2 comprises a negative meniscus plastic lens element L3 with a convex surface on the object side (bi-aspherical surfaces), and a positive meniscus lens element L4 with a concave surface on the object side. The third lens unit Gr3 comprises a biconcave negative plastic lens element L5 (bilateral aspherical surfaces).

The conditions satisfies by each of the aforesaid embodiments are described below.

It is desirable that in a three unit positive-positive-negative zoom lens system such as the zoom lens systems of the ninth through eleventh embodiments, conditional equation (9) below is satisfied when a plastic lens is element used in the first and third lens units.

$$-2 < f1p/f3p < -1 \quad (9)$$

where
- f1p represents the focal length of the plastic lens included in the first lens unit, and
- f3p represents the focal length of the plastic lens included in the third lens unit.

Conditional equation (9) expresses the ratio between the focal lengths of the plastic lens elements of the first and third lens units (a reciprocal of the optical power ratio). Changes in the focal length due to temperature fluctuation can be minimized by mutually negating the change in focus during temperature fluctuation by satisfying conditional equation (9). When the range stipulated by conditional equation (9) is exceeded, temperature fluctuation adversely affects the balance between the focal lengths of the plastic lenses so as to make it difficult to minimize the change in focal length of the total system.

It is desirable that in a three unit positive-positive-negative zoom lens system such as the zoom lens systems of the eighth through eleventh embodiments, conditional equation (10) below is satisfied.

$$1.0 < TLW/Y' < 1.7 \quad (10)$$

where
- TLW represents the total length of the zoom lens system in the shortest focal length condition (distance from the apex of the surface nearest the object side to the image plane), and
- Y' represents the maximum image height.

Compactness can be attained while assuring adequate performance by satisfying conditional equation (10). When the upper limit of conditional equation (10) is exceeded, each aberration increases and is difficult to correct due to the excessive optical power of each lens unit. Conversely, when the lower limit of conditional equation (10) is exceeded, the total length is increased and compactness cannot be achieved.

It is desirable that in a three unit positive-positive-negative zoom lens system such as the zoom lens systems of the eighth through eleventh embodiments, conditional equation (11) below is satisfied when a plastic lens is used in the third lens unit.

$$-0.8 < f3p/fW < -0.5 \quad (11)$$

where
- f3p represents the focal length of the plastic lens included in the third lens unit, and
- fW represents the focal length in the shortest focal length condition.

Conditional equation (11) expresses the optical power ratio of the plastic lens in the third lens unit in the total system. When the lower limit of conditional equation (11) is exceeded, temperature fluctuation causes excessive change of the focal position, thereby making correction difficult. When the upper limit of conditional equation (11) is exceeded, the optical power of the third lens unit is excessively reduced, resulting in an increase in the total length of the zoom lens system, and making compactness unobtainable.

It is desirable that in a three unit positive-positive-negative zoom lens system such as the zoom lens systems of the ninth through eleventh embodiments, conditional equation (12) below is satisfied when a plastic lens element is used in the first lens units.

$$0.5 < f1p/fW < 2 \quad (12)$$

where
- f1p represents the focal length of the plastic lens included in the first lens unit, and
- fW represents the focal length in the shortest focal length condition.

Conditional equation (12) expresses the optical power ratio of the plastic lens element of the first lens unit in the total system. When the upper limit of conditional equation (12) is exceeded, temperature fluctuation causes excessive change of the focal position, thereby making correction difficult. When the lower limit of conditional equation (12) is exceeded, the optical power of the third lens unit is excessively reduced, resulting in an increase in the total length of the zoom lens system, and making compactness unobtainable.

It is desirable that the zoom lens systems of the eighth through eleventh embodiments satisfy conditional equation (13).

$$1.3 < \beta 3W < 2 \quad (13)$$

where
- $\beta 3W$ represents the lateral magnification of the third lens unit in the shortest focal length condition.

It is possible to achieve compactness, and aberration correction by loosely efficient error sensitivity by suitably setting the lateral magnification of the third lens unit. When the upper limit of conditional equation (13) is exceeded, there is an excessive increase in the amount of movement during zooming, by the third lens unit, which is undesirable from the perspective of compactness. When the lower limit of conditional equation (13) is exceeded, the optical power of the third lens unit becomes excessive, so as to make it difficult to maintain a balance between aberration correction and error sensitivity.

It is desirable that in a three units positive-positive-negative zoom lens system, conditional equation (14) below is satisfied when the third lens unit is a single negative lens element.

$$\nu d3p > 50 \quad (14)$$

where
- $\nu d3p$ represents the Abbe number of the d-line of the plastic lens of the third lens unit.

When the third lens unit is constructed as a single negative lens unit, since the color correction within the lens unit cannot be corrected using the refractive index and dispersion of the lens as is the case in a two lens unit construction, it is necessary to control the chromatic aberration generated by the entire system by balancing the color correction generated by the other lens units. Conditional equation (14) is a condition for controlling the balance of chromatic aberration generated by the entire system. When the lower limit of conditional equation (14) is exceeded, the Abbe number is reduced, and chromatic aberration generation by the third lens unit increases, which disadvantageously affects the balance of chromatic aberration of the other lens units.

In each example, ri (i=1, 2, 3, . . . ) represents the radius of curvature of the No. ith surface counting from the object side, di (i=1, 2, 3, . . . ) represents the No. ith axial distance counting from the object side, Ni (i=1, 2, 3, . . . ) and vi (i=1, 2, 3, . . . ) represent the refractive index and Abbe number (vd) relative to the d-line of the No. ith lens element counting from the object side. The symbol f represents the focal length of the total system, and FNO represents the F number. In each example, the total system focal length f and the F number FNO and the spatial distance (axial distance) between lens units correspond to values of the shortest focal length condition (wide angle end) [W], intermediate focal length condition [M], and longest focal length condition (telephoto end) [T].

In the examples, surfaces with an asterisk (*) symbol affixed to the radius of curvature ri represent refractive optical surfaces which are aspherical in shape, or surfaces having a refractive action equivalent to an aspherical surface, and are defined by the above mentioned equation (AS).

TABLE 9

Embodiment 8

$f = 22.70 \sim 42.60 \sim 6.370$
$FNO = 5.90 \sim 9.00 \sim 11.50$

| [Radius of curvature] | [Axial distance] | [Refractive Index] | [Abbe number] |
|---|---|---|---|
| r1 = −38.000 | | | |
| | d1 = 1.000 | N1 = 1.84666 | v1 = 23.83 |
| r2 = −90.372 | | | |
| | d2 = 0.100 | | |
| r3 = 9.689 | | | |
| | d3 = 2.067 | N2 = 1.48749 | v2 = 70.44 |
| r4 = 30.829 | | | |
| | d4 = 2.116~6.392~8.235 | | |
| r5 = ∞ (Diaphragm S) | | | |
| | d5 = 1.300 | | |
| r6* = 43.478 | | | |
| | d6 = 1.050 | N3 = 1.52200 | v3 = 52.20 |
| r7* = 43.142 | | | |
| | d7 = 1.300 | | |
| r8 = −9.800 | | | |
| | d8 = 2.300 | N4 = 1.67790 | v4 = 55.52 |
| r9 = −5.806 | | | |
| | d9 = 7.799~3.522~1.680 | | |
| r10* = −9.683 | | | |
| | d10 = 1.100 | N5 = 1.52200 | v5 = 53.00 |
| r11* = 29.476 | | | |

[Asphrical data of 6th surface (r6)]

$\epsilon = 1.0000$
$A4 = -0.12978342 \times 10^{-3}$
$A6 = -0.41471280 \times 10^{-3}$
$A8 = 0.77000656 \times 10^{-4}$
$A10 = -0.10516080 \times 10^{-4}$
$A12 = 0.59325135 \times 10^{-6}$

[Asphrical data of 7th surface (r7)]

$\epsilon = 1.0000$
$A4 = 0.14572946 \times 10^{-2}$
$A6 = -0.50315764 \times 10^{-3}$
$A8 = 0.95901632 \times 10^{-4}$
$A10 = -0.11355048 \times 10^{-4}$
$A12 = 0.54115815 \times 10^{-6}$

[Asphrical data of 10th surface (r10)]

$\epsilon = -12.8046$
$A4 = -0.19371648 \times 10^{-2}$
$A6 = 0.65751863 \times 10^{-4}$
$A8 = -0.20152916 \times 10^{-5}$
$A10 = 0.48889278 \times 10^{-7}$
$A12 = -0.80470695 \times 10^{-9}$
$A14 = 0.69053297 \times 10^{-11}$
$A16 = -0.16614854 \times 10^{-13}$

[Asphrical data of 11th surface (r11)]

$\epsilon = 1.0000$

TABLE 9-continued $A4 = -0.44267709 \times 10^{-3}$
$A6 = 0.45660200 \times 10^{-5}$
$A8 = 0.10205225 \times 10^{-6}$
$A10 = -0.45404241 \times 10^{-8}$
$A12 = 0.69791627 \times 10^{-10}$
$A14 = -0.51020971 \times 10^{-12}$
$A16 = 0.14845885 \times 10^{-14}$

TABLE 10

Embodiment 9

$f = 23.18 \sim 43.43 \sim 65.14$
$FNO = 5.90 \sim 9.00 \sim 11.50$

| [Radius of curvature] | [Axial distance] | [Refractive Index] | [Abbe number] |
|---|---|---|---|
| r1 = −80.598 | | | |
| | d1 = 0.950 | N1 = 1.84666 | v1 = 23.83 |
| r2 = 133.366 | | | |
| | d2 = 0.100 | | |
| r3 = 10.575 | | | |
| | d3 = 1.997 | N2 = 1.52200 | v2 = 52.20 |
| r4 = 44.062 | | | |
| | d4 = 1.936~7.143~9.441 | | |
| r5 = ∞ (Diaphragm S) | | | |
| | d5 = 1.100 | | |
| r6* = 46.512 | | | |
| | d6 = 1.025 | N3 = 1.52200 | v3 = 52.20 |
| r7* = 25.475 | | | |
| | d7 = 1.417 | | |
| r8 = −10.000 | | | |
| | d8 = 2.200 | N4 = 1.67790 | v4 = 55.52 |
| r9 = −5.730 | | | |
| | d9 = 8.848~3.642~1.343 | | |
| r10* = 11.959 | | | |
| | d10 = 1.200 | N5 = 1.52200 | v5 = 52.20 |
| r11* = 31.186 | | | |

[Asphrical data of 6th surface (r6)]

$\epsilon = 1.0000$
$A4 = -0.64839576 \times 10^{-3}$
$A6 = -0.22270957 \times 10^{-3}$
$A8 = 0.25428546 \times 10^{-4}$
$A10 = -0.58437088 \times 10^{-5}$
$A12 = 0.59325118 \times 10^{-6}$

[Asphrical data of 7th surface (r7)]

$\epsilon = 1.0000$
$A4 = 0.82062160 \times 10^{-3}$
$A6 = -0.21306577 \times 10^{-3}$
$A8 = 0.75832380 \times 10^{-5}$
$A10 = 0.13493144 \times 10^{-5}$
$A12 = -0.16414559 \times 10^{-6}$

[Asphrical data of 10th surface (r10)]

$\epsilon = -1.6104$
$A4 = -0.43081210 \times 10^{-3}$
$A6 = 0.79029598 \times 10^{-5}$
$A8 = -0.36215925 \times 10^{-6}$
$A10 = 0.24584758 \times 10^{-7}$
$A12 = -0.88575696 \times 10^{-9}$
$A14 = 0.14758413 \times 10^{-10}$
$A16 = -0.91867045 \times 10^{-13}$

[Asphrical data of 11th surface (r11)]

$\epsilon = 1.0000$
$A4 = -0.34124342 \times 10^{-3}$
$A6 = 0.35900227 \times 10^{-5}$
$A8 = 0.61282637 \times 10^{-7}$
$A10 = -0.28544235 \times 10^{-8}$
$A12 = 0.40215487 \times 10^{-10}$
$A14 = -0.24978989 \times 10^{-12}$
$A16 = 0.57020730 \times 10^{-15}$

TABLE 11

Embodiment 10 f = 23.18~43.43~65.14
FNO = 5.90~9.00~11.50

| [Radius of curvature] | [Axial distance] | [Refractive Index] | [Abbe number] |
|---|---|---|---|
| r1 = −80.908 | | | |
| | d1 = 1.000 | N1 = 1.84666 | ν1 = 23.83 |
| r2 = 126.494 | | | |
| | d2 = 0.100 | | |
| r3 = 10.346 | | | |
| | d3 = 1.999 | N2 = 1.52200 | ν2 = 52.20 |
| r4 = 46.477 | | | |
| | d4 = 1.807~6.842~9.080 | | |
| r5 = ∞ (Diaphragm S) | | | |
| | d5 = 1.300 | | |
| r6* = 46.512 | | | |
| | d6 = 1.050 | N3 = 1.52200 | ν3 = 52.20 |
| r7 = 23.655 | | | |
| | d7 = 1.300 | | |
| r8 = −10.000 | | | |
| | d8 = 2.300 | N4 = 1.67790 | ν4 = 55.52 |
| r9 = −5.646 | | | |
| | d9 = 8.238~3.202~0.965 | | |
| r10* = −11.882 | | | |
| | d10 = 1.100 | N5 = 1.52200 | ν5 = 52.20 |
| r11* = 29.931 | | | |

[Asphrical data of 6th surface (r6)]

ϵ = 1.0000
A4 = −0.71964299 × 10$^{-3}$
A6 = −0.21529677 × 10$^{-3}$
A8 = 0.21194172 × 10$^{-4}$
A10 = −0.54435238 × 10$^{-5}$
A12 = 0.59325118 × 10$^{-6}$

[Asphrical data of 7th surface (r7)]

ϵ = 1.0000
A4 = 0.87786034 × 10$^{-3}$
A6 = −0.20876181 × 10$^{-3}$
A8 = 0.37951359 × 10$^{-5}$
A10 = 0.17891663 × 10$^{-5}$
A12 = −0.16414559 × 10$^{-6}$

[Asphrical data of 10th surface (r10)]

ϵ = −9.8199
A4 = −0.10986446 × 10$^{-2}$
A6 = 0.30840668 × 10$^{-4}$
A8 = −0.99483928 × 10$^{-6}$
A10 = 0.35902939 × 10$^{-7}$
A12 = −0.91606474 × 10$^{-9}$
A14 = 0.12496043 × 10$^{-10}$
A16 = −0.67621016 × 10$^{-13}$

[Asphrical data of 11th surface (r11)]

ϵ = 1.0000
A4 = −0.40846887 × 10$^{-3}$
A6 = 0.48209042 × 10$^{-5}$
A8 = 0.57483747 × 10$^{-7}$
A10 = −0.31045820 × 10$^{-8}$
A12 = 0.46677494 × 10$^{-10}$
A14 = −0.32091878 × 10$^{-12}$
A16 = 0.86090819 × 10$^{-15}$

TABLE 12

Embodiment 11 f = 23.18~43.43~65.14
FNO = 5.90~9.00~11.50

| [Radius of curvature] | [Axial distance] | [Refractive Index] | [Abbe number] |
|---|---|---|---|
| r1* = −100.000 | | | |
| | d1 = 1.000 | N1 = 1.84506 | ν1 = 23.66 |
| r2* = 112.224 | | | |
| | d2 = 0.100 | | |
| r3 = 8.911 | | | |
| | d3 = 2.199 | N2 = 1.52200 | ν2 = 52.20 |
| r4 = 23.500 | | | |
| | d4 = 3.011~7.520~9.496 | | |
| r5 = ∞ (Diaphragm S) | | | |
| | d5 = 1.300 | | |
| r6* = 46.512 | | | |
| | d6 = 1.050 | N3 = 1.52200 | ν3 = 52.20 |
| r7* = 36.208 | | | |
| | d7 = 1.479 | | |
| r8 = −10.000 | | | |
| | d8 = 2.300 | N4 = 1.67790 | ν4 = 55.52 |
| r9 = −5.637 | | | |
| | d9 = 6.827~2.318~0.342 | | |
| r10* = −13.931 | | | |
| | d10 = 1.500 | N5 = 1.52200 | ν5 = 52.20 |
| r11* = 18.468 | | | |

[Asphrical data of 1st surface (r1)]

ϵ = 1.0000
A4 = 0.14986624 × 10$^{-3}$
A6 = −0.16415063 × 10$^{-5}$
A8 = 0.12863429 × 10$^{-7}$
A10 = 0.14141156 × 10$^{-9}$
A12 = −0.95284569 × 10$^{-11}$

[Asphrical data of 2nd surface (r2)]

ϵ = 1.0000
A4 = 0.16540843 × 10$^{-3}$
A6 = −0.12668395 × 10$^{-5}$
A8 = 0.10712934 × 10$^{-7}$
A10 = 0.31438596 × 10$^{-9}$
A12 = −0.19454469 × 10$^{-10}$

[Asphrical data of 6th surface (r6)]

ϵ = 1.0000
A4 = 0.74172425 × 10$^{-5}$
A6 = −0.39519216 × 10$^{-3}$
A8 = 0.61279240 × 10$^{-4}$
A10 = −0.90611192 × 10$^{-5}$
A12 = 0.59325118 × 10$^{-6}$

[Asphrical data of 7th surface (r7)]

ϵ = 1.0000
A4 = 0.17627198 × 10$^{-2}$
A6 = −0.47411680 × 10$^{-3}$
A8 = 0.86815508 × 10$^{-4}$
A10 = −0.11539539 × 10$^{-4}$
A12 = 0.64087769 × 10$^{-6}$

[Asphrical data of 10th surface (r10)]

ϵ = 0.9826
A4 = −0.44475290 × 10$^{-3}$
A6 = 0.11112061 × 10$^{-4}$
A8 = −0.12334648 × 10$^{-5}$
A10 = 0.76215998 × 10$^{-7}$
A12 = −0.20244028 × 10$^{-8}$
A14 = 0.24479064 × 10$^{-10}$
A16 = −0.10954239 × 10$^{-12}$

[Asphrical data of 11th surface (r11)]

ϵ = 1.0000
A4 = −0.55031109 × 10$^{-3}$
A6 = 0.30921325 × 10$^{-5}$
A8 = 0.12385990 × 10$^{-6}$
A10 = −0.32350962 × 10$^{-8}$
A12 = 0.36112675 × 10$^{-10}$
A14 = −0.21846265 × 10$^{-12}$
A16 = 0.60374073 × 10$^{-15}$

Figure 19:
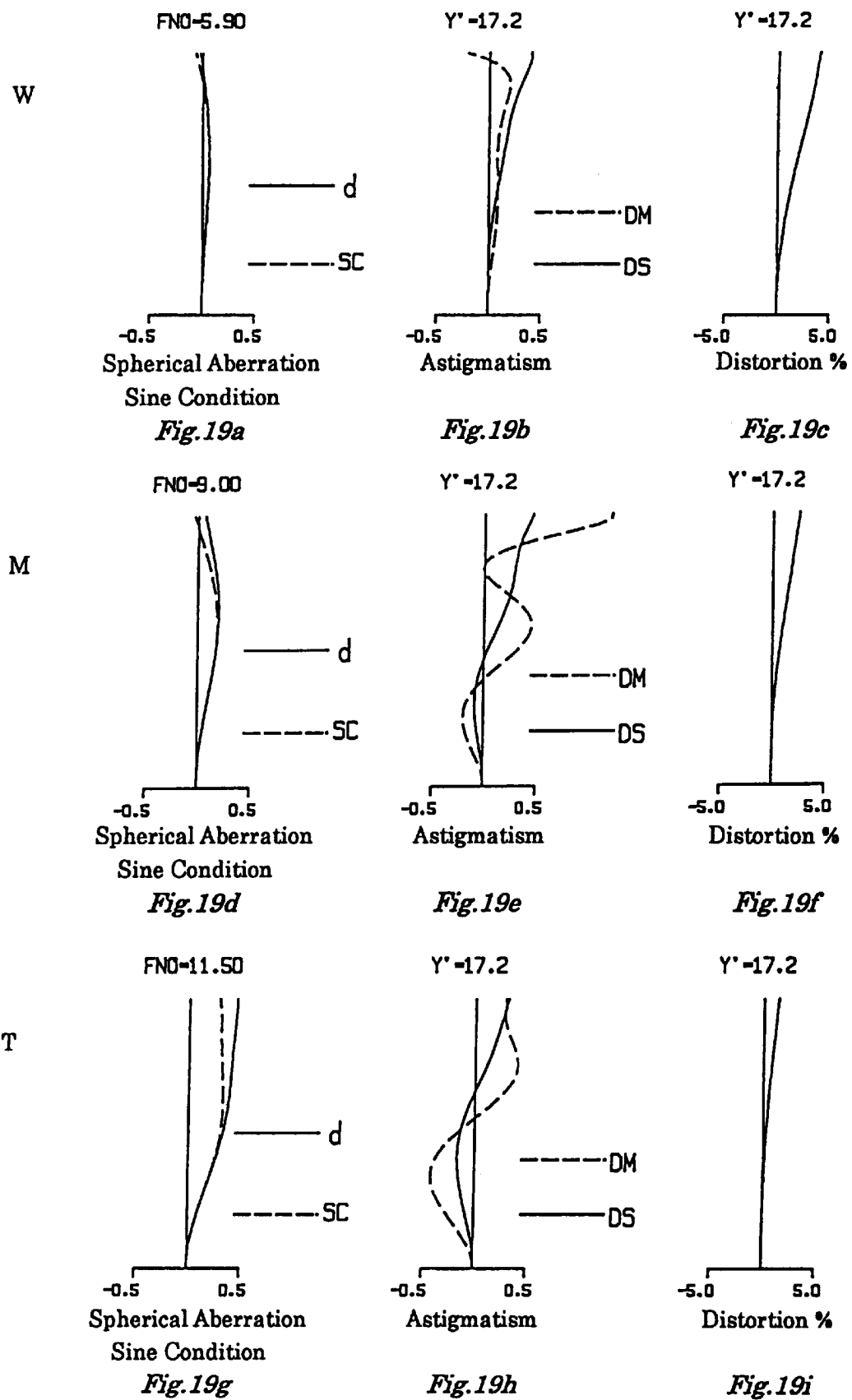
FIGS. 19*a*~19*c* are aberration diagrams of aberration in the shortest focal length condition of the zoom lens system of the eighth embodiment, with 19*a* showing spherical aberration and sine condition, 19*b* showing astigmatism, and 19*c* showing distortion.
FIGS. 19*d*~19*f* are aberration diagrams of aberration in the intermediate focal length condition of the zoom lens system of the eighth embodiment, with 19*d* showing spherical aberration and sine condition, 19*e* showing astigmatism, and 19*f* showing distortion.
FIGS. 19*g*~19*i* are aberration diagrams of aberration in the longest focal length condition of the zoom lens system of the eighth embodiment, with 19*g* showing spherical aberration and sine condition, 19*h* showing astigmatism, and 19*i* showing distortion.
Figure 20:
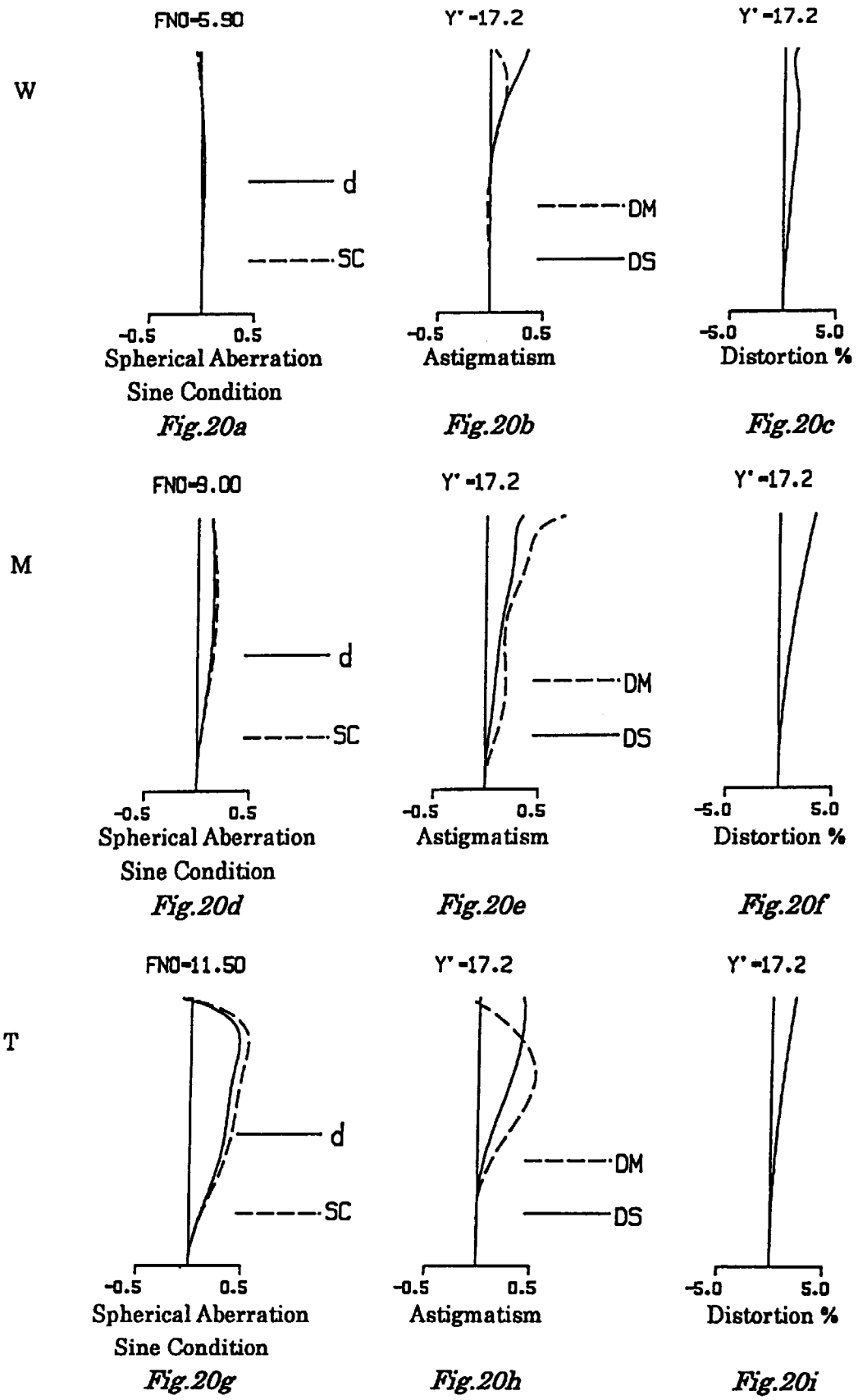
FIGS. 20a~20c are aberration diagrams of aberration in the shortest focal length condition of the zoom lens system of the ninth embodiment, with 20a showing spherical aberration and sine condition, 20b showing astigmatism, and 20c showing distortion.
FIGS. 20d~20f are aberration diagrams of aberration in the intermediate focal length condition of the zoom lens system of the ninth embodiment, with 20d showing spherical aberration and sine condition, 20e showing astigmatism, and 20f showing distortion.
FIGS. 20g~20i are aberration diagrams of aberration in the longest focal length condition of the zoom lens system of the ninth embodiment, with 20g showing spherical aberration and sine condition, 20h showing astigmatism, and 20i showing distortion.
Figure 21:
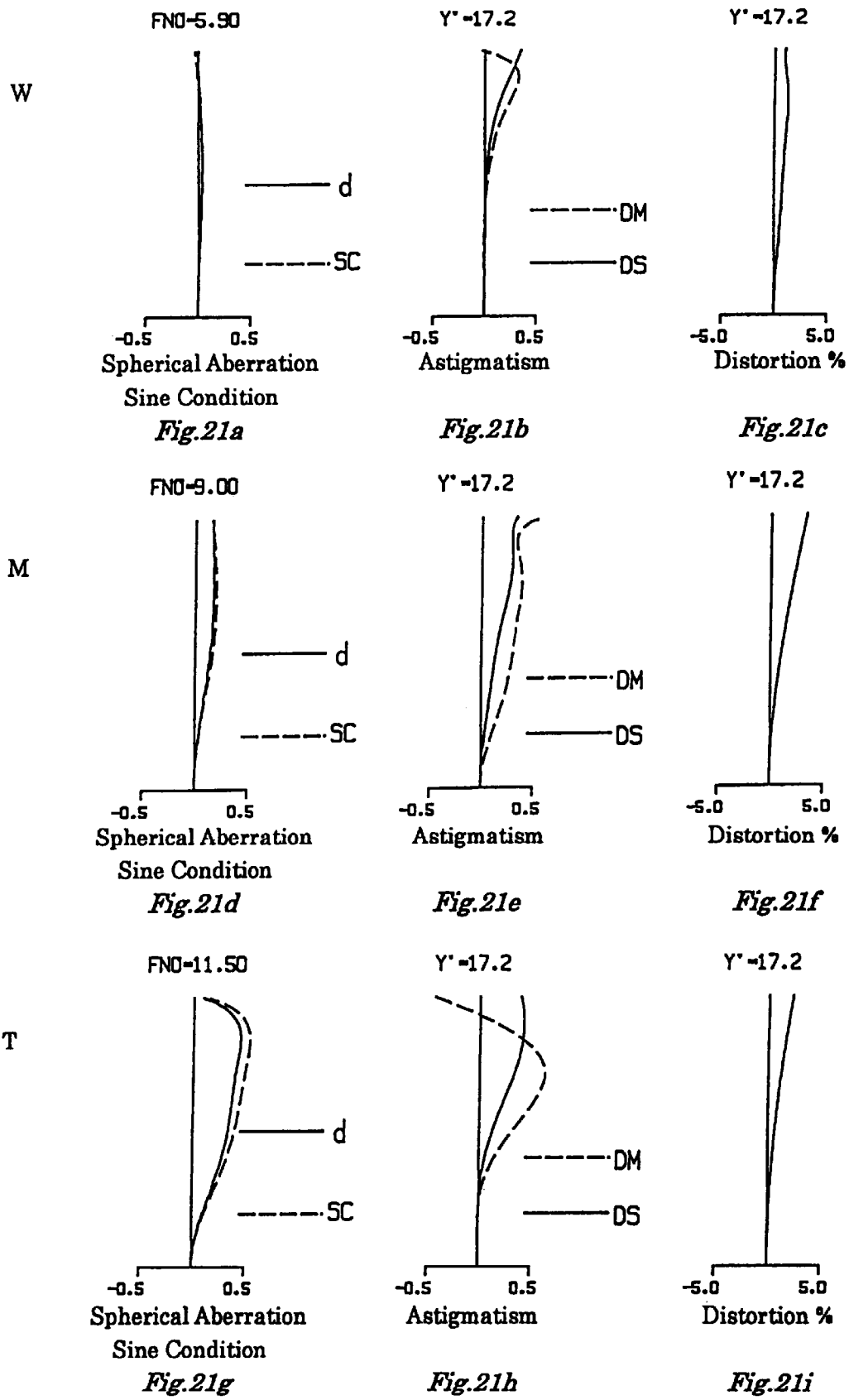
FIGS. 21a~21c are aberration diagrams of aberration in the shortest focal length condition of the zoom lens system of the tenth embodiment, with 21a showing spherical aberration and sine condition, 21b showing astigmatism, and 21c showing distortion.
FIGS. 21d~21f are aberration diagrams of aberration in the intermediate focal length condition of the zoom lens system of the tenth embodiment, with 21d showing spherical aberration and sine condition, 21e showing astigmatism, and 21f showing distortion.
FIGS. 21g~21i are aberration diagrams of aberration in the longest focal length condition of the zoom lens system of the tenth embodiment, with 21g showing spherical aberration and sine condition, 21h showing astigmatism, and 21i showing distortion.
Figure 22:
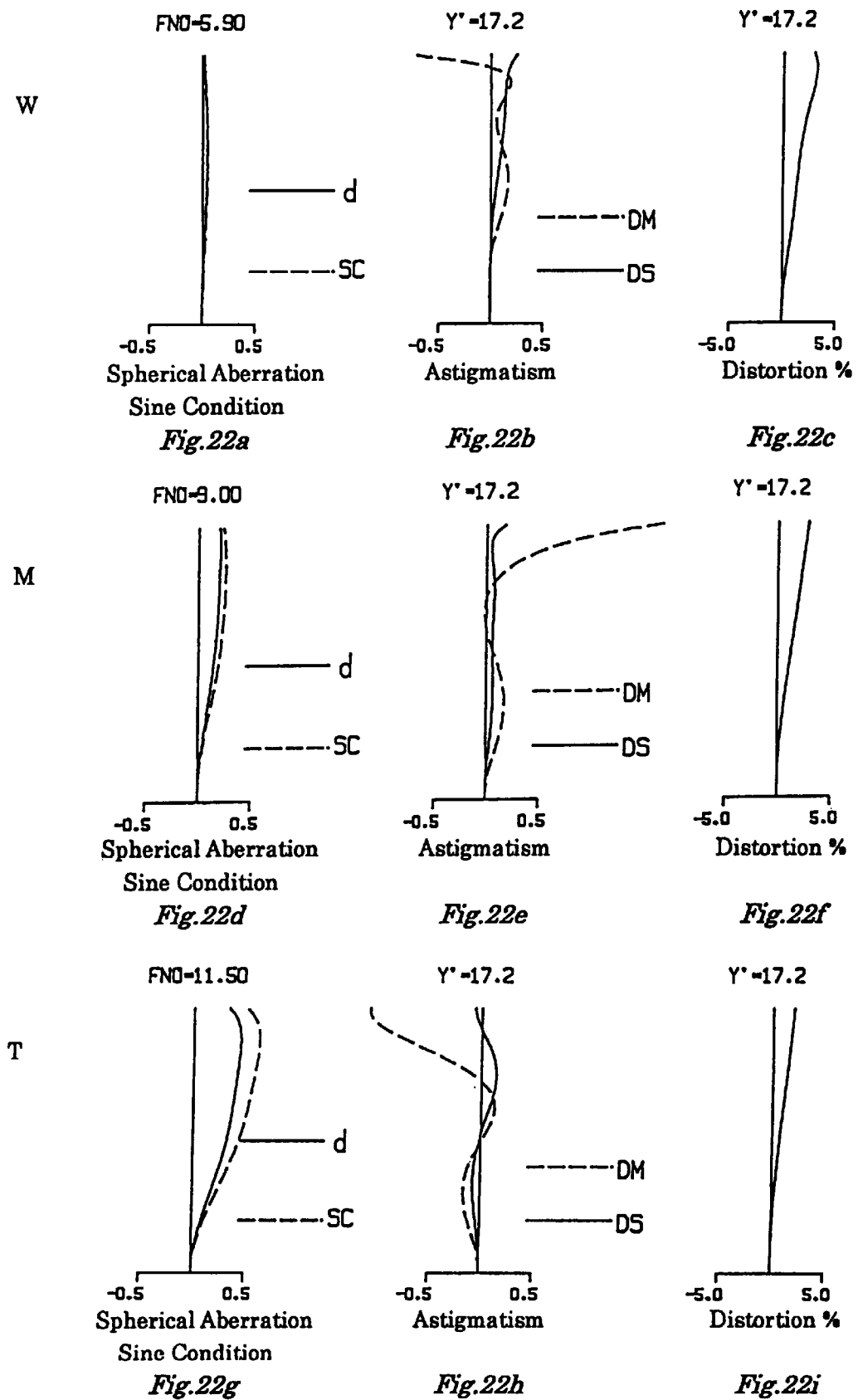
FIGS. 22a~22c are aberration diagrams of aberration in the shortest focal length condition of the zoom lens system of the eleventh embodiment, with 22a showing spherical aberration and sine condition, 22b showing astigmatism, and 22c showing distortion.
FIGS. 22d~22f are aberration diagrams of aberration in the intermediate focal length condition of the zoom lens system of the eleventh embodiment, with 22d showing spherical aberration and sine condition, 22e showing astigmatism, and 22f showing distortion.
FIGS. 22g~22i are aberration diagrams of aberration in the longest focal length condition of the zoom lens system of the eleventh embodiment, with 22g showing spherical aberration and sine condition, 22h showing astigmatism, and 22i showing distortion.

FIGS. 19 through 22 are aberration diagrams corresponding to the eighth through eleventh embodiments; the diagrams show various aberrations (sequentially, spherical aberration, astigmatism, and distortion) in which diagrams labeled a~c show the shortest focal length condition (wide angle end), diagrams labeled d~f show the intermediate focal length condition, and diagrams labeled g~i show the longest focal length condition (telephoto end). In the diagrams, the solid line d represents aberration corresponding to the d-line, the dashed line g represents aberration corresponding to the g-line, and the broken line SC represents the sine condition. The broken line DM and the solid line DS respectively represent astigmatism on the d-line in the meridional plane and the sagittal plane. The vertical axis in the spherical aberration diagrams represent the light ray F number, and the vertical axes in the astigmatism diagrams and distortion diagrams represent the maximum image height Y'.

Values correspondent values of the conditional equations for each embodiment are shown below.

TABLE 13

|  | (9) | (10) | (11) | (12) | (13) | (14) |
|---|---|---|---|---|---|---|
| Embodiment 8 | — | 1.57 | −0.61 | — | 1.55 | 52.2 |
| Embodiment 9 | −1.59 | 1.63 | −0.71 | 1.13 | 1.48 | 53.0 |
| Embodiment 10 | −1.62 | 1.62 | −0.70 | 1.13 | 1.52 | 52.2 |
| Embodiment 11 | −1.74 | 1.66 | −0.65 | 1.13 | 1.56 | 52.2 |

According to the zoom lens systems of the eighth through eleventh embodiments described above, it is possible to achieve a zoom lens system actively using plastic lens elements to lower costs while achieving high variable magnification and compactness with fewer lens elements.

Embodiments Comprising a Single Lens Element in a Lens Unit

Figure 23:
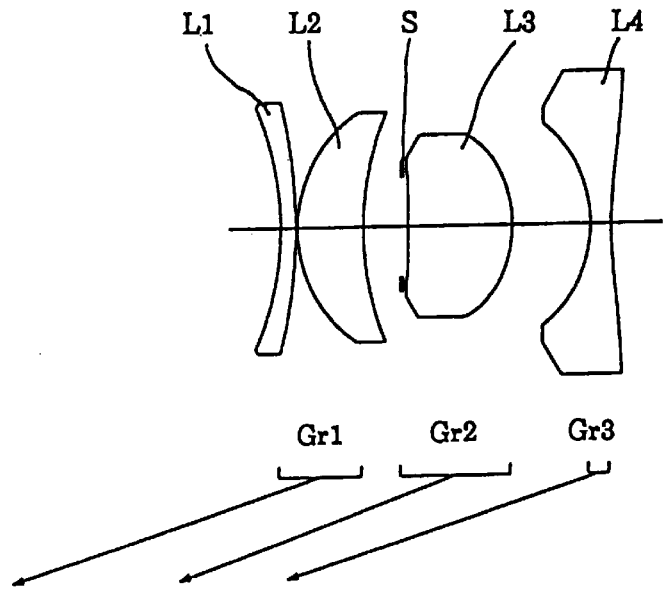
FIG. 23 is a lens layout diagram showing a twelfth embodiment of the zoom lens system in the shortest focal length condition.
Figure 24:
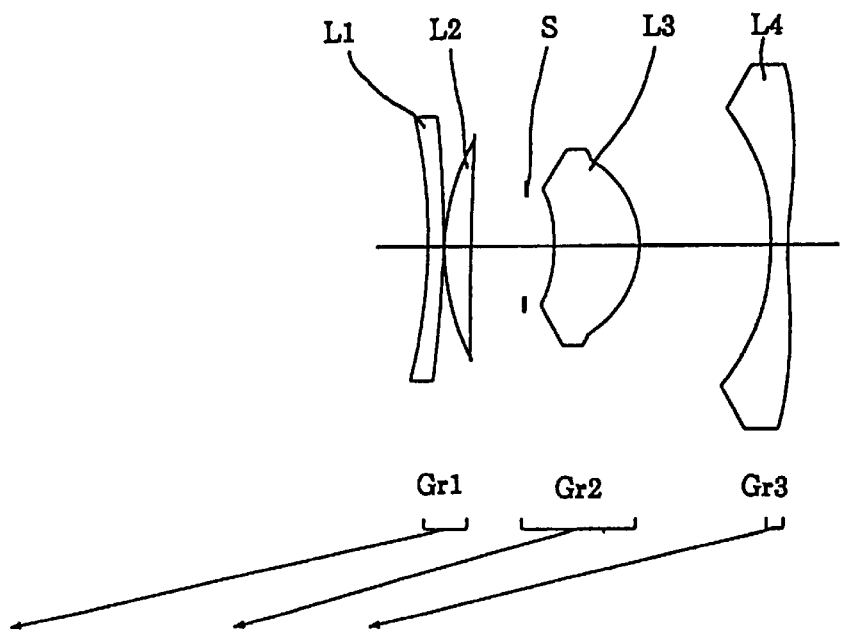
FIG. 24 is a lens layout diagram showing a thirteenth embodiment of the zoom lens system in the shortest focal length condition.
Figure 25:
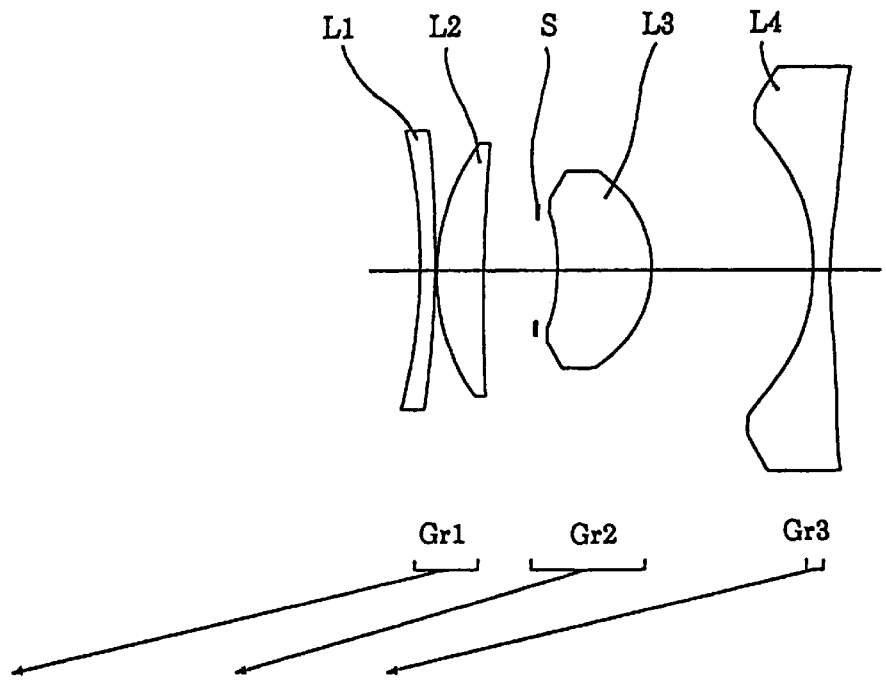
FIG. 25 is a lens layout diagram showing a fourteenth embodiment of the zoom lens system in the shortest focal length condition.
Figure 26:
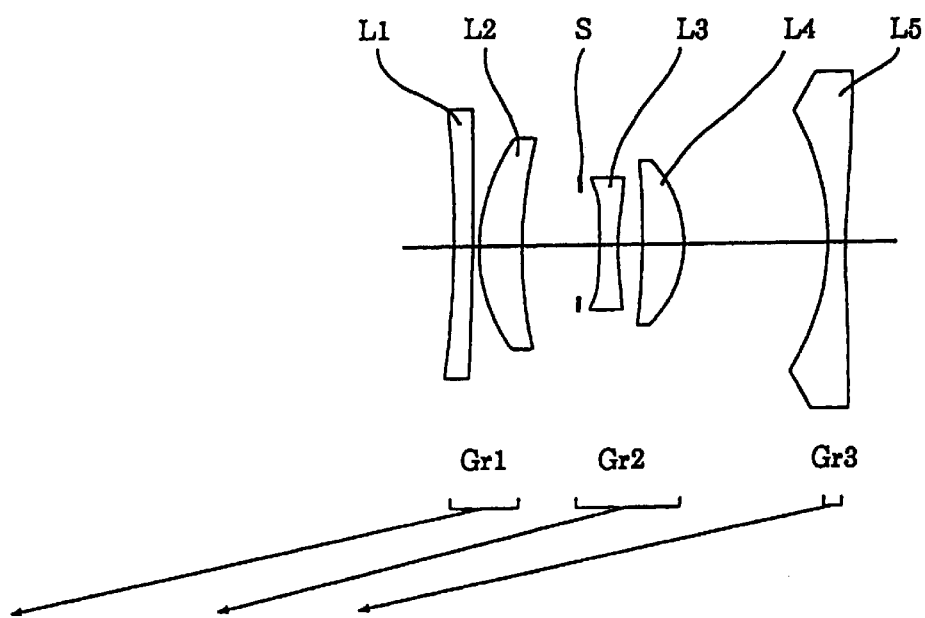
FIG. 26 is a lens layout diagram showing an fifteenth embodiment of the zoom lens system in the shortest focal length condition.

FIGS. 23 through 26 are lens structure diagrams showing the lens construction of the zoom lens systems of further embodiments of the present invention. The drawings respectively correspond to the twelfth through fifteenth embodiments, and each shows the zoom lens system in the shortest focal length condition. The arrows in the drawings schematically represent the movement of each lens unit from the shortest focal length end to the longest focal length end.

The zoom lens systems of the twelfth through the fifteenth embodiments are formed of three lens units, comprising sequentially from the object side a first lens unit Gr1 with positive optical power, a second lens unit Gr2 with positive optical power, and a third lens unit Gr3 with negative optical power, wherein the spacing between lens units changes as the lens units move toward the object side when zooming from the shortest focal length end to the longest focal length end.

The zoom lens system of the twelfth embodiment comprises sequentially from the object side a first lens unit Gr1 including a negative meniscus lens element L1 with a concave surface facing the object side and a positive meniscus second lens element L2 with a convex surface facing the object side, a second lens unit Gr2 including a diaphragm S and a third lens element L3 with bi-aspherical surfaces and negative optical power, and a third lens unit Gr3 including a single fourth lens element L4 with bi-aspherical surfaces and negative optical power.

The zoom lens system of the thirteenth embodiment comprises sequentially from the object side a first lens unit Gr1 including a negative meniscus first lens element L1 with a concave surface facing the object side and a positive meniscus lens element L2 with a convex surface facing the object side, a second lens unit Gr2 of single lens construction including a diaphragm S and a third lens element L3 with bi-aspherical surfaces and positive optical power, and a third lens unit Gr3 of single lens construction including a fourth lens element L4 with bi-aspherical surfaces and negative optical power.

The zoom lens system of the fourteenth embodiment comprises sequentially from the object side a first lens unit Gr1 including a negative meniscus first lens element L1 with a concave surface facing the object side and a positive meniscus second lens element L2 with a convex surface facing the object side, a second lens unit Gr1 of single lens construction including a diaphragm S and a third lens L3 with bilateral aspherical surfaces and positive optical power, and a third lens unit Gr3 of single lens construction including a fourth lens element L4 with bilateral spherical surfaces and negative optical power.

The zoom lens system of the fifteenth embodiment comprises sequentially from the object side a first lens unit Gr1 including a negative meniscus first lens element L1 with a concave surface on the object side and a positive meniscus lens element L2 with a convex surface on the object side, a second lens unit Gr2 including a diaphragm S and a third lens element L3 with bi-aspherical surfaces and negative optical power and a fourth lens element L4 with positive optical power, and a third lens unit Gr3 of single lens construction including a fifth lens element L5 with bi-aspherical surfaces and negative optical power.

In the zoom lens systems of the twelfth through the fifteenth embodiments described above, the third lens unit Gr3, and the second lens unit Gr2 in the twelfth through fourteenth embodiments, comprise a single lens element, and are the minimum number of lens units comprising a zoom lens system which changes the front-to-back spacing during zooming. In this way, the zoom lens system is constructed using the minimum number of lens elements as lens units, for the following reasons.

Generally, in zoom lens systems using three or more lens units, the various aberrations generated by each lens unit are corrected within the lens unit to correct chromatic aberration at each focal length, so as to construct a total system which minimizes the aberration coefficient of each lens unit. Since lens units having chromatic aberration coefficients of different signs are essential particularly for correcting axial chromatic aberration, the lens units used in a conventional zoom lens system must be at minimum a dual lens unit comprising a lens element with positive optical power and a lens element with negative optical power. Since other aberration must be minimized by the lens unit, the number of lens elements naturally increases to assure design freedom.

In contrast, in the zoom lens systems of the twelfth through the fourteenth embodiments, axial chromatic aberration generated by each lens unit is offset between lens unit which change spacing during zooming. Using this type of construction on the one hand achieves suitable chromatic aberration correction and increases to freedom for correcting aberration other than axial chromatic aberration within the lens unit, and on the other hand minimizes total axial chromatic aberration by mutually cancellation between the lens unit with positive optical power and the lens unit with negative optical power and without complete correction within the lens unit.

Suitable axial chromatic aberration correction can be achieved between lens unit by satisfying the conditional equations below.

$$-0.020 < Lt < 0.020 \qquad (15)$$

$$0.02 < |Lgp| < 0.20 \qquad (16)$$

$$0.02 < |Lgn| < 0.20 \qquad (17)$$

$$0.60 < |Lgp/Lgn| < 1.40 \qquad (18)$$

where

Lt represents an axial chromatic aberration coefficient of the entire zoom lens system in a longest focal length condition with the entire focal length of the zoom lens system as a normalized unit, Lgp represents an axial chromatic aberration coefficient of the positive lens unit with the entire focal length of the zoom lens system as a normalized unit, and Lgn represents an axial chromatic aberration coefficient of the negative lens unit with the entire focal length of the zoom lens system as a normalized unit.

Conditional equation (15) relates to the amount of axial chromatic aberration generated by the total system in the longest focal length condition, and stipulates the range of the axial chromatic aberration coefficient in the longest focal length condition of the total system. When the axial chromatic aberration coefficient exceeds the range stipulated by conditional equation (15) in the most extreme long focal length condition of the total system, it becomes difficult to assure performance tolerances as a photographic lens system.

Conditional equations (16) and (17) relate to the amount of axial aberration generated by the positive lens unit and the negative lens unit in the longest focal length condition, and stipulate the range of the axial aberration coefficient in the longest focal length condition of the total system. In a zoom lens system, if the value of the axial chromatic aberration coefficient is so large as to exceed the upper limit of conditional equations (16) or (17), it becomes difficult to correct the axial chromatic aberration between the positive lens unit and the negative lens unit. Conversely, if the value of the axial chromatic aberration coefficient is so small as to exceed the lower limit of the conditional equations (16) or (17), it becomes necessary to correct the axial chromatic aberration within each lens unit, thereby increasing the number of lenses and requiring a reduction in the optical power of each lens unit, such that a compact zoom lens system cannot be achieved.

Conditional equation (18) stipulates the ratio of the amount of axial aberration generated by the positive lens unit and the negative lens unit in the longest focal length condition. When the upper or lower limit of conditional equation (18) is exceeded, the axial chromatic aberration cannot be cancelled by the positive lens unit and negative lens unit, and as a result the total system axial chromatic aberration undesirably exceeds tolerance levels.

Since the axial chromatic aberration generated by each lens unit is appropriate in a zoom lens system which simultaneously satisfies conditional equations (15) through (18), a zoom lens system is produced which provides excellent correction of axial chromatic aberration despite using fewer lens elements in a compact construction.

In conditional equation (18), it is desirable that the following range is satisfied.

$$0.70<|Lgp/Lgn|<1.00 \qquad (18')$$

Since there is extremely little generation of axial chromatic aberration by other lens elements when a positive lens unit which satisfies conditional equation (16) and a negative lens unit satisfies conditional equation (17), it is desirable that the value of the axial chromatic aberration coefficient of each lens unit approaches 0. When conditional equation (18') is satisfied in addition to the prerequisite conditional equations (15)~(18), the positive lens unit and the negative lens unit generate nearly equal amounts of axial chromatic aberration, so as to mutually cancel one another. As a result, the value of the axial chromatic aberration coefficient of the total system is desirably minimized.

From a separate perspective, it is desirable to satisfy conditional equations below.

$$0.60<|Lgp/Lgn|<1.40 \qquad (18)$$

$$0.50<fp/fW<1.00 \qquad (19)$$

$$-0.70<fn/fW<-0.40 \qquad (20)$$

where fp represents a focal length of the positive lens unit, fn represents a focal length of the negative lens unit, fW represents a entire focal length in the shortest length condition, Lgp represents an axial chromatic aberration coefficient of the positive lens unit with the entire focal length of the zoom lens system as a normalized unit, and Lgn represents an axial chromatic aberration coefficient of the negative lens unit with the entire focal length of the zoom lens system as a normalized unit.

Conditional equation (18) conforms to previous conditions.

Conditional equation (19) stipulates the optical power of the positive lens unit. When the upper limit of conditional equation (19) is exceeded, the optical power of the positive lens unit is reduced relative to the focal length of the total system, which is advantageous for aberration correction beginning with axial chromatic aberration, but since the total length of the positive lens unit is greater, a compact zoom lens system cannot be achieved. Conversely, when the lower limit of conditional equation (19) is exceeded, the optical power of the positive lens unit is increased relative to the total system focal length, thereby excessively increasing the amount of aberration generated beginning with axial chromatic aberration, and making correction difficult.

Conditional equation (20) stipulates the optical power of the negative lens unit. When the upper limit of conditional equation (20) is exceeded, the optical power of the positive lens unit is increased relative to the total system focal length, thereby excessively increasing the amount of aberration generated beginning with axial chromatic aberration, and making correction difficult. Conversely, when the lower limit of conditional equation (20) is exceeded, the optical power of the negative lens unit is reduced relative to the focal length of the total system, which is advantageous for aberration correction beginning with axial chromatic aberration, but since the total length of the positive lens unit is greater, a compact zoom lens system cannot be achieved.

Since a zoom lens system which simultaneously satisfies conditional equations (19) and (20) provides a suitable balance between the generated axial chromatic aberration and the optical power of the lens unit used to correct axial chromatic aberration, a zoom lens system providing excellent axial chromatic aberration correction can be achieved despite using fewer lenses in a compact construction.

Furthermore, from another perspective, the axial chromatic aberration coefficients generated by a single lens unit comprising a lens element all have the same sign, and may be used in a zoom lens system to satisfy conditional equation (18).

Normally, in zoom lens systems, the axial chromatic aberration coefficient of each lens unit is reduced, to minimize the axial chromatic aberration generated by each lens unit. In this way, for example, even when a lens unit is constructed using a single lens element, the axial chromatic aberration coefficients have mutually opposite signs so as to nullify the axial chromatic aberration generated by the other lens unit.

In contrast, since the axial chromatic aberration coefficient need not be minimized in the zoom lens system of the aforesaid embodiments, a greater degree of freedom in correcting aberration is possible by using a construction wherein bi-surfaces have axial chromatic aberration coefficients of the same sign, such as, for example, a biconcave shape in the case of the negative lens.

With the aforesaid construction as a prerequisite, a compact zoom lens system with minimized total axial chromatic aberration can be achieved with excellent aberration correction using fewer lens elements by satisfying the aforesaid conditional equation (18).

In addition to the basic construction of the aforesaid three types, it is further desirable that the zoom lens systems of the embodiments satisfy the conditions below.

$$-0.8 < f3/fW < -0.4 \tag{21}$$

where f3 represents the focal length of the third lens unit, and fW represents the focal length of the total system in the shortest focal length condition.

Conditional equation (21) stipulates the optical power of the third lens unit (single lens element) when the third lens unit is a single lens element with negative optical power in a zoom lens system comprising sequentially from the object side a first lens unit with positive optical power, a second lens unit with positive optical power, and a third lens unit with negative optical power, as in the previously described embodiments.

When the upper limit of conditional equation (21) is exceeded, it becomes extremely difficult to balance axial chromatic aberration and correct other aberration due to the extremely strong optical power of the third lens unit. Conversely, when the lower limit of conditional equation (21) is exceeded, the effective diameter of the third lens unit becomes larger, and the size increases in a direction perpendicular to the optical axis, such that a compact zoom lens system cannot be achieved.

It is desirable that the zoom lens system of the aforesaid embodiments further satisfy the following condition.

$$0.5 < CR3/fW < 0.60 \tag{22}$$

where

CR3 represents the radius of curvature of the surface nearest the image side in the third lens unit, and fW represents the focal length of the total system in the shortest focal length condition.

Conditional equation (22) stipulates the radius of curvature of the surface on the image side of the third lens unit (single lens element) when the third lens unit is a single lens element with negative optical power in a zoom lens system comprising sequentially from the object side a first lens unit with positive optical power, a second lens unit with positive optical power, and a third lens unit with negative optical power, as in the previously described embodiments.

Since the third lens unit requires strong optical power in this construction, the eccentric error sensitivity tends to be very high in the lens unit comprising the third lens unit. When the eccentric error sensitivity becomes high, the optical system becomes difficult to manufacture, and has extremely low practicality.

In order to reduce eccentric error sensitivity while maintaining the optical power of the third lens unit as a whole, suitable aberration correction must be performed by the third lens unit. In the constructions of the aforesaid embodiments, the tertiary spherical aberration coefficient must be reduced to reduce the eccentric error sensitivity, and conditional equation (22) is a condition related to the correction of such aberration.

When the upper limit of conditional equation (22) is exceeded, the curvature of the surface on the image side of the third lens unit (single lens element) becomes excessively large, such that the curvature of the surface on the object side becomes excessively small relative to maintaining total optical power of the third lens unit as a whole. As a result, spherical aberration generated by the surface on the object side is shifted greatly to the underside so as to make correction difficult. Conversely, when the lower limit of conditional equation (22) is exceeded, the curvature of the surface on the image side of the third lens unit (single lens element) becomes excessively small, and the curvature of the surface on the object side becomes excessively large relative to maintaining total optical power of the third lens unit as a whole. As a result, spherical aberration generated by the surface on the image side is shifted greatly to the underside, so as to make correction difficult.

By using the axial chromatic aberration correction method described in detail above, it is possible to use only a single lens in both the second and third lens units. In this way, when two lens units are only single lens elements among the lens units comprising a zoom lens system, the total length of the zoom lens system is greatly reduced, so as to produce a very compact zoom lens system.

It is desirable that at least on surface of the second lens unit and the third lens unit is an aspherical surface in the zoom lens system of the aforesaid embodiments.

In order to achieve compactness in the zoom lens system of each embodiment, constructions providing extremely strong optical power are used in the second lens unit and the third lens unit. In this way, the eccentric error sensitivity is very high in the second lens unit and the third lens unit. Therefore, an aspherical surface is provided in both the second lens unit and the third lens unit so as to balance the eccentric error sensitivity and aberration correction of each lens unit.

It is desirable that the aspherical surface provided in the second lens unit and the third lens unit satisfies the following condition.

$$-0.05 < \phi x(N-N')xd/dy\{x(y)-x0(y)\} < 0 \tag{23}$$

where $\phi$ represents the optical power of the lens unit,

N' represents the refractive index of the medium on the object side of the aspherical surface, N represents the refractive index of the medium on the image side of the lens unit, x(y) represents the surface shape of the aspherical surface, and x0(y) represents the shape of a reference spherical surface of the aspherical surface, and x(y) and x0(y) are defined by the above mentioned equations (AS) and (AE).

When the upper limit of conditional equation (23) is exceeded, it becomes difficult to correct aberration in the shortest focal length condition, particularly distortion. Conversely, when the lower limit of conditional equation (23) is exceeded, it becomes difficult to correct coma and spherical aberration in the longest focal length condition.

The tertiary spherical aberration coefficient and the coma coefficient are closely related to the eccentric error sensitivity, and limiting both coefficients to suitable values is very effective in reducing eccentric error sensitivity. In particular, the tertiary spherical aberration coefficient of the lens unit must be limited to reduced the sensitivity relative to axial coma of the lens unit, and the coma coefficient of the lens unit must be restricted to reduce the sensitivity to the asymmetry on the image side.

Since the spherical aberration coefficient of the lens can mainly be controlled by providing an aspherical surface in the lens element of the lens unit, other aberration can be suitable corrected while optimizing the spherical aberration coefficient.

When a single lens element with negative optical power is used to construct the third lens unit, it is desirable that the bilateral surfaces on the object side and the image side of the single lens are aspherical in shape. Effective aberration correction can be achieved by having the third lens unit as a bi-aspherical lens. Furthermore, when the bilateral surfaces are aspherical surfaces as stipulated in conditional equation (23), in addition to the aforesaid aberration correction, it is also becomes possible to achieve excellent balance between the aberration correction and the error sensitivity, and in addition to this performance, also provides a zoom lens system which is easy to assemble and adjust.

Specific examples of construction data and aberration diagrams are provided below.

In each example, ri (i=1, 2, 3, ...) represents the radius of curvature of the No. ith surface counting from the object side, di (i=1, 2, 3, ...) represents the No. ith axial distance counting from the object side, Ni (i=1, 2, 3, ...) and vi (i=1, 2, 3, ...) represent the refractive index and Abbe number (vd) relative to the d-line of the No. ith lens element counting from the object side. The symbol f represents the total system focal length, and FNO represents the F number. In each example, the total system focal length f, F number FNO, and space between lens units (axial distance) sequentially from the left correspond to values for the shortest focal length condition (wide angle end) [W], intermediate focal length condition [M], and the longest focal length condition (telephoto end) [T].

Surfaces with an asterisk (*) symbol affixed to the radius of curvature ri are surfaces constructed as aspherical surfaces, or refractive optical surfaces having an aspherical shape, as defined by the above mentioned equation (AS).

Values corresponding to the conditional equation (23) of each embodiment are also shown. A letter E following the numeric data indicates an exponent component, e.g., 1.0E-2 represents $1.0 \times 10^{-2}$. In conditional equation (23), 1.0Ymax is equivalent to the maximum effective diameter.

TABLE 14

Embodiment 12 f = 23.20~43.80~65.80
FNO = 5.65~7.40~9.80

| [Radius of curvature] | [Axial distance] | [Refractive Index] | [Abbe number] |
|---|---|---|---|
| r1 = −16.065 | | | |
| | d1 = 0.800 | N1 = 1.84666 | v1 = 23.82 |
| r2 = −27.972 | | | |
| | d2 = 0.100 | | |
| r3 = 7.315 | | | |
| | d3 = 3.500 | N2 = 1.51742 | v2 = 52.15 |
| r4 = 15.617 | | | |
| | d4 = 2.071~4.580~5.492 | | |
| r5 = ∞ (Diaphragm S) | | | |
| | d5 = 0.300 | | |
| r6* = 90.621 | | | |
| | d6 = 5.500 | N3 = 1.48749 | v3 = 70.44 |
| r7* = −6.504 | | | |
| | d7 = 4.100~1.536~0.500 | | |

TABLE 14-continued

| r8* = −6.899 | | | |
|---|---|---|---|
| | d8 = 1.092 | N4 = 1.48749 | v4 = 70.44 |
| r9* = 20.059 | | | |

[Asphrical data of 6th surface (r6)]

$\epsilon$ = 1.0000
A4 = −0.11410562 × 10$^{-2}$
A6 = −0.64969863 × 10$^{-4}$
A8 = 0.11385039 × 10$^{-4}$
A10 = −0.17948192 × 10$^{-5}$
A12 = 0.87366773 × 10$^{-7}$

[Asphrical data of 7th surface (r7)]

$\epsilon$ = 1.0000
A4 = 0.65012332 × 10$^{-3}$
A6 = −0.83420723 × 10$^{-4}$
A8 = 0.28329801 × 10$^{-5}$
A10 = −0.27449890 × 10$^{-7}$
A12 = −0.17990462 × 10$^{-8}$

[Asphrical data of 8th surface (r8)]

$\epsilon$ = 1.4790
A4 = 0.98528827 × 10$^{-3}$
A6 = 0.78199969 × 10$^{-4}$
A8 = 0.45004261 × 10$^{-5}$
A10 = −0.14439033 × 10$^{-6}$
A12 = 0.23949823 × 10$^{-8}$

[Asphrical data of 9th surface (r9)]

$\epsilon$ = 1.0000
A4 = −0.52084350 × 10$^{-3}$
A6 = 0.63508909 × 10$^{-5}$
A8 = −0.35839484 × 10$^{-7}$

[Conditional equation (23) values of 9th surface (r9)]

| 0.1 Ymax | −0.3716E−04 |
|---|---|
| 0.2 Ymax | −0.2888E−03 |
| 0.3 Ymax | −0.9281E−03 |
| 0.4 Ymax | −0.2054E−02 |
| 0.5 Ymax | −0.3670E−02 |
| 0.6 Ymax | −0.5689E−02 |
| 0.7 Ymax | −0.7963E−02 |
| 0.8 Ymax | −0.1035E−01 |
| 0.9 Ymax | −0.1284E−01 |
| 1.0 Ymax | −0.1568E−01 |

TABLE 15

Embodiment 13 f = 23.20~65.80~87.75
FNo = 5.65~9.68~10.75

| [Radius of curvature] | [Axial distance] | [Refractive Index] | [Abbe number] |
|---|---|---|---|
| r1 = −29.533 | | | |
| | d1 = 0.800 | N1 = 1.80518 | v1 = 25.43 |
| r2 = −57.285 | | | |
| | d2 = 0.100 | | |
| r3 = 11.922 | | | |
| | d3 = 1.400 | N2 = 1.48749 | v2 = 70.44 |
| r4 = 195.545 | | | |
| | d4 = 2.908~11.629~12.542 | | |
| r5 = ∞ (Diaphragm S) | | | |
| | d5 = 1.522 | | |
| r6* = −9.847 | | | |
| | d6 = 4.500 | N3 = 1.52510 | v3 = 56.38 |
| r7* = −5.141 | | | |
| | d7 = 6.887~1.495~0.584 | | |
| r8* = −21.163 | | | |
| | d8 = 0.900 | N4 = 1.77250 | v4 = 49.77 |
| r9* = 18.370 | | | |

[Asphrical data of 6th surface (r6)]

$\epsilon$ = 1.0000

TABLE 15-continued

A4 = −0.15548153 × 10⁻²
A6 = −0.50950737 × 10⁻⁴
A8 = −0.35299526 × 10⁻⁵
A10 = 0.72126983 × 10⁻⁶
A12 = −0.72830247 × 10⁻⁷
[Asphrical data of 7th surface (r7)]

ε = 1.0000
A4 = 0.36831005 × 10⁻³
A6 = −0.17662464 × 10⁻⁴
A8 = 0.14355904 × 10⁻⁵
A10 = −0.31505926 × 10⁻⁷
A12 = −0.62916163 × 10⁻⁹
[Asphrical data of 8th surface (r8)]

ε = 4.2628
A4 = −0.86245886 × 10⁻³
A6 = −0.15505773 × 10⁻⁵
A8 = 0.65033110 × 10⁻⁶
A10 = −0.11179784 × 10⁻⁷
A12 = 0.51342515 × 10⁻¹⁰
[Asphrical data of 9th surface (r9)]

ε = 1.0000
A4 = −0.11176524 × 10⁻²
A6 = 0.17180212 × 10⁻⁴
A8 = −0.10642119 × 10⁻⁶
A10 = −0.20781654 × 10⁻⁹
A12 = 0.32998343 × 10⁻¹¹
[Conditional equation (23) values of 6th surface (r6)]

| | |
|---|---|
| 0.1 Ymax | −0.4914E−05 |
| 0.2 Ymax | −0.3979E−04 |
| 0.3 Ymax | −0.1371E−03 |
| 0.4 Ymax | −0.3349E−03 |
| 0.5 Ymax | −0.6797E−03 |
| 0.6 Ymax | −0.1230E−02 |
| 0.7 Ymax | −0.2064E−02 |
| 0.8 Ymax | −0.3301E−02 |
| 0.9 Ymax | −0.5180E−02 |
| 1.0 Ymax | −0.8255E−02 |

[Conditional equation (23) values of 7th surface (r7)]

| | |
|---|---|
| 0.1 Ymax | −0.4298E−05 |
| 0.2 Ymax | −0.3306E−04 |
| 0.3 Ymax | −0.1055E−03 |
| 0.4 Ymax | −0.2357E−03 |
| 0.5 Ymax | −0.4426E−03 |
| 0.6 Ymax | −0.7702E−03 |
| 0.7 Ymax | −0.1319E−02 |
| 0.8 Ymax | −0.2297E−02 |
| 0.9 Ymax | −0.4109E−02 |
| 1.0 Ymax | −0.7549E−02 |

[Conditional equation (23) values of 8th surface (r8)]

| | |
|---|---|
| 0.1 Ymax | 0.7701E−04 |
| 0.2 Ymax | 0.6157E−03 |
| 0.3 Ymax | 0.2051E−02 |
| 0.4 Ymax | 0.4671E−02 |
| 0.5 Ymax | 0.8393E−02 |
| 0.6 Ymax | 0.1258E−01 |
| 0.7 Ymax | 0.1618E−01 |
| 0.8 Ymax | 0.1849E−01 |
| 0.9 Ymax | 0.2074E−01 |
| 1.0 Ymax | 0.2804E−01 |

[Conditional equation (23) values of 9th surface (r9)]

| | |
|---|---|
| 0.1 Ymax | −0.1771E−03 |
| 0.2 Ymax | −0.1344E−02 |
| 0.3 Ymax | −0.4146E−02 |
| 0.4 Ymax | −0.8646E−02 |
| 0.5 Ymax | −0.1429E−01 |
| 0.6 Ymax | −0.2016E−01 |
| 0.7 Ymax | −0.2559E−01 |
| 0.8 Ymax | −0.3084E−01 |
| 0.9 Ymax | −0.3735E−01 |
| 1.0 Ymax | −0.4627E−01 |

TABLE 16

Embodiment 14 f = = 23.20~65.80~87.75
FNO = 5.65~9.68~10.75

| [Radius of curvature] | [Axial distance] | [Refractive Index] | [Abbe number] |
|---|---|---|---|
| r1 = −32.382 | | | |
| | d1 = 0.800 | N1 = 1.80518 | ν1 = 25.43 |
| r2 = −64.462 | | | |
| | d2 = 0.100 | | |
| r3 = 11.767 | | | |
| | d3 = 2.500 | N2 = 1.48749 | ν2 = 70.44 |
| r4 = 98.066 | | | |
| | d4 = 2.846~10.634~11.617 | | |
| r5 = ∞ (Diaphragm S) | | | |
| | d5 = 1.116 | | |
| r6* = −12.920 | | | |
| | d6 = 5.000 | N3 = 1.48749 | ν3 = 70.44 |
| r7* = −5.954 | | | |
| | d7 = 8.555~1.684~0.547 | | |
| r8* = −12.374 | | | |
| | d8 = 0.900 | N4 = 1.51680 | ν4 = 64.20 |
| r9* = 19.084 | | | |

[Asphrical data of 6th surface (r6)]

ε = 1.0000
A4 = −0.10529281 × 10⁻²
A6 = −0.23799957 × 10⁻⁴
A8 = −0.32454137 × 10⁻⁵
A10 = 0.70068618 × 10⁻⁶
A12 = −0.50290059 × 10⁻⁷
[Asphrical data of 7th surface (r7)]

ε = 1.0000
A4 = 0.27910296 × 10⁻³
A6 = −0.33723934 × 10⁻⁴
A8 = 0.32875243 × 10⁻⁵
A10 = −0.15975363 × 10⁻⁶
A12 = 0.31600858 × 10⁻⁸
[Asphrical data of 8th surface (r8)]

ε = −10.1025
A4 = −0.11100734 × 10⁻²
A6 = 0.76742590 × 10⁻⁵
A8 = 0.37649214 × 10⁻⁶
A10 = −0.96705926 × 10⁻⁸
A12 = 0.70427770 × 10⁻¹⁰
[Asphrical data of 9th surface (r9)]

ε = 1.0000
A4 = −0.69009201 × 10⁻³
A6 = 0.10826764 × 10⁻⁴
A8 = −0.93447054 × 10⁻⁷
A10 = 0.36113330 × 10⁻⁹
A12 = −0.32082971 × 10⁻¹²
[Conditional equation (23) values of 6th surface (r6)]

| | |
|---|---|
| 0.1 Ymax | −0.2594E−05 |
| 0.2 Ymax | −0.2093E−04 |
| 0.3 Ymax | −0.7175E−04 |
| 0.4 Ymax | −0.1740E−03 |
| 0.5 Ymax | −0.3500E−03 |
| 0.6 Ymax | −0.6260E−03 |
| 0.7 Ymax | −0.1032E−02 |
| 0.8 Ymax | −0.1607E−02 |
| 0.9 Ymax | −0.2421E−02 |
| 1.0 Ymax | −0.3655E−02 |

[Conditional equation (23) values of 7th surface (r7)]

| | |
|---|---|
| 0.1 Ymax | −0.2622E−05 |
| 0.2 Ymax | −0.1887E−04 |
| 0.3 Ymax | −0.5425E−04 |
| 0.4 Ymax | −0.1069E−03 |
| 0.5 Ymax | −0.1775E−03 |
| 0.6 Ymax | −0.2772E−03 |
| 0.7 Ymax | −0.4218E−03 |
| 0.8 Ymax | −0.6285E−03 |

TABLE 16-continued

| | |
|---|---|
| 0.9 Ymax | −0.1014E−02 |
| 1.0 Ymax | −0.2257E−02 |
| [Conditional equation (23) values of 9th surface (r9)] | |
| 0.1 Ymax | −0.9960E−04 |
| 0.2 Ymax | −0.7415E−03 |
| 0.3 Ymax | −0.2220E−02 |
| 0.4 Ymax | −0.4458E−02 |
| 0.5 Ymax | −0.7080E−02 |
| 0.6 Ymax | −0.9676E−02 |
| 0.7 Ymax | −0.1211E−01 |
| 0.8 Ymax | −0.1416E−01 |
| 0.9 Ymax | −0.1723E−01 |
| 1.0 Ymax | −0.1838E−01 |

TABLE 17

Embodiment 15 f = 22.70~51.62~89.00
FNO = 6.00~8.40~11.18

| [Radius of curvature] | [Axial distance] | [Refractive Index] | [Abbe number] |
|---|---|---|---|
| r1 = −65.000 | | | |
| | d1 = 1.000 | N1 = 1.84666 | ν1 = 23.82 |
| r2 = −296.009 | | | |
| | d2 = 0.350 | | |
| r3 = 9.523 | | | |
| | d3 = 2.300 | N2 = 1.48749 | ν2 = 70.44 |
| r4 = 23.559 | | | |
| | d4 = 3.117~7.986~9.851 | | |
| r5 = ∞ (Diaphragm S) | | | |
| | d5 = 1.050 | | |
| r6* = ∞ | | | |
| | d6 = 1.000 | N3 = 1.52200 | ν3 = 53.00 |
| r7* = 13.270 | | | |
| | d7 = 1.300 | | |
| r8 = −42.475 | | | |
| | d8 = 2.200 | N4 = 1.67790 | ν4 = 55.52 |
| r9* = −6.369 | | | |
| | d9 = 7.656~2.786~0.921 | | |
| r10* = −14.136 | | | |
| | d10 = 0.950 | N5 = 1.76683 | ν5 = 49.47 |
| r11* = 38.445 | | | |

[Asphrical data of 6th surface (r6)]

$\epsilon = 1.0000$
$A4 = -0.30333905 \times 10^{-2}$
$A6 = -0.10299780 \times 10^{-3}$
$A8 = 0.23497966 \times 10^{-4}$
$A10 = -0.31214829 \times 10^{-5}$
$A12 = 0.14925355 \times 10^{-6}$

[Asphrical data of 7th surface (r7)]

$\epsilon = 1.0000$
$A4 = -0.16591999 \times 10^{-2}$
$A6 = -0.93675085 \times 10^{-4}$
$A8 = 0.26326282 \times 10^{-4}$

TABLE 17-continued $A10 = 0.28668999 \times 10^{-5}$
$A12 = 0.12429510 \times 10^{-6}$

[Asphrical data of 10th surface (r10)]

$\epsilon = -20.1153$
$A4 = -0.11386614 \times 10^{-2}$
$A6 = 0.33135709 \times 10^{-4}$
$A8 = -0.67211876 \times 10^{-6}$
$A10 = 0.12186154 \times 10^{-7}$
$A12 = -0.23028968 \times 10^{-9}$
$A14 = 0.30093585 \times 10^{-11}$
$A16 = -0.15889185 \times 10^{-13}$

[Asphrical data of 11th surface (r11)]

$\epsilon = 1.0000$
$A4 = -0.38680196 \times 10^{-3}$
$A6 = 0.43958235 \times 10^{-5}$
$A8 = 0.17112179 \times 10^{-6}$
$A10 = -0.81088683 \times 10^{-8}$
$A12 = 0.14481787 \times 10^{-9}$
$A14 = 0.12505028 \times 10^{-11}$
$A16 = -0.43356942 \times 10^{-14}$

[Conditional equation (23) values of 11th surface (r11)]

| | |
|---|---|
| 0.1 Ymax | −0.4834E−04 |
| 0.2 Ymax | −0.3713E−03 |
| 0.3 Ymax | −0.1155E−02 |
| 0.4 Ymax | −0.2398E−02 |
| 0.5 Ymax | −0.3894E−02 |
| 0.6 Ymax | −0.5406E−02 |
| 0.7 Ymax | −0.6891E−02 |
| 0.8 Ymax | −0.8459E−02 |
| 0.9 Ymax | −0.1011E−01 |
| 1.0 Ymax | −0.1152E−02 |

FIGS. 27 through 30 are aberration diagrams corresponding to the twelfth through fifteenth embodiments.

In each astigmatism diagram, the solid line d represents the amount of spherical aberration on the d-line, the single chain line g represents the amount of spherical aberration on the g-line, the double chain line C represents the amount of spherical aberration on the C-line (embodiments 12 and 15 only), the broken line SC represents the amount by which the sine condition is not satisfied. In each astigmatism diagram, the solid line DS represents the sagittal plane, and the dashed line DM represents the meridional plane. The vertical axis in the spherical aberration diagrams represents the light rays F number, and the vertical axis in the astigmatism and distortion diagrams represent the maximum image height Y'.

Values corresponding to the conditional equations of each embodiment (except for condition (23)) are also shown below.

TABLE 18

| | (15) | (16) | (17) | (18) | (19) | (20) | (21) | (22) |
|---|---|---|---|---|---|---|---|---|
| Embodiment 12 | −0.0044 | 0.0363 | 0.0379 | 0.9588 | 0.5467 | −0.4480 | −0.4480 | 0.8646 |
| Embodiment 13 | −0.0126 | 0.0336 | 0.0502 | 0.6681 | 0.6644 | −0.5433 | −0.5433 | 0.7918 |
| Embodiment 14 | −0.0080 | 0.0226 | 0.0350 | 0.6471 | 0.7905 | −0.6200 | −0.6200 | 0.8225 |
| Embodiment 15 | −0.0111 | 0.0440 | 0.0586 | 0.7502 | 0.6927 | −0.5892 | −0.5892 | 1.6937 |

As fully described above, the zoom lens system of the present invention provides a compact zoom lens system having excellent chromatic aberration correction despite using few lens units in the construction.

Although the lens units included in each of the embodiments comprise only refractive type lenses which deflect incidence light by refraction, the present invention is not limited to this arrangement. For example, each lens unit may be constructed of diffraction type lenses which deflect incidence light by diffraction, or refraction-diffraction type hybrid lenses which deflect incidence light by a combination of diffraction action and refraction action.

What is claimed is:

1. A zoom lens system comprising, from the object side:

a first lens unit having a positive optical power;

a second lens unit having a positive optical power and provided at the image side of the first lens unit with a first variable air space between the first and second lens units, and a third lens unit having a negative optical power and provided at the image side of the second lens unit with a second variable air space between the second and third lens units, wherein a zooming operation is performed by varying the first and second air spaces, and wherein the zooming fulfills the following conditions:

$$1.7 < \beta 3W < 2.0, \text{ and}$$

$$0.40 < LBW/Y' < 0.71$$

where $\beta 3W$ represents a lateral magnification of the third lens unit in a shortest focal length condition, LBW represents a lens back length in the shortest focal length condition (the lens back length is defined as a distance between a summit of a most image side surface of the zoom lens system and an image plane), and Y' represents a maximum image height.

2. A zoom lens system as claimed in claim 1, wherein the zoom lens system fulfills the following condition:

$$1.8 < fT/fW < 5.0$$

where fT represents an entire focal length in a longest focal length condition, and fW represents an entire focal length in the shortest focal length condition.

3. A zoom lens system as claimed in claim 1, wherein the zoom lens system fulfills the following condition:

$$1.00 < TLW/Y' < 1.75$$

where

TLW represents a total length in the shortest focal length condition (the total length is defined as a distance between a summit of a most object side surface of the zoom lens system and an image plane), and Y' represents a maximum image height.

4. A zoom lens system as claimed in claim 1, wherein the zoom lens system fulfills the following condition:

$$-0.8 < f3/fW < -0.4$$

where f3 represents a focal length of the third lens unit, and fW represents an entire focal length in the shortest focal length condition.

5. A zoom lens system as claimed in claim 1, wherein the zoom lens system has five or less lens elements.

6. A zoom lens system as claimed in claim 1, wherein the third lens unit consists of a single lens element having a negative power.

7. A zoom lens system as claimed in claim 1, wherein a most object side surface of the first lens unit has concave shape.

8. A zoom lens system comprising, from the object side:

a first lens unit having a positive optical power;

a second lens unit having a positive optical power and provided at the image side of the first lens unit with a first variable air space between the first and second lens units, and a third lens unit having a negative optical power and provided at the image side of the second lens unit with a second variable air space between the second and third lens units, wherein a zooming operation is performed by varying the first and second air spaces, and wherein the zooming fulfills the following conditions:

$$1.00 < TLW/Y' < 1.75$$

$$-0.8 < f3/fW < -0.4$$

where

TLW represents a total length in a shortest focal length condition (the total length is defined as a distance between a summit of a most object side surface of the zoom lens system and an image plane), Y' represents a maximum image height, f3 represents a focal length of the third lens unit, and fW represents an entire focal length in the shortest focal length condition.

9. A zoom lens system as claimed in claim 8, wherein the zoom lens system fulfills the following condition:

$$0.40 < LBY/Y' < 0.71$$

where

LBW represents a lens back length in the shortest focal length condition (the lens back length is defined as a distance between a summit of a most image side surface of the zoom lens system and an image plane), and Y' represents a maximum image height.

10. A zoom lens system as claimed in claim 8, wherein the zoom lens system fulfills the following condition:

$$1.8 < fT/fW < 5.0$$

where fT represents an entire focal length in a longest focal length condition, and fW represents an entire focal length in the shortest focal length condition.

11. A zoom lens system as claimed in claim 8, wherein the zoom lens system has five or less lens elements.

12. A zoom lens system as claimed in claim 8, wherein the third lens unit consists of a single lens element having a negative power.

13. A zoom lens system as claimed in claim 8, wherein a most object side surface of the first lens unit has a concave shape.

14. A zoom lens system comprising, from the object side:
a first lens unit having a positive optical power;
a second lens unit having a positive optical power and provided at the image side of the first lens unit with a first variable air space between the first and second lens units, and
a third lens unit having a negative optical power and provided at the image side of the second lens unit with a second variable air space between the second and third lens units,
wherein a zooming operation is performed by varying the first and second air spaces, and
wherein the zooming fulfills the following conditions:

$$1.00 < TLW/Y' < 1.75$$

$$1.8 < fT/fW < 5.0$$

where
TLW represents a total length in a shortest focal length condition (the total length is defined as a distance between a summit of a most object side surface of the zoom lens system and an image plane),
Y' represents a maximum image height,
fT represents an entire focal length in a longest focal length condition, and
fW represents an entire focal length in the shortest focal length condition.

15. A zoom lens system as claimed in claim 14, wherein the zoom lens system has five or less lens elements.

16. A zoom lens system as claimed in claim 14, wherein the third lens unit consists of a single lens element having a negative power.

17. A zoom lens system as claimed in claim 14, wherein a most object side surface of the first lens unit has a concave shape.

18. A zoom lens system comprising, from the object side:
a first lens unit having a positive optical power and including a first resin lens element;
a second lens unit having a positive optical power and provided at the image side of the first lens unit with a first variable air space between the first and second lens units; and
a third lens unit having a negative optical power and provided at the image side of the second lens unit with a second variable air space between the second and third lens units, the third lens unit including a second resin lens element,
wherein a zooming operation is performed by varying the first and second air spaces and wherein the zoom lens system fulfills the following condition:

$$-2 < f1p/f3p < -1$$

where
f1p represents a focal length of the first resin lens element, and
f3p represents a focal length of the second resin lens element.

19. A zoom lens system as claimed in claim 18, wherein the first resin lens element has a positive power.

20. A zoom lens system as claimed in claim 18, wherein the second resin lens element has a negative power.

21. A zoom lens system comprising, from the object side:
a first lens unit having a positive optical power and including a resin lens element;
a second lens unit having a positive optical power and provided at the image side of the first lens unit with a first variable air space between the first and second lens units, and
a third lens unit having a negative optical power and provided at the image side of the second lens unit with a second variable air space between the second and third lens units,
wherein a zooming operation is performed by varying the first and second air spaces, and
wherein the zoom lens system fulfills the following condition:

$$1.00 < TLW/Y' < 1.75$$

where
TLW represents a total length in a shortest focal length condition (the total length is defined as a distance between a summit of a most object side surface of the zoom lens system and an image plane), and
Y' represents a maximum image height.

22. A zoom lens system as claimed in claim 21, wherein the resin lens element has a positive power.

23. A zoom lens system as claimed in claim 21, wherein the zoom lens system fulfills the following condition:

$$0.5 < f1p/fW < 2$$

where
f1p represents a focal length of the resin lens element, and
fW represents an entire focal length in the shortest focal length condition.

24. A zoom lens system comprising, from the object side:
a first lens unit having a positive optical power;
a second lens unit having a positive optical power and provided at the image side of the first lens unit with a first variable air space between the first and second lens units, and
a third lens unit having a negative optical power and provided at the image side of the second lens unit with a second variable air space between the second and third lens units, the third lens unit including a resin lens element.
wherein a zooming operation is performed by varying the first and second air spaces, and
wherein the zoom lens system fulfills the following condition:

$$1.00 < TLW/Y' < 1.75$$

where
TLW represents a total length in a shortest focal length condition (the total length is defined as a distance between a summit of a most object side surface of the zoom lens system and an image plane), and
Y' represents a maximum image height.

25. A zoom lens system as claimed in claim 24, wherein the resin lens element has a positive power.

26. A zoom lens system as claimed in claim 24, wherein the zoom lens system fulfills the following condition:

$$-0.8 < f3p/fW < -0.5$$

where f3p represents a focal length of the resin lens element, and fW represents an entire focal length in the shortest focal length condition.

27. A zoom lens system as claimed in claim 24, wherein the third lens unit consists of a single lens element, wherein the single lens element fulfills the following condition:

$$\nu d3p > 50$$

where $\nu d3p$ represents an Abbe number of the single lens element for a d-line.

28. A zoom lens system having at least three lens units including at least one positive lens unit and at least one negative lens unit, wherein a zooming operation is performed by varying air spaces between the lens units, and wherein at least either the positive lens unit or the e negative lens unit consists of a single lens element, wherein the following conditions are fulfilled:

$$-0.0020 < Lt < 0.0020$$

$$0.02 < |Lgp| < 0.20$$

$$0.02 < |Lgn| < 0.20$$

$$0.60 < |Lgp/Lgn| < 1.40$$

where

Lt represents an axial chromatic aberration coefficient of the entire zoom lens system in a longest focal length condition with an entire focal length of the zoom lens system as a normalized unit, Lgp represents an axial chromatic aberration coefficient of the positive lens unit with the entire focal length of the zoom lens system as a normalized unit, and Lgn represents an axial chromatic aberration coefficient of the negative lens unit with the entire focal length of the zoom lens system as a normalized unit.

29. A zoom lens system as claimed in claim 28, wherein the zoom lens system comprises, from the object side:

a first lens unit having a positive optical power;

a second lens unit having a positive optical power and provided at the image side of the first lens unit with a first variable air space between the first and second lens units; and a third lens unit having a negative optical power provided at the image side of the second lens unit with a second variable air space between the second and third lens units.

30. A zoom lens system as claimed in claim 28, wherein the third lens unit consists of a single lens element.

31. A zoom lens system as claimed in claim 28, wherein the second lens unit consists of a single lens element.

32. A zoom lens system as claimed in claim 31, wherein the third lens unit consists of a single lens element.

33. A zoom lens system having at least three lens units including at least one positive lens unit and at least one negative lens unit, wherein a zooming operation is performed by varying air spaces between the lens units, and wherein at least either the positive lens unit or the negative lens unit consists of a single lens element, wherein the following conditions are fulfilled:

$$0.50 < fp/fW < 1.00$$

$$-0.70 < fn/fW < -0.40$$

$$0.60 < |Lgp/Lgn| < 1.40$$

where fp represents a focal length of the positive lens unit, fn represents a focal length of the negative lens unit, fW represents an entire focal length in a shortest focal length condition, Lgp represents an axial chromatic aberration coefficient of the positive lens unit with the entire focal length of the zoom lens system as a normalized unit, and Lgn represents an axial chromatic aberration coefficient of the negative lens unit with the entire focal length of the zoom lens system as a normalized unit.

34. A zoom lens system as claimed in claim 33, wherein the third lens unit consists of a single lens element.

35. A zoom lens system as claimed in claim 33, wherein the second lens unit consists of a single lens element.

36. A zoom lens system as claimed in claim 35, wherein the third lens unit consists of a single lens element.

* * * * *